US011048473B2

(12) United States Patent
Carson et al.

(10) Patent No.: US 11,048,473 B2
(45) Date of Patent: Jun. 29, 2021

(54) DEVICE, METHOD, AND GRAPHICAL USER INTERFACE FOR ENABLING CONVERSATION PERSISTENCE ACROSS TWO OR MORE INSTANCES OF A DIGITAL ASSISTANT

(71) Applicant: Apple Inc., Cupertino, CA (US)

(72) Inventors: David A. Carson, San Francisco, CA (US); Daniel Keen, San Jose, CA (US); Evan Dibiase, Pittsburgh, PA (US); Harry J. Saddler, Berkeley, CA (US); Marco Iacono, San Francisco, CA (US); Stephen O. Lemay, Palo Alto, CA (US); Donald W. Pitschel, San Francisco, CA (US); Thomas R. Gruber, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 16/204,178

(22) Filed: Nov. 29, 2018

(65) Prior Publication Data

US 2019/0095171 A1 Mar. 28, 2019

Related U.S. Application Data

(63) Continuation of application No. 14/298,714, filed on Jun. 6, 2014, now Pat. No. 10,185,542.

(Continued)

(51) Int. Cl.
*G06F 3/00* (2006.01)
*G06F 3/16* (2006.01)
(Continued)

(52) U.S. Cl.
CPC .......... *G06F 3/167* (2013.01); *G06F 3/04842* (2013.01); *G06F 16/3344* (2019.01)

(58) Field of Classification Search
CPC ............ G06F 16/3329; G06F 16/3344; G06F 16/9537; G06F 3/167; G06F 40/30;
(Continued)

(56) References Cited

U.S. PATENT DOCUMENTS

| 7,315,809 B2 | 1/2008 | Xun |
| 7,315,818 B2 | 1/2008 | Stevens et al. |

(Continued)

FOREIGN PATENT DOCUMENTS

| AU | 2015203483 A1 | 7/2015 |
| CA | 2694314 A1 | 8/2010 |

(Continued)

OTHER PUBLICATIONS

Notice of Allowance received for Korean Patent Application No. 10-2018-7033779, dated Dec. 21, 2018, 4 pages (1 page of English Translation and 3 pages of Official copy).

(Continued)

*Primary Examiner* — Anil N Kumar
(74) *Attorney, Agent, or Firm* — Dentons US LLP

(57) ABSTRACT

An electronic device with one or more processors and memory includes a procedure for enabling conversation persistence across two or more instances of a digital assistant. In some embodiments, the device displays a first dialogue in a first instance of a digital assistant user interface. In response to a request to display a user interface different from the digital assistant user interface, the device displays the user interface different from the digital assistant user interface. In response to a request to invoke the digital assistant, the device displays a second instance of the digital assistant user interface, including displaying a second dialogue in the second instance of the digital assistant user (Continued)

interface, where the first dialogue remains available for display in the second instance of the digital assistant user interface.

39 Claims, 55 Drawing Sheets

Related U.S. Application Data

(60) Provisional application No. 61/932,898, filed on Jun. 9, 2013.

(51) Int. Cl.
*G06F 3/0484* (2013.01)
*G06F 16/33* (2019.01)

(58) Field of Classification Search
CPC . G06F 40/40; G10L 15/1815; G10L 15/1822; G10L 15/183; G10L 15/22; G10L 15/26; G10L 15/265; G10L 21/06
See application file for complete search history.

(56) References Cited

U.S. PATENT DOCUMENTS

| | | |
|---|---|---|
| 7,318,020 B1 | 1/2008 | Kim |
| 7,319,957 B2 | 1/2008 | Robinson et al. |
| 7,321,783 B2 | 1/2008 | Kim |
| 7,322,023 B2 | 1/2008 | Shulman et al. |
| 7,324,833 B2 | 1/2008 | White et al. |
| 7,324,947 B2 | 1/2008 | Jordan et al. |
| 7,328,155 B2 | 2/2008 | Endo et al. |
| 7,328,250 B2 | 2/2008 | Wang et al. |
| 7,333,998 B2 | 2/2008 | Heckerman et al. |
| 7,337,108 B2 | 2/2008 | Florencio et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,356,748 B2 | 4/2008 | Taleb |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,363,586 B1 | 4/2008 | Briggs et al. |
| 7,365,260 B2 | 4/2008 | Kawashima |
| 7,366,461 B1 | 4/2008 | Brown |
| 7,369,984 B2 | 5/2008 | Fairweather |
| 7,369,993 B1 | 5/2008 | Atal |
| 7,373,291 B2 | 5/2008 | Garst |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,110 B2 | 6/2008 | Petrunka et al. |
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick et al. |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,415,469 B2 | 8/2008 | Singh et al. |
| 7,418,382 B1 | 8/2008 | Maes |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,430,508 B2 | 9/2008 | Williamson et al. |
| 7,433,869 B2 | 10/2008 | Gollapudi |
| 7,433,921 B2 | 10/2008 | Ludwig et al. |
| 7,436,947 B2 | 10/2008 | Wadler et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,624 B2 | 11/2008 | Fuhrmann et al. |
| 7,447,635 B1 | 11/2008 | Konopka et al. |
| 7,447,637 B1 | 11/2008 | Grant et al. |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,251 B2 | 2/2009 | Gao et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,519,398 B2 | 4/2009 | Hirose |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,529,677 B1 | 5/2009 | Wittenber |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,542,971 B2 | 6/2009 | Thione et al. |
| 7,543,232 B2 | 6/2009 | Easton, Jr. et al. |
| 7,546,382 B2 | 6/2009 | Healey et al. |

(56) References Cited

U.S. PATENT DOCUMENTS

| | | |
|---|---|---|
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 | 6/2009 | Lecoeuche |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,568,151 B2 | 7/2009 | Bergeron et al. |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,092 B2 | 9/2009 | Brockett et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,606,712 B1 | 10/2009 | Smith et al. |
| 7,607,083 B2 | 10/2009 | Gong et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,900 B1 | 12/2009 | Strom |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,828 B2 | 2/2010 | Lucas et al. |
| 7,657,844 B2 | 2/2010 | Gibson et al. |
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 | 3/2010 | Wibisono |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,202 B2 | 8/2010 | Spengler et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |

(56) References Cited

U.S. PATENT DOCUMENTS

| | | | |
|---|---|---|---|
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 | 11/2010 | Smith et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Levi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansai et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Roberts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,054,180 B1 | 11/2011 | Scofield et al. |

(56) References Cited

U.S. PATENT DOCUMENTS

| | | |
|---|---|---|
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,195,467 B2 | 6/2012 | Mozer et al. |
| 8,195,468 B2 | 6/2012 | Kennewick et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,401,163 B1 | 3/2013 | Kirchhoff et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,457,959 B2 | 6/2013 | Kaiser |
| 8,458,115 B2 | 6/2013 | Cai et al. |
| 8,458,278 B2 | 6/2013 | Christie et al. |
| 8,464,150 B2 | 6/2013 | Davidson et al. |
| 8,473,289 B2 | 6/2013 | Jitkoff et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |

(56) References Cited

U.S. PATENT DOCUMENTS

| | | |
|---|---|---|
| 8,514,197 B2 | 8/2013 | Shahraray et al. |
| 8,515,750 B1 | 8/2013 | Lei et al. |
| 8,521,513 B2 | 8/2013 | Millett et al. |
| 8,521,531 B1 | 8/2013 | Kim |
| 8,527,276 B1 | 9/2013 | Senior et al. |
| 8,537,033 B2 | 9/2013 | Gueziec |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,583,511 B2 | 11/2013 | Hendrickson |
| 8,589,869 B2 | 11/2013 | Wolfram |
| 8,589,911 B1 | 11/2013 | Sharkey et al. |
| 8,595,004 B2 | 11/2013 | Koshinaka |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,638,363 B2 | 1/2014 | King et al. |
| 8,639,516 B2 | 1/2014 | Lindahl et al. |
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,931 B2 | 7/2014 | Fux et al. |
| 8,781,456 B2 | 7/2014 | Prociw |
| 8,781,841 B1 | 7/2014 | Wang |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,302 B2 | 8/2014 | Xiao et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,009,046 B1 | 4/2015 | Stewart |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,037,967 B1 | 5/2015 | Al-Jefri et al. |
| 9,043,208 B2 | 5/2015 | Koch et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,063,979 B2 | 6/2015 | Chiu et al. |
| 9,070,366 B1 | 6/2015 | Mathias et al. |
| 9,071,701 B2 | 6/2015 | Donaldson et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,164,983 B2 | 10/2015 | Liu et al. |
| 9,171,541 B2 | 10/2015 | Kennewick et al. |
| 9,171,546 B1 | 10/2015 | Pike |
| 9,190,062 B2 | 11/2015 | Haughay |
| 9,208,153 B1 | 12/2015 | Zaveri et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,280,535 B2 | 3/2016 | Varma et al. |
| 9,286,910 B1 | 3/2016 | Li et al. |
| 9,292,487 B1 | 3/2016 | Weber |
| 9,292,489 B1 | 3/2016 | Sak et al. |
| 9,299,344 B2 | 3/2016 | Braho et al. |
| 9,300,718 B2 | 3/2016 | Khanna |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |

(56) References Cited

U.S. PATENT DOCUMENTS

| | | |
|---|---|---|
| 9,330,659 B2 | 5/2016 | Ju et al. |
| 9,330,720 B2 | 5/2016 | Lee |
| 9,338,493 B2 | 5/2016 | Van Os et al. |
| 9,349,368 B1 | 5/2016 | LeBeau et al. |
| 9,361,084 B1 | 6/2016 | Costa |
| 9,367,541 B1 | 6/2016 | Servan et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,412,392 B2 | 8/2016 | Lindahl |
| 9,423,266 B2 | 8/2016 | Clark et al. |
| 9,424,840 B1 | 8/2016 | Hart et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,454,957 B1 | 9/2016 | Mathias et al. |
| 9,465,833 B2 | 10/2016 | Aravamudan et al. |
| 9,471,566 B1 | 10/2016 | Zhang et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,720,907 B2 | 8/2017 | Bangalore et al. |
| 9,721,566 B2 | 8/2017 | Newendorp et al. |
| 9,734,839 B1 | 8/2017 | Adams |
| 9,741,343 B1 | 8/2017 | Miles et al. |
| 9,747,083 B1 | 8/2017 | Roman et al. |
| 9,755,605 B1 | 9/2017 | Li et al. |
| 9,842,584 B1 | 12/2017 | Hart et al. |
| 9,934,785 B1 | 4/2018 | Hulaud |
| 9,948,728 B2 | 4/2018 | Linn et al. |
| 9,966,068 B2 | 5/2018 | Cash et al. |
| 9,967,381 B1 | 5/2018 | Kashimba et al. |
| 9,990,176 B1 | 6/2018 | Gray |
| 10,037,758 B2 | 7/2018 | Jing et al. |
| 10,049,663 B2 | 8/2018 | Orr et al. |
| 10,074,360 B2 | 9/2018 | Kim |
| 10,096,319 B1 | 10/2018 | Jin et al. |
| 10,102,359 B2 | 10/2018 | Cheyer |
| 2007/0043820 A1 | 2/2007 | George et al. |
| 2008/0001785 A1 | 1/2008 | Elizarov et al. |
| 2008/0010050 A1 | 1/2008 | Fux et al. |
| 2008/0010355 A1 | 1/2008 | Vieri et al. |
| 2008/0010605 A1 | 1/2008 | Frank et al. |
| 2008/0012950 A1 | 1/2008 | Lee et al. |
| 2008/0013751 A1 | 1/2008 | Hiselius |
| 2008/0015863 A1 | 1/2008 | Agapi et al. |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0021886 A1 | 1/2008 | Wang-Aryattanwanich et al. |
| 2008/0022208 A1 | 1/2008 | Morse |
| 2008/0027711 A1 | 1/2008 | Rajendran et al. |
| 2008/0027726 A1 | 1/2008 | Hansen et al. |
| 2008/0031475 A1 | 2/2008 | Goldstein |
| 2008/0033719 A1 | 2/2008 | Hall et al. |
| 2008/0033723 A1 | 2/2008 | Jang et al. |
| 2008/0034032 A1 | 2/2008 | Healey et al. |
| 2008/0034044 A1 | 2/2008 | Bhakta et al. |
| 2008/0034081 A1 | 2/2008 | Marshall et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046250 A1 | 2/2008 | Agapi et al. |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0050027 A1 | 2/2008 | Bashyam et al. |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0052080 A1 | 2/2008 | Narayanan et al. |
| 2008/0052262 A1 | 2/2008 | Kosinov et al. |
| 2008/0055194 A1 | 3/2008 | Baudino et al. |
| 2008/0056459 A1 | 3/2008 | Vallier et al. |
| 2008/0056579 A1 | 3/2008 | Guha |
| 2008/0057922 A1 | 3/2008 | Kokes et al. |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0062141 A1 | 3/2008 | Chaudhri |
| 2008/0065382 A1 | 3/2008 | Gerl et al. |
| 2008/0065387 A1 | 3/2008 | Cross et al. |
| 2008/0066135 A1 | 3/2008 | Brodersen et al. |
| 2008/0071529 A1 | 3/2008 | Silverman et al. |
| 2008/0071544 A1 | 3/2008 | Beaufays et al. |
| 2008/0071742 A1 | 3/2008 | Yang et al. |
| 2008/0072143 A1 | 3/2008 | Assadollahi |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0080411 A1 | 4/2008 | Cole |
| 2008/0082332 A1 | 4/2008 | Mallett et al. |
| 2008/0082338 A1 | 4/2008 | O"Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0085689 A1 | 4/2008 | Zellner |
| 2008/0086306 A1 | 4/2008 | Hirota et al. |
| 2008/0091406 A1 | 4/2008 | Baldwin et al. |
| 2008/0091426 A1 | 4/2008 | Rempel et al. |
| 2008/0091428 A1 | 4/2008 | Bellegarda |
| 2008/0091443 A1 | 4/2008 | Strope et al. |
| 2008/0096531 A1 | 4/2008 | Mcquaide et al. |
| 2008/0096533 A1 | 4/2008 | Manfredi et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0100579 A1 | 5/2008 | Robinson et al. |
| 2008/0101584 A1 | 5/2008 | Gray et al. |
| 2008/0103774 A1 | 5/2008 | White |
| 2008/0109222 A1 | 5/2008 | Liu |
| 2008/0109402 A1 | 5/2008 | Wang et al. |
| 2008/0114480 A1 | 5/2008 | Harb |

(56) References Cited

U.S. PATENT DOCUMENTS

| | | |
|---|---|---|
| 2008/0114598 A1 | 5/2008 | Prieto et al. |
| 2008/0114604 A1 | 5/2008 | Wei et al. |
| 2008/0114841 A1 | 5/2008 | Lambert |
| 2008/0115084 A1 | 5/2008 | Scott et al. |
| 2008/0118143 A1 | 5/2008 | Gordon et al. |
| 2008/0119953 A1 | 5/2008 | Reed |
| 2008/0120102 A1 | 5/2008 | Rao |
| 2008/0120112 A1 | 5/2008 | Jordan et al. |
| 2008/0120196 A1 | 5/2008 | Reed et al. |
| 2008/0120311 A1 | 5/2008 | Reed |
| 2008/0120312 A1 | 5/2008 | Reed |
| 2008/0120330 A1 | 5/2008 | Reed |
| 2008/0120342 A1 | 5/2008 | Reed et al. |
| 2008/0122796 A1 | 5/2008 | Jobs et al. |
| 2008/0124695 A1 | 5/2008 | Myers et al. |
| 2008/0126075 A1 | 5/2008 | Thorn et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0126491 A1 | 5/2008 | Portele et al. |
| 2008/0129520 A1 | 6/2008 | Lee |
| 2008/0130867 A1 | 6/2008 | Bowen |
| 2008/0131006 A1 | 6/2008 | Oliver |
| 2008/0132221 A1 | 6/2008 | Willey et al. |
| 2008/0132295 A1 | 6/2008 | Horowitz |
| 2008/0133215 A1 | 6/2008 | Sarukkai |
| 2008/0133228 A1 | 6/2008 | Rao |
| 2008/0133230 A1 | 6/2008 | Herforth et al. |
| 2008/0133241 A1 | 6/2008 | Baker et al. |
| 2008/0133244 A1 | 6/2008 | Bodin et al. |
| 2008/0133245 A1 | 6/2008 | Proulx et al. |
| 2008/0133479 A1 | 6/2008 | Zelevinsky et al. |
| 2008/0133956 A1 | 6/2008 | Fadell |
| 2008/0140413 A1 | 6/2008 | Millman et al. |
| 2008/0140415 A1 | 6/2008 | Shostak |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1 | 6/2008 | Reed et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154599 A1 | 6/2008 | Muschett et al. |
| 2008/0154600 A1 | 6/2008 | Tian et al. |
| 2008/0154603 A1 | 6/2008 | Oddo |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 | 7/2008 | Mactavish et al. |
| 2008/0162137 A1 | 7/2008 | Saitoh et al. |
| 2008/0162471 A1 | 7/2008 | Bernard |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0167876 A1 | 7/2008 | Bakis et al. |
| 2008/0168052 A1 | 7/2008 | Ott et al. |
| 2008/0168144 A1 | 7/2008 | Lee |
| 2008/0168366 A1 | 7/2008 | Kocienda et al. |
| 2008/0172698 A1 | 7/2008 | Berger et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189360 A1 | 8/2008 | Kiley et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201000 A1 | 8/2008 | Heikkila et al. |
| 2008/0201306 A1 | 8/2008 | Cooper et al. |
| 2008/0201375 A1 | 8/2008 | Khedouri et al. |
| 2008/0201434 A1 | 8/2008 | Holmes et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0215678 A1 | 9/2008 | Coletrane et al. |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansai et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura et al. |
| 2008/0235018 A1 | 9/2008 | Eggen et al. |
| 2008/0235023 A1 | 9/2008 | Kennewick et al. |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0242322 A1 | 10/2008 | Scott et al. |
| 2008/0242363 A1 | 10/2008 | Onda et al. |
| 2008/0243501 A1 | 10/2008 | Hafsteinsson et al. |
| 2008/0243834 A1 | 10/2008 | Rieman et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254419 A1 | 10/2008 | Cohen |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0261572 A1 | 10/2008 | Tsui et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0267416 A1 | 10/2008 | Goldstein et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0270344 A1 | 10/2008 | Yurick et al. |
| 2008/0273672 A1 | 11/2008 | Didcock et al. |

(56) References Cited

U.S. PATENT DOCUMENTS

| | | |
|---|---|---|
| 2008/0277473 A1 | 11/2008 | Kotlarsky et al. |
| 2008/0281510 A1 | 11/2008 | Shahine |
| 2008/0281582 A1 | 11/2008 | Hsu et al. |
| 2008/0288259 A1 | 11/2008 | Chambers et al. |
| 2008/0288460 A1 | 11/2008 | Poniatowski et al. |
| 2008/0292112 A1 | 11/2008 | Valenzuela et al. |
| 2008/0294418 A1 | 11/2008 | Cleary et al. |
| 2008/0294517 A1 | 11/2008 | Hill |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300857 A1 | 12/2008 | Barbaiani et al. |
| 2008/0300871 A1 | 12/2008 | Gilbert |
| 2008/0300877 A1 | 12/2008 | Gilbert et al. |
| 2008/0300878 A1 | 12/2008 | Bennett |
| 2008/0300886 A1 | 12/2008 | Patch |
| 2008/0301567 A1 | 12/2008 | Martin et al. |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312926 A1 | 12/2008 | Vair et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |
| 2008/0319735 A1 | 12/2008 | Kambhatla et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006096 A1 | 1/2009 | Li et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0028435 A1 | 1/2009 | Wu et al. |
| 2009/0030685 A1 | 1/2009 | Cerra et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048841 A1 | 2/2009 | Pollet et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055380 A1 | 2/2009 | Peng et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076798 A1 | 3/2009 | Oh et al. |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077047 A1 | 3/2009 | Cooper et al. |
| 2009/0077165 A1 | 3/2009 | Rhodes et al. |
| 2009/0077464 A1 | 3/2009 | Goldsmith et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0091537 A1 | 4/2009 | Huang et al. |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112596 A1 | 4/2009 | Syrdal et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0125602 A1 | 5/2009 | Bhatia et al. |
| 2009/0125813 A1 | 5/2009 | Shen et al. |
| 2009/0125947 A1 | 5/2009 | Ibaraki |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138430 A1 | 5/2009 | Nambiar et al. |
| 2009/0138736 A1 | 5/2009 | Chin |
| 2009/0138828 A1 | 5/2009 | Schultz et al. |
| 2009/0144036 A1 | 6/2009 | Jorgensen et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160761 A1 | 6/2009 | Moosavi et al. |

(56) References Cited

U.S. PATENT DOCUMENTS

| | | |
|---|---|---|
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1 | 8/2009 | Mozer et al. |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259472 A1 | 10/2009 | Schroeter |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0278804 A1 | 11/2009 | Rubanovich et al. |
| 2009/0281789 A1 | 11/2009 | Weibel et al. |
| 2009/0284471 A1 | 11/2009 | Longe et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |

(56) References Cited

U.S. PATENT DOCUMENTS

| | | |
|---|---|---|
| 2010/0017382 A1 | 1/2010 | Katragadda et al. |
| 2010/0019834 A1 | 1/2010 | Zerbe et al. |
| 2010/0020035 A1 | 1/2010 | Ryu et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036829 A1 | 2/2010 | Leyba |
| 2010/0036928 A1 | 2/2010 | Granito et al. |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100385 A1 | 4/2010 | Davis et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |

(56) References Cited

U.S. PATENT DOCUMENTS

| | | |
|---|---|---|
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0263015 A1 | 10/2010 | Pandey et al. |
| 2010/0268537 A1 | 10/2010 | Al-Telmissani |
| 2010/0268539 A1 | 10/2010 | Xu et al. |
| 2010/0269040 A1* | 10/2010 | Lee .................. G06F 3/04817 715/702 |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318366 A1 | 12/2010 | Sullivan et al. |
| 2010/0318570 A1* | 12/2010 | Narasinghanallur ....................... G06F 16/252 707/783 |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066634 A1 | 3/2011 | Phillips et al. |
| 2011/0072033 A1 | 3/2011 | White et al. |
| 2011/0072492 A1 | 3/2011 | Mohler et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0103682 A1 | 5/2011 | Chidlovskii et al. |
| 2011/0105097 A1 | 5/2011 | Tadayon et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0141141 A1 | 6/2011 | Kankainen |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |

(56) References Cited

U.S. PATENT DOCUMENTS

| | | |
|---|---|---|
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Deng et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Peek et al. |
| 2011/0202526 A1 | 8/2011 | Lee et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282663 A1 | 11/2011 | Talwar et al. |
| 2011/0282888 A1 | 11/2011 | Koperski et al. |
| 2011/0282906 A1 | 11/2011 | Wong |
| 2011/0283189 A1 | 11/2011 | McCarty |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Weibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1* | 1/2012 | Baldwin ............ G10L 15/1815 704/9 |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanan et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0077479 A1 | 3/2012 | Sabotta et al. |
| 2012/0078611 A1 | 3/2012 | Soltani et al. |
| 2012/0078624 A1 | 3/2012 | Yook et al. |

(56) References Cited

U.S. PATENT DOCUMENTS

| | | |
|---|---|---|
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pence et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0101823 A1 | 4/2012 | Weng et al. |
| 2012/0108166 A1 | 5/2012 | Hymel |
| 2012/0108221 A1 | 5/2012 | Thomas et al. |
| 2012/0110456 A1 | 5/2012 | Larco et al. |
| 2012/0116770 A1 | 5/2012 | Chen et al. |
| 2012/0117499 A1 | 5/2012 | Mori et al. |
| 2012/0124126 A1 | 5/2012 | Alcazar et al. |
| 2012/0128322 A1 | 5/2012 | Shaffer et al. |
| 2012/0130709 A1 | 5/2012 | Bocchieri et al. |
| 2012/0136572 A1 | 5/2012 | Norton |
| 2012/0136649 A1 | 5/2012 | Freising et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0179467 A1 | 7/2012 | Williams |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233207 A1 | 9/2012 | Mohajer |
| 2012/0233266 A1 | 9/2012 | Hassan et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0262296 A1 | 10/2012 | Bezar |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0018659 A1 | 1/2013 | Chi |
| 2013/0024576 A1 | 1/2013 | Dishneau et al. |
| 2013/0027875 A1 | 1/2013 | Zhu et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |

(56) References Cited

U.S. PATENT DOCUMENTS

| | | |
|---|---|---|
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054675 A1* | 2/2013 | Jenkins ............... G06F 16/954 709/203 |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0073286 A1 | 3/2013 | Bastea-Forte et al. |
| 2013/0073346 A1 | 3/2013 | Chun et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1* | 6/2013 | Bangalore ............. G10L 15/075 704/226 |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0165232 A1 | 6/2013 | Nelson et al. |
| 2013/0166303 A1 | 6/2013 | Chang et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0174034 A1 | 7/2013 | Brown et al. |
| 2013/0176244 A1 | 7/2013 | Yamamoto et al. |
| 2013/0176592 A1 | 7/2013 | Sasaki |
| 2013/0179172 A1 | 7/2013 | Nakamura et al. |
| 2013/0179440 A1 | 7/2013 | Gordon |
| 2013/0183944 A1 | 7/2013 | Mozer et al. |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0191117 A1 | 7/2013 | Atti et al. |
| 2013/0197911 A1 | 8/2013 | Wei et al. |
| 2013/0204813 A1 | 8/2013 | Master et al. |
| 2013/0204897 A1 | 8/2013 | McDougall |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238326 A1 | 9/2013 | Kim et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0268263 A1 | 10/2013 | Park et al. |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0282709 A1 | 10/2013 | Zhu et al. |
| 2013/0283168 A1 | 10/2013 | Brown et al. |
| 2013/0285913 A1 | 10/2013 | Griffin et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311184 A1 | 11/2013 | Badavne et al. |
| 2013/0311997 A1 | 11/2013 | Gruber et al. |
| 2013/0316746 A1 | 11/2013 | Miller et al. |
| 2013/0322634 A1 | 12/2013 | Bennett et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0339256 A1 | 12/2013 | Shroff |

(56) References Cited

U.S. PATENT DOCUMENTS

| | | |
|---|---|---|
| 2013/0346068 A1 | 12/2013 | Solem et al. |
| 2013/0346347 A1 | 12/2013 | Patterson et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0012574 A1 | 1/2014 | Pasupalak et al. |
| 2014/0012580 A1 | 1/2014 | Ganong et al. |
| 2014/0012586 A1 | 1/2014 | Rubin et al. |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0039893 A1 | 2/2014 | Weiner |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0046934 A1 | 2/2014 | Zhou et al. |
| 2014/0047001 A1 | 2/2014 | Phillips et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0068751 A1 | 3/2014 | Last et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074815 A1 | 3/2014 | Plimton |
| 2014/0078065 A1 | 3/2014 | Akkok et al. |
| 2014/0079195 A1 | 3/2014 | Srivastava et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0096209 A1 | 4/2014 | Saraf et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |
| 2014/0122059 A1 | 5/2014 | Patel et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0134983 A1 | 5/2014 | Jung et al. |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164476 A1 | 6/2014 | Thomson |
| 2014/0164532 A1 | 6/2014 | Lynch et al. |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0173460 A1 | 6/2014 | Kim |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188477 A1 | 7/2014 | Zhang |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207466 A1 | 7/2014 | Smadi et al. |
| 2014/0207468 A1 | 7/2014 | Bartnik |
| 2014/0207582 A1 | 7/2014 | Flinn et al. |
| 2014/0214429 A1 | 7/2014 | Pantel |
| 2014/0214537 A1 | 7/2014 | Yoo et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0230055 A1 | 8/2014 | Boehl |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244271 A1 | 8/2014 | Lindahl |
| 2014/0244712 A1 | 8/2014 | Walters et al. |
| 2014/0245140 A1* | 8/2014 | Brown .............. H04M 1/72519 715/708 |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0258324 A1* | 9/2014 | Mauro .............. G06F 16/2423 707/766 |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0272821 A1 | 9/2014 | Pitschel et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |

(56) References Cited

U.S. PATENT DOCUMENTS

| | | |
|---|---|---|
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278429 A1 | 9/2014 | Ganong, III |
| 2014/0278435 A1 | 9/2014 | Ganong et al. |
| 2014/0278436 A1 | 9/2014 | Khanna et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281983 A1 | 9/2014 | Xian et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282203 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324884 A1 | 10/2014 | Lindahl et al. |
| 2014/0330569 A1 | 11/2014 | Kolavennu et al. |
| 2014/0337048 A1 | 11/2014 | Brown et al. |
| 2014/0337266 A1 | 11/2014 | Wolverton et al. |
| 2014/0337371 A1 | 11/2014 | Li |
| 2014/0337438 A1 | 11/2014 | Govande et al. |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0344627 A1 | 11/2014 | Schaub et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0361973 A1 | 12/2014 | Raux et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0380285 A1 | 12/2014 | Gabel et al. |
| 2015/0003797 A1 | 1/2015 | Schmidt |
| 2015/0006148 A1 | 1/2015 | Goldszmit et al. |
| 2015/0006157 A1 | 1/2015 | Andrade Silva et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0031416 A1 | 1/2015 | Wells et al. |
| 2015/0033219 A1 | 1/2015 | Breiner et al. |
| 2015/0033275 A1 | 1/2015 | Natani et al. |
| 2015/0039292 A1 | 2/2015 | Suleman et al. |
| 2015/0039299 A1 | 2/2015 | Weinstein et al. |
| 2015/0039305 A1 | 2/2015 | Huang |
| 2015/0040012 A1 | 2/2015 | Faaborg et al. |
| 2015/0045003 A1 | 2/2015 | Vora et al. |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0058013 A1 | 2/2015 | Pakhomov et al. |
| 2015/0058018 A1 | 2/2015 | Georges et al. |
| 2015/0058785 A1 | 2/2015 | Ookawara |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0067822 A1 | 3/2015 | Randall |
| 2015/0071121 A1 | 3/2015 | Patil et al. |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0082229 A1 | 3/2015 | Ouyang et al. |
| 2015/0088511 A1 | 3/2015 | Bharadwaj et al. |
| 2015/0088514 A1 | 3/2015 | Typrin |
| 2015/0088522 A1 | 3/2015 | Hendrickson et al. |
| 2015/0088523 A1 | 3/2015 | Schuster |
| 2015/0095031 A1 | 4/2015 | Conkie et al. |
| 2015/0095278 A1 | 4/2015 | Flinn et al. |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120723 A1 | 4/2015 | Deshmukh et al. |
| 2015/0121216 A1 | 4/2015 | Brown et al. |
| 2015/0127348 A1 | 5/2015 | Follis |
| 2015/0127350 A1 | 5/2015 | Agiomyrgiannakis |
| 2015/0133109 A1 | 5/2015 | Freeman et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quest et al. |
| 2015/0169336 A1 | 6/2015 | Harper et al. |
| 2015/0170664 A1 | 6/2015 | Doherty et al. |
| 2015/0172463 A1 | 6/2015 | Quast et al. |
| 2015/0178388 A1 | 6/2015 | Winnemoeller et al. |
| 2015/0179176 A1 | 6/2015 | Ryu et al. |
| 2015/0185964 A1 | 7/2015 | Stout |
| 2015/0186012 A1 | 7/2015 | Coleman et al. |
| 2015/0186110 A1 | 7/2015 | Kannan |

(56) References Cited

U.S. PATENT DOCUMENTS

| | | |
|---|---|---|
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0205858 A1 | 7/2015 | Xie et al. |
| 2015/0208226 A1 | 7/2015 | Kuusilinna et al. |
| 2015/0212791 A1 | 7/2015 | Kumar et al. |
| 2015/0213796 A1 | 7/2015 | Waltermann et al. |
| 2015/0220507 A1 | 8/2015 | Mohajer et al. |
| 2015/0221304 A1 | 8/2015 | Stewart |
| 2015/0221307 A1 | 8/2015 | Shah et al. |
| 2015/0227505 A1 | 8/2015 | Morimoto |
| 2015/0227633 A1 | 8/2015 | Shapira |
| 2015/0228281 A1 | 8/2015 | Raniere |
| 2015/0230095 A1 | 8/2015 | Smith et al. |
| 2015/0234636 A1 | 8/2015 | Barnes, Jr. |
| 2015/0234800 A1 | 8/2015 | Patrick et al. |
| 2015/0242091 A1 | 8/2015 | Lu et al. |
| 2015/0243278 A1 | 8/2015 | Kibre et al. |
| 2015/0243283 A1 | 8/2015 | Halash et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261496 A1 | 9/2015 | Faaborg et al. |
| 2015/0261850 A1 | 9/2015 | Mittal |
| 2015/0269139 A1 | 9/2015 | McAteer et al. |
| 2015/0277574 A1 | 10/2015 | Jain et al. |
| 2015/0278370 A1 | 10/2015 | Stratvert et al. |
| 2015/0279358 A1 | 10/2015 | Kingsbury et al. |
| 2015/0279360 A1 | 10/2015 | Mengibar et al. |
| 2015/0281380 A1 | 10/2015 | Wang et al. |
| 2015/0286627 A1 | 10/2015 | Chang et al. |
| 2015/0287401 A1 | 10/2015 | Lee et al. |
| 2015/0287409 A1 | 10/2015 | Jang |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0295915 A1 | 10/2015 | Xiu |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0309997 A1 | 10/2015 | Lee et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0312182 A1 | 10/2015 | Langholz |
| 2015/0317069 A1 | 11/2015 | Clements et al. |
| 2015/0317310 A1 | 11/2015 | Eiche et al. |
| 2015/0324041 A1 | 11/2015 | Varley et al. |
| 2015/0324334 A1 | 11/2015 | Lee et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347385 A1 | 12/2015 | Flor et al. |
| 2015/0347393 A1 | 12/2015 | Futrell et al. |
| 2015/0347733 A1 | 12/2015 | Tsou et al. |
| 2015/0347985 A1 | 12/2015 | Gross et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0350031 A1 | 12/2015 | Burks et al. |
| 2015/0352999 A1 | 12/2015 | Bando et al. |
| 2015/0355879 A1 | 12/2015 | Beckhardt et al. |
| 2015/0363587 A1 | 12/2015 | Ahn et al. |
| 2015/0364140 A1 | 12/2015 | Thorn |
| 2015/0370531 A1 | 12/2015 | Faaborg |
| 2015/0370780 A1 | 12/2015 | Wang et al. |
| 2015/0371639 A1 | 12/2015 | Foerster et al. |
| 2015/0371665 A1 | 12/2015 | Naik et al. |
| 2015/0373183 A1 | 12/2015 | Woolsey et al. |
| 2015/0382047 A1 | 12/2015 | Napolitano et al. |
| 2015/0382079 A1 | 12/2015 | Lister et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018900 A1 | 1/2016 | Tu et al. |
| 2016/0019886 A1 | 1/2016 | Hong |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0042735 A1 | 2/2016 | Vibbert et al. |
| 2016/0042748 A1 | 2/2016 | Jain et al. |
| 2016/0048666 A1 | 2/2016 | Dey et al. |
| 2016/0055422 A1 | 2/2016 | Li |
| 2016/0062605 A1 | 3/2016 | Agarwal et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094979 A1 | 3/2016 | Naik et al. |
| 2016/0098991 A1 | 4/2016 | Luo et al. |
| 2016/0104486 A1 | 4/2016 | Penilla et al. |
| 2016/0111091 A1 | 4/2016 | Bakish |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0147725 A1 | 5/2016 | Patten et al. |
| 2016/0148610 A1 | 5/2016 | Kennewick, Jr. et al. |
| 2016/0155442 A1 | 6/2016 | Kannan et al. |

(56) References Cited

U.S. PATENT DOCUMENTS

| | | |
|---|---|---|
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173960 A1 | 6/2016 | Snibbe et al. |
| 2016/0179462 A1 | 6/2016 | Bjorkengren |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0198319 A1 | 7/2016 | Huang et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1 | 8/2016 | Pender |
| 2016/0225372 A1 | 8/2016 | Cheung et al. |
| 2016/0240187 A1 | 8/2016 | Fleizach et al. |
| 2016/0247061 A1 | 8/2016 | Trask et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0275941 A1 | 9/2016 | Bellegarda et al. |
| 2016/0275947 A1 | 9/2016 | Li et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0286045 A1 | 9/2016 | Sheltiel et al. |
| 2016/0293168 A1 | 10/2016 | Chen |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0313906 A1 | 10/2016 | Kilchenko et al. |
| 2016/0314788 A1 | 10/2016 | Jitkoff et al. |
| 2016/0314792 A1 | 10/2016 | Alvarez et al. |
| 2016/0321261 A1 | 11/2016 | Spasojevic et al. |
| 2016/0322045 A1 | 11/2016 | Hatfeild et al. |
| 2016/0322050 A1 | 11/2016 | Wang et al. |
| 2016/0328205 A1 | 11/2016 | Agrawal et al. |
| 2016/0328893 A1 | 11/2016 | Cordova et al. |
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1 | 11/2016 | Basu et al. |
| 2016/0342781 A1 | 11/2016 | Jeon |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379633 A1 | 12/2016 | Lehman et al. |
| 2016/0379641 A1 | 12/2016 | Liu et al. |
| 2017/0004824 A1 | 1/2017 | Yoo et al. |
| 2017/0011303 A1 | 1/2017 | Annapureddy et al. |
| 2017/0011742 A1 | 1/2017 | Jing et al. |
| 2017/0018271 A1 | 1/2017 | Khan et al. |
| 2017/0019987 A1 | 1/2017 | Dragone et al. |
| 2017/0025124 A1 | 1/2017 | Mixter et al. |
| 2017/0031576 A1 | 2/2017 | Saoji et al. |
| 2017/0032783 A1 | 2/2017 | Lord et al. |
| 2017/0032791 A1 | 2/2017 | Elson et al. |
| 2017/0040002 A1 | 2/2017 | Basson et al. |
| 2017/0055895 A1 | 3/2017 | Des Jardins et al. |
| 2017/0060853 A1 | 3/2017 | Lee et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0076720 A1 | 3/2017 | Gopalan et al. |
| 2017/0076721 A1 | 3/2017 | Bargetzi et al. |
| 2017/0083179 A1 | 3/2017 | Gruber et al. |
| 2017/0083285 A1 | 3/2017 | Meyers et al. |
| 2017/0090569 A1 | 3/2017 | Levesque |
| 2017/0091168 A1 | 3/2017 | Bellegarda et al. |
| 2017/0092270 A1 | 3/2017 | Newendorp et al. |
| 2017/0092278 A1 | 3/2017 | Evermann et al. |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116177 A1 | 4/2017 | Walia |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132199 A1 | 5/2017 | Vescovi et al. |
| 2017/0140644 A1 | 5/2017 | Hwang et al. |
| 2017/0154033 A1 | 6/2017 | Lee |
| 2017/0154055 A1 | 6/2017 | Dimson et al. |
| 2017/0161018 A1 | 6/2017 | Lemay et al. |
| 2017/0161268 A1 | 6/2017 | Badaskar |
| 2017/0169818 A1 | 6/2017 | VanBlon et al. |
| 2017/0169819 A1 | 6/2017 | Mese et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0199874 A1 | 7/2017 | Patel et al. |
| 2017/0200066 A1 | 7/2017 | Wang et al. |
| 2017/0221486 A1 | 8/2017 | Kurata et al. |
| 2017/0227935 A1 | 8/2017 | Su et al. |
| 2017/0228382 A1 | 8/2017 | Haviv et al. |
| 2017/0230709 A1 | 8/2017 | Van Os et al. |
| 2017/0242653 A1 | 8/2017 | Lang et al. |
| 2017/0243468 A1 | 8/2017 | Dotan-Cohen et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0295446 A1 | 10/2017 | Thagadur Shivappa |
| 2017/0316775 A1 | 11/2017 | Le et al. |
| 2017/0316782 A1 | 11/2017 | Haughay et al. |
| 2017/0323637 A1 | 11/2017 | Naik |
| 2017/0345411 A1 | 11/2017 | Raitio et al. |
| 2017/0346949 A1 | 11/2017 | Sanghavi et al. |
| 2017/0352346 A1 | 12/2017 | Paulik et al. |
| 2017/0352350 A1 | 12/2017 | Booker et al. |

(56) References Cited

U.S. PATENT DOCUMENTS

| | | |
|---|---|---|
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0371885 A1 | 12/2017 | Aggarwal et al. |
| 2018/0007060 A1 | 1/2018 | Leblang et al. |
| 2018/0007538 A1 | 1/2018 | Naik et al. |
| 2018/0012596 A1 | 1/2018 | Piernot et al. |
| 2018/0033431 A1 | 2/2018 | Newendorp et al. |
| 2018/0054505 A1 | 2/2018 | Hart et al. |
| 2018/0060312 A1 | 3/2018 | Won |
| 2018/0063624 A1 | 3/2018 | Boesen |
| 2018/0067914 A1 | 3/2018 | Chen et al. |
| 2018/0090143 A1 | 3/2018 | Saddler et al. |
| 2018/0107945 A1 | 4/2018 | Gao et al. |
| 2018/0108346 A1 | 4/2018 | Paulik et al. |
| 2018/0130470 A1 | 5/2018 | Lemay et al. |
| 2018/0137856 A1 | 5/2018 | Gilbert |
| 2018/0137857 A1 | 5/2018 | Zhou et al. |
| 2018/0144748 A1 | 5/2018 | Leong |
| 2018/0190273 A1 | 7/2018 | Karimli et al. |
| 2018/0196683 A1 | 7/2018 | Radebaugh et al. |
| 2018/0213448 A1 | 7/2018 | Segal et al. |
| 2018/0218735 A1 | 8/2018 | Hunt et al. |
| 2018/0308485 A1 | 10/2018 | Kudurshian et al. |
| 2018/0308486 A1 | 10/2018 | Saddler et al. |
| 2018/0322112 A1 | 11/2018 | Bellegarda et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0330714 A1 | 11/2018 | Paulik et al. |
| 2018/0330723 A1 | 11/2018 | Acero et al. |
| 2018/0330730 A1 | 11/2018 | Garg et al. |
| 2018/0330731 A1 | 11/2018 | Zeitlin et al. |
| 2018/0330737 A1 | 11/2018 | Paulik et al. |
| 2018/0332118 A1 | 11/2018 | Phipps et al. |
| 2018/0336275 A1 | 11/2018 | Graham et al. |
| 2018/0336894 A1 | 11/2018 | Graham et al. |
| 2018/0336905 A1 | 11/2018 | Kim et al. |

FOREIGN PATENT DOCUMENTS

| | | | |
|---|---|---|---|
| CA | 2792412 A1 | 7/2011 | |
| CA | 2666438 C | 6/2013 | |
| CN | 101162153 A | 4/2008 | |
| CN | 101174366 A | 5/2008 | |
| CN | 101179754 A | 5/2008 | |
| CN | 101183525 A | 5/2008 | |
| CN | 101188644 A | 5/2008 | |
| CN | 101228503 A | 7/2008 | |
| CN | 101233741 A | 7/2008 | |
| CN | 101246020 A | 8/2008 | |
| CN | 101247301 A | 8/2008 | |
| CN | 101271689 A | 9/2008 | |
| CN | 101277501 A | 10/2008 | |
| CN | 101281745 A | 10/2008 | |
| CN | 101292282 A | 10/2008 | |
| CN | 101297541 A | 10/2008 | |
| CN | 101325756 A | 12/2008 | |
| CN | 101416471 A | 4/2009 | |
| CN | 101427244 A | 5/2009 | |
| CN | 101448340 A | 6/2009 | |
| CN | 101453498 A | 6/2009 | |
| CN | 101499156 A | 8/2009 | |
| CN | 101500041 A | 8/2009 | |
| CN | 101515952 A | 8/2009 | |
| CN | 101535983 A | 9/2009 | |
| CN | 101547396 A | 9/2009 | |
| CN | 101557432 A | 10/2009 | |
| CN | 101601088 A | 12/2009 | |
| CN | 101604521 A | 12/2009 | |
| CN | 101632316 A | 1/2010 | |
| CN | 101636736 A | 1/2010 | |
| CN | 101673544 A | 3/2010 | |
| CN | 101751387 A | 6/2010 | |
| CN | 101833286 A | 9/2010 | |
| CN | 101847405 A | 9/2010 | |
| CN | 101894547 A | 11/2010 | |
| CN | 101939740 A | 1/2011 | |
| CN | 101951553 A | 1/2011 | |
| CN | 102137193 A | 7/2011 | |
| CN | 102160043 A | 8/2011 | |
| CN | 102201235 A | 9/2011 | |
| CN | 102246136 A | 11/2011 | |
| CN | 202035047 U | 11/2011 | |
| CN | 102282609 A | 12/2011 | |
| CN | 202092650 U | 12/2011 | |
| CN | 102368256 A | 3/2012 | |
| CN | 102405463 A | 4/2012 | |
| CN | 102498457 A | 6/2012 | |
| CN | 102629246 A | 8/2012 | |
| CN | 102682769 A | 9/2012 | |
| CN | 102682771 A | 9/2012 | |
| CN | 102685295 A | 9/2012 | |
| CN | 102693725 A | 9/2012 | |
| CN | 102792320 A | 11/2012 | |
| CN | 102801853 A | 11/2012 | |
| CN | 102870065 A | 1/2013 | |
| CN | 102917004 A | 2/2013 | |
| CN | 102918493 A | 2/2013 | |
| CN | 103035240 A | 4/2013 | |
| CN | 103038728 A | 4/2013 | |
| CN | 103093334 A | 5/2013 | |
| CN | 103135916 A | 6/2013 | |
| CN | 103365279 A | 10/2013 | |
| CN | 103744761 A | 4/2014 | |
| CN | 103795850 A | 5/2014 | |
| CN | 103930945 A | 7/2014 | |
| CN | 104038621 A | 9/2014 | |
| CN | 104090652 A | 10/2014 | |
| CN | 104144377 A | 11/2014 | |
| CN | 104284257 A | 1/2015 | |
| CN | 104423625 A | 3/2015 | |
| CN | 104463552 A | 3/2015 | |
| CN | 104516522 A | 4/2015 | |
| CN | 104854583 A | 8/2015 | |
| CN | 104951077 A | 9/2015 | |
| CN | 105247511 A | 1/2016 | |
| CN | 105264524 A | 1/2016 | |
| CN | 105471705 A | 4/2016 | |
| CN | 107919123 A | 4/2018 | |
| DE | 102008024258 A1 | 11/2009 | |
| DE | 202016008226 U1 | 5/2017 | |
| EP | 1892700 A1 | 2/2008 | |
| EP | 1912205 A2 | 4/2008 | |
| EP | 1939860 A1 | 7/2008 | |
| EP | 1944997 A2 | 7/2008 | |
| EP | 651543 B1 | 9/2008 | |
| EP | 1909263 B1 | 1/2009 | |
| EP | 1335620 B1 | 3/2009 | |
| EP | 2069895 A1 | 6/2009 | |
| EP | 2081185 A1 | 7/2009 | |
| EP | 2094032 A1 | 8/2009 | |
| EP | 2096840 A1 | 9/2009 | |
| EP | 2107553 A1 | 10/2009 | |
| EP | 2109295 A1 | 10/2009 | |
| EP | 1720375 B1 | 7/2010 | |
| EP | 2205010 A1 | 7/2010 | |
| EP | 2309491 A1 | 4/2011 | |
| EP | 2329348 | 6/2011 | |
| EP | 2339576 A2 | 6/2011 | |
| EP | 2400373 A1 | 12/2011 | |
| EP | 2431842 A2 | 3/2012 | |
| EP | 2523188 A1 | 11/2012 | |
| EP | 2551784 A1 | 1/2013 | |
| EP | 2555536 A1 | 2/2013 | |

(56) References Cited

FOREIGN PATENT DOCUMENTS

| | | |
|---|---|---|
| EP | 2575128 A2 | 4/2013 |
| EP | 2632129 A1 | 8/2013 |
| EP | 2669889 A2 | 12/2013 |
| EP | 2683175 A1 | 1/2014 |
| EP | 2733598 A2 | 5/2014 |
| EP | 2760015 A1 | 7/2014 |
| EP | 2801890 A1 | 11/2014 |
| EP | 2801972 A1 | 11/2014 |
| EP | 2849177 A1 | 3/2015 |
| EP | 2930715 A1 | 10/2015 |
| EP | 2938022 A1 | 10/2015 |
| EP | 2940556 A1 | 11/2015 |
| EP | 2950307 A1 | 12/2015 |
| EP | 3035329 A1 | 6/2016 |
| EP | 3224708 A1 | 10/2017 |
| EP | 3246916 A1 | 11/2017 |
| EP | 3300074 A1 | 3/2018 |
| EP | 2983065 B1 | 8/2018 |
| FR | 2911201 A1 | 7/2008 |
| GB | 2445436 A | 7/2008 |
| GB | 2445667 A | 7/2008 |
| JP | 01-010317 A | 1/1989 |
| JP | 2006-188098 A | 7/2006 |
| JP | 2008-009120 A | 1/2008 |
| JP | 2008-21002 A | 1/2008 |
| JP | 2008-26381 A | 2/2008 |
| JP | 2008-39928 A | 2/2008 |
| JP | 2008-58813 A | 3/2008 |
| JP | 2008-064687 A | 3/2008 |
| JP | 2008-90545 A | 4/2008 |
| JP | 2008-97003 A | 4/2008 |
| JP | 2008-134949 A | 6/2008 |
| JP | 2008-158510 A | 7/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |
| JP | 2008-269480 A | 11/2008 |
| JP | 2008-271481 A | 11/2008 |
| JP | 2008-275731 A | 11/2008 |
| JP | 2008-299221 A | 12/2008 |
| JP | 2009-2850 A | 1/2009 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-069062 A | 4/2009 |
| JP | 2009-98490 A | 5/2009 |
| JP | 2009-110300 A | 5/2009 |
| JP | 2009-134409 A | 6/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-223840 A | 10/2009 |
| JP | 2009-294913 A | 12/2009 |
| JP | 2009-294946 A | 12/2009 |
| JP | 2009-543166 A | 12/2009 |
| JP | 2010-66519 A | 3/2010 |
| JP | 2010-78979 A | 4/2010 |
| JP | 2010-108378 A | 5/2010 |
| JP | 2010-518475 A | 5/2010 |
| JP | 2010-518526 A | 5/2010 |
| JP | 2010-146347 A | 7/2010 |
| JP | 2010-157207 A | 7/2010 |
| JP | 2010-166478 A | 7/2010 |
| JP | 2010-205111 A | 9/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2011-250027 A | 12/2011 |
| JP | 2012-014394 A | 1/2012 |
| JP | 2012-33997 A | 2/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-518847 A | 8/2012 |
| JP | 2013-37688 A | 2/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013/140520 A | 7/2013 |
| JP | 2013-527947 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2014-10688 A | 1/2014 |
| JP | 2014-026629 A | 2/2014 |
| JP | 2014-60600 A | 4/2014 |
| JP | 2014-72586 A | 4/2014 |
| JP | 2014-077969 A | 5/2014 |
| JP | 2014/109889 A | 6/2014 |
| JP | 2014-124332 A | 7/2014 |
| JP | 2014-145842 A | 8/2014 |
| JP | 2014-150323 A | 8/2014 |
| JP | 2014-222514 A | 11/2014 |
| JP | 2015-8001 A | 1/2015 |
| JP | 2015-501022 A | 1/2015 |
| JP | 2015-41845 A | 3/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-528140 A | 9/2015 |
| JP | 2015-528918 A | 10/2015 |
| JP | 2016-119615 A | 6/2016 |
| KR | 10-0801227 B1 | 2/2008 |
| KR | 10-0810500 B1 | 3/2008 |
| KR | 10-2008-0033070 A | 4/2008 |
| KR | 10-819928 B1 | 4/2008 |
| KR | 10-2008-0049647 A | 6/2008 |
| KR | 10-2008-0059332 A | 6/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |

(56) References Cited

FOREIGN PATENT DOCUMENTS

| | | |
|---|---|---|
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-1178310 B1 | 8/2012 |
| KR | 10-2012-0120316 A | 11/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0031283 A | 3/2014 |
| KR | 10-2014-0033574 A | 3/2014 |
| KR | 10-2014-0147557 A | 12/2014 |
| KR | 10-2015-0043512 A | 4/2015 |
| KR | 10-2016-0010523 A | 1/2016 |
| RU | 2349970 C2 | 3/2009 |
| RU | 2353068 C2 | 4/2009 |
| RU | 2364917 C2 | 8/2009 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |
| TW | 201227715 A1 | 7/2012 |
| TW | 201245989 A1 | 11/2012 |
| TW | 201312548 A1 | 3/2013 |
| WO | 2004/003765 A1 | 1/2004 |
| WO | 2008/030970 A2 | 3/2008 |
| WO | 2008/071231 A1 | 6/2008 |
| WO | 2008/085742 A2 | 7/2008 |
| WO | 2008/098900 A2 | 8/2008 |
| WO | 2008/109835 A2 | 8/2008 |
| WO | 2008/120036 A1 | 10/2008 |
| WO | 2008/130095 A1 | 10/2008 |
| WO | 2008/140236 A1 | 11/2008 |
| WO | 2008/142472 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/034686 A1 | 3/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/054373 A2 | 5/2010 |
| WO | 2010/075623 A1 | 7/2010 |
| WO | 2010/100937 A1 | 9/2010 |
| WO | 2010/141802 A1 | 12/2010 |
| WO | 2011/057346 A1 | 5/2011 |
| WO | 2011/060106 A1 | 5/2011 |
| WO | 2011/088053 A2 | 7/2011 |
| WO | 2011/093025 A1 | 8/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2011/088053 A3 | 1/2012 |
| WO | 2012/019637 A2 | 2/2012 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/163113 A1 | 10/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/028797 A1 | 2/2014 |
| WO | 2014/031505 A1 | 2/2014 |
| WO | 2014/047047 A1 | 3/2014 |
| WO | 2014/066352 A1 | 5/2014 |
| WO | 2014/070872 A2 | 5/2014 |
| WO | 2014/078965 A1 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/200728 A1 | 12/2014 |
| WO | 2014/204659 A2 | 12/2014 |
| WO | 2015/018440 A1 | 2/2015 |
| WO | 2015/029379 A1 | 3/2015 |
| WO | 2015/030796 A1 | 3/2015 |
| WO | 2015/041892 A1 | 3/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/175354 A1 | 11/2016 |
| WO | 2016/209444 A1 | 12/2016 |
| WO | 2017/044260 A1 | 3/2017 |
| WO | 2017/044629 A1 | 3/2017 |
| WO | 2017/053311 A1 | 3/2017 |

OTHER PUBLICATIONS

Notice of Allowance received for Chinese Patent Application No. 201480030710.7, dated Jun. 6, 2019, 2 pages (1 page of English Translation and 1 page of Official Copy).
Decision to Refuse received for European Patent Application No. 14736106.7, mailed on Feb. 19, 2019, 27 pages.
Minutes of the oral proceedings received for European Patent Application No. 14736106.7, mailed on Feb. 19, 2019, 4 pages.
Notice of Acceptance received for Australian Patent Application No. 2017258871, dated Jan. 22, 2019, 3 pages.
"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

(56) References Cited

OTHER PUBLICATIONS

"Galaxy S7: How to Adjust Screen Timeout & Lock Screen Timeout", Available online at:—"https://www.youtube.com/watch?v=n6e1WKUS2ww", Jun. 9, 2016, 1 page.
"Hey Google: How to Create a Shopping List with Your Google Assistant", Available online at:—https://www.youtube.com/watch?v=w9NCsElax1Y, May 25, 2018, 1 page.
"How to Enable Google Assistant on Galaxy 57 and other Android Phones (No Root)", Available online at:—"https://www.youtube.com/watch?v=HeklQbWyksE", Mar. 20, 2017, 1 page.
"How to Use Ok Google Assistant Even Phone is Locked", Available online at:—"https://www.youtube.com/watch?v=9B_gP4j_SP8", Mar. 12, 2018, 1 page.
"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.
"Ask Alexa—Things That Are Smart Wiki", Available online at <Url:http://thingsthataresmart.wiki/index.php?title=Ask_Alexa&oldid=4283>, [retrieved from internet on Aug. 2, 2017], Jun. 8, 2016, pp. 1-31.
"DIRECTV™ Voice", Now Part of the DIRECTTV Mobile App for Phones, Sep. 18, 2013, 5 pages.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Anania, Peter, "Amazon Echo with Home Automation (Smartthings)", Available online at https://www.youtube.com/watch?v=LMW6aXmsWNE, Dec. 20, 2015, 1 page.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).
Ashbrook, Daniel L.., "Enabling Mobile Microinteractions", Retrieved from the Internet: URL: "http://danielashbrook.com/wp-content/uploads/2012/06/2009-Ashbrook-Thesis.pdf", May 2010, 186 pages.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—VII Jornadas En Tecnologia Del Habla and Iii Iberiansl Tech Workshop, Nov. 21, 2012, pp. 1-10.
Castleos, "Whole House Voice Control Demonstration", available online at : https://www.youtube.com/watch?v=9SRCoxrZ_W4, Jun. 2, 2012, 26 pages.
Deedeevuu, "Amazon Echo Alarm Feature", Available online at https://www.youtube.com/watch?v=fdjU8eRLk7c, Feb. 16, 2015, 1 page.
EARTHLING1984, "Samsung Galaxy Smart Stay Feature Explained", Available online at:—"https://www.youtube.com/watch?v=RpjBNtSjupl", May 29, 2013, 1 page.
Filipowicz, Luke, "How to use the Quick Type Keyboard in iOS 8", available online at <https://www.imore.com/comment/568232>, Oct. 11, 2014, pp. 1-17.
Finkel et al., "Joint Parsing and Named Entity Recognition", Human Language Technologies: The 2009 Annual Conference of the North American Chapter of the ACL, Jun. 2009, pp. 326-334.
Gomez et al., "Mouth Gesture and Voice Command Based Robot Command Interface", IEEE International Conference on Robotics and Automation, May 12-17, 2009, pp. 333-338.
Google Developers, "Voice Search in Your App", Available online at:—https://www.youtube.com/watch?v=PS1FbB5qWEI, Nov. 12, 2014, 1 page.

Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
INews and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.
Jonsson et al, "Proximity-based Reminders Using Bluetooth", 2014 IEEE International Conference on Pervasive Computing and Communications Demonstrations, 2014, pp. 151-153.
Karn, Ujjwal, "An Intuitive Explanation of Convolutional Neural Networks", The Data Science Blog, Aug. 11, 2016, 23 pages.
Liou et al., "Autoencoder for Words", Neurocomputing, vol. 139, Sep. 2014, pp. 84-96.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Manning et al., "Introduction to Information Retrieval", New York, Cambridge University Press, 2008, 504 pages.
Marketing Land, "Amazon Echo: Play Music", Online Available at: <https://www.youtube.com/watch?v=A7V5NPbsXi4>, Apr. 27, 2015, 3 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Morrison, Jonathan, "iPhone 5 Siri Demo", Online Available at <https://www.youtube.com/watch?v=_wHWwG5lhWc>, Sep. 21, 2012, 3 pages.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (DEIM 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Nozawa, Naoki et al., "iPhone 4S Perfect Manual", vol. 1, First Edition, Nov. 11, 2011, 5 pages (Official Copy Only) (See Communication under 37 CFR § 1.98(a) (3)).
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (Emnlp), Oct. 25-29, 2014, pp. 1532-1543.
Perlow, Jason, "Alexa Loop Mode With Playlist for Sleep Noise", Online Available at: <https://www.youtube.com/watch?v=nSkSuXziJSg>, Apr. 11, 2016, 3 pages.
Powell, Josh, "Now You See Me . . . Show/Hide Performance", available at http://www.learningjguery.com/2010/05/now-you-see-me-showhide-performance, May 4, 2010, 3 pages.
IOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.

(56) References Cited

OTHER PUBLICATIONS

Routines, "SmartThings Support", Available online at <https://web.archive.org/web/20151207165701/https://support.smartthings.com/hc/en-us/articles/205380034-Routines>, 2015, 2 pages.
Samsung, "SGH-a885 Series—Portable Quad-Band Mobile Phone-User Manual", Retrieved from the Internet: URL: "http://web.archive.org/web/20100106113758/http://www.comparecellular.com/images/phones/userguide1896.pdf", Jan. 1, 2009, 144 pages.
Seehafer, Brent, "Activate google assistant on Galaxy S7 with screen off", Available online at:—"https://productforums.google.com/forum/#!topic/websearch/lp3qIGBHLVI", Mar. 8, 2017, 4 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", INTERSPEECH 2012, ISCA's Annual Conference, Sep. 9-13, 2012, pp. 194-197.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Vodafone Deutschland, "Samsung Galaxy S3 Tastatur Spracheingabe", Available online at—"https://www.youtube.com/watch?v=6kOd6Gr8uFE", Aug. 22, 2012, 1 page.
X.AI, "How it Works", May 2016, 6 pages.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al., "A Scalable Approach to Using DNN-Derived Features in GMM-HMM Based Acoustic Modeling for LVCSR", InInterspeech, 2013, pp. 104-108.
Yates, Michael C., "How can I exit Google Assistant after i'm finished with it", Available online at:—"https://productforums.google.com/forum/#!msg/phone-by-google/faECnR2RJwA/gKNtOkQgAQAJ", Jan. 11, 2016, 2 pages.
Young et al., "The Hidden Information State model: A practical framework for POMDP-based spoken dialogue management", Computer Speech & Language, vol. 24, Issue 2, 2010, pp. 150-174.
Zangerle et al., "Recommending #-Tag in Twitter", Proceedings of the Workshop on Semantic Adaptive Socail Web, 2011, pp. 1-12.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Advisory Action received for U.S. Appl. No. 14/298,714, dated Aug. 23, 2017, 4 pages.
Alfred App, "Alfred", available at <http://www.alfredapp.com/>, retrieved on Feb. 8, 2012, 5 pages.
API.AI, "Android App Review—Speaktoit Assistant", Available at <https://www.youtube.com/watch?v=myE498nyfGw>, Mar. 30, 2011, 3 pages.
Apple Computer, "Knowledge Navigator", published by Apple Computer no later than 2008, as depicted in Exemplary Screenshots from video entitled 'Knowledge Navigator', 2008, 7 pages.
Apple, "VoiceOver", available at <http://www.apple.com/accessibility/voiceover/>, May 19, 2014, 3 pages.
Berry et al., "PTIME: Personalized Assistance for Calendaring", ACM Transactions on Intelligent Systems and Technology, vol. 2, No. 4, Article 40, Jul. 2011, pp. 1-22.

Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Butcher, Mike, "EVI Arrives in Town to go Toe-to-Toe with Siri", TechCrunch, Jan. 23, 2012, 2 pages.
Chamberlain, Kim, "Quick Start Guide Natural Reader", available online at <http://atrc.colostate.edu/files/guickstarts/Natural_Reader_Quick_Start_Guide.>, Apr. 2008, 5 pages.
Chen, Yi, "Multimedia Sin Finds and Plays Whatever You Ask for", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Elliott et al., "Annotation Suggestion and Search for Personal Multimedia Objects on the Web", Civr, Jul. 7-9, 2008, pp. 75-84.
Erol et al., "Multimedia Clip Generation From Documents for Browsing on Mobile Devices", IEEE Transactions on Multimedia, vol. 10, No. 5, Aug. 2008, 13 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Final Office Action received for U.S. Appl. No. 14/298,714, dated Apr. 21, 2017, 32 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Gannes, Liz, "Alfred App Gives Personalized Restaurant Recommendations", AllThingsD, Jul. 18, 2011, pp. 1-3.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., Unpublished U.S. Appl. No. 61/657,744, filed Jun. 9, 2012 titled "Automatically Adapting User Interfaces for Hands-Free Interaction", 40 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Headset Button Controller v7.3 APK Full APP Download for Android, Blackberry, iPhone, Jan. 27, 2014, 11 pages.

(56) References Cited

OTHER PUBLICATIONS

Hear voice from Google translate, Available on URL:https://www.youtube.com/watch?v=18AvMhFqD28, Jan. 28, 2011, 1 page.
id3.org, "id3v2.4.0-Frames", available at <http://id3.org/id3v2.4.0-frames?action=print>, retrieved on Jan. 22, 2015, 41 pages.
Interactive Voice, available at <http://www.helloivee.com/company/>, retrieved on Feb. 10, 2014, 2 pages.
International Preliminary Report on Patentability received for PCT Patent Application No. PCT/US2014/040394, dated Dec. 23, 2015, 7 pages.
International Search Report and Written Opinion received for PCT Patent Application No. PCT/US2014/040394, dated Aug. 8, 2014, 11 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jouvet et al., "Evaluating Grapheme-to-phoneme Converters in Automatic Speech Recognition Context", IEEE,, 2012,, pp. 4821-4824.
Kane et al., "Slide Rule: Making Mobile Touch Screens Accessible to Blind People Using Multi-Touch Interaction Techniques", ASSETS, Oct. 13-15, 2008, pp. 73-80.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Knownav, "Knowledge Navigator", YouTube Video available at <http://www.youtube.com/watch?v=QRH8eimU_20>, Apr. 29, 2008, 1 page.
Lewis, Cameron, "Task Ave for iPhone Review", Mac Life, Available at <http://www.maclife.com/article/reviews/task_ave_iphone_review>, Mar. 3, 2011, 5 pages.
MacTech, "KeyStrokes 3.5 for Mac OS X Boosts Word Prediction", available at <http://www.mactech.com/news/?p=1007129>, retrieved on Jan. 7, 2008, 3 pages.
Martins et al., "Extracting and Exploring the Geo-Temporal Semantics of Textual Resources", Semantic Computing, IEEE International Conference, 2008, pp. 1-9.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Microsoft, "Turn On and Use Magnifier", available at <http://www.microsoft.com/windowsxp/using/accessibility/magnifierturnon.mspx>, retrieved on Jun. 6, 2009.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Morton, Philip, "Checking If an Element Is Hidden", StackOverflow, Available at <http://stackoverflow.com/guestions/178325/checking-if-an-element-is-hidden>, Oct. 7, 2008, 12 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Naone, Erica, "Trio: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Non-Final Office Action received for U.S. Appl. No. 14/298,714, dated Mar. 13, 2018, 36 pages.
Non-Final Office Action received for U.S. Appl. No. 14/298,714, dated May 5, 2016, 28 pages.
Non-Final Office Action received for U.S. Appl. No. 14/298,714, dated Nov. 16, 2016, 33 pages.
Notice of Acceptance received for Australian Patent Application No. 2014278592, dated Aug. 24, 2017, 3 pages.
Notice of Allowance received for Japanese Patent Application No. 2016518360, dated Nov. 17, 2017, 4 pages.
Notice of Allowance received for Korean Patent Application No. 10-2015-7033712, dated May 15, 2017, 4 pages.
Notice of Allowance received for Korean Patent Application No. 10-2017-7023390, dated Aug. 20, 2018, 4 pages.
Notice of Allowance received for U.S. Appl. No. 14/298,714, dated Oct. 10, 2018, 11 pages.
Office Action received for Australian Patent Application No. 2017258871, dated May 23, 2018, 3 pages.
Office Action received for Australian Patent Application No. 2014278592, dated Aug. 8, 2017, 6 pages.
Office Action received for Australian Patent Application No. 2014278592, dated Aug. 25, 2016, 3 pages.
Office Action received for Australian Patent Application No. 2014278592, dated Jun. 7, 2017, 4 pages.
Office Action received for Chinese Patent Application No. 201480030710.7, dated May 2, 2018, 13 pages.
Office Action received for European Patent Application No. 14736106.7, dated Jun. 30, 2017, 6 pages.
Office Action received for Japanese Patent Application No. 2016518360, dated May 29, 2017, 4 pages.
Office Action received for Japanese Patent Application No. 2016518360, dated Nov. 18, 2016, 5 pages.
Office Action received for Japanese Patent Application No. 2017-214146, dated Aug. 31, 2018, 6 pages.
Office Action received for Korean Patent Application No. 10-2015-7033712, dated Aug. 17, 2016, 9 pages.
Office Action received for Korean Patent Application No. 10-2017-7023390, dated Nov. 14, 2017, 7 pages.
Osxdaily, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Phoenix Solutions, Inc., "Declaration of Christopher Schmandt Regarding the MIT Galaxy System", West Interactive Corp., A Delaware Corporation, Document 40, Jul. 2, 2010, 162 pages.
Reddi, "The Parser".
Sarawagi, Sunita, "CRF Package Page", available at <http://crf.sourceforge.net/>, retrieved on Apr. 6, 2011, 2 pages.
Simonite, Tom, "One Easy Way to Make Siri Smarter", Technology Review, Oct. 18, 2011, 2 pages.
Speaker Recognition, Wikipedia, The Free Enclyclopedia, Nov. 2, 2010, 4 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.

(56) References Cited

OTHER PUBLICATIONS

Summons to Attend Oral Proceedings received for European Patent Application No. 14736106.7, mailed on May 15, 2018, 12 pages.
Summons to Attend Oral Proceedings received for European Patent Application No. 14736106.7, mailed on May 22, 2018, 1 page.
Sundaram et al., "Latent Perceptual Mapping with Data-Driven Variable-Length Acoustic Units for Template-Based Speech Recognition", ICASSP 2012, Mar. 2012, pp. 4125-4128.
TextnDrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakToIt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Vlingo InCar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
VoiceAssist, "Send Text, Listen to and Send E-Mail by Voice", YouTube Video, Available online at <http://www.youtube.com/watch?v=0tEU61nHHA4>, Jul. 30, 2009, 1 page.
VoiceontheGo, "Voice on the Go (BlackBerry)", YouTube Video, available online at <http://www.youtube.com/watch?v=pJqpWgQS98w>, Jul. 27, 2009, 1 page.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Youtube, "New bar search for Facebook", available at "https://www.youtube.com/watch?v=vwgN1WbvCas", 2 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Notice of Allowance received for Japanese Patent Application No. 2017-214146, dated Mar. 18, 2019, 4 pages (1 page of English Translation and 3 pages of Official Copy).

\* cited by examiner

DEVICE, METHOD, AND GRAPHICAL USER INTERFACE FOR ENABLING CONVERSATION PERSISTENCE ACROSS TWO OR MORE INSTANCES OF A DIGITAL ASSISTANT

CROSS-REFERENCE TO RELATED APPLICATION

This application is a continuation of U.S. Ser. No. 14/298,714, filed on Jun. 6, 2014, entitled DEVICE, METHOD, AND GRAPHICAL USER INTERFACE FOR ENABLING CONVERSATION PERSISTENCE ACROSS TWO OR MORE INSTANCES OF A DIGITAL ASSISTANT, which claims priority from U.S. Provisional Ser. No. 61/832,898, filed on Jun. 9, 2013, entitled DEVICE, METHOD, AND GRAPHICAL USER INTERFACE FOR ENABLING CONVERSATION PERSISTENCE ACROSS TWO OR MORE INSTANCES OF A DIGITAL ASSISTANT, which are hereby incorporated by reference in their entirety for all purposes.

TECHNICAL FIELD

The disclosed embodiments relate generally to digital assistant systems, and more specifically, to context and/or conversation persistence.

BACKGROUND

Just like human personal assistants, digital assistant systems can perform requested tasks and provide requested advice, information, or services. A digital assistant system's ability to fulfill a user's request is dependent on the digital assistant system's correct comprehension of the request or instructions. Recent advances in natural language processing have enabled users to interact with digital assistant systems using natural language, in spoken or textual forms. Such digital assistant systems can interpret the user's input to infer the user's intent, translate the inferred intent into actionable tasks and parameters, execute operations or deploy services to perform the tasks, and produce output that is intelligible to the user. Ideally, the output produced by a digital assistant system should fulfill the user's intent expressed during the natural language interaction between the user and the digital assistant system.

The ability of a digital assistant system to produce satisfactory responses to user requests depends on the natural language processing, knowledge base, and artificial intelligence available to the digital assistant system. Moreover, while numerous third party systems and services currently exist, there is no efficient means for a digital assistant system to enable context and/or conversation persistence across two or more non-continuous instances of a digital assistant.

SUMMARY

The embodiments disclosed herein provide methods, devices, systems, and non-transitory computer readable storage media for operating a digital assistant so as to enable context and/or conversation persistence.

Accordingly, some embodiments provide a method of operating a digital assistant, performed at an electronic device having a display, one or more processors and memory storing one or more programs for execution by the one or more processors, the method comprising displaying a first dialogue in a first instance of a digital assistant user interface. In response to a request to display a user interface different from the digital assistant user interface, the method includes displaying the user interface different from the digital assistant user interface. In response to a request to invoke the digital assistant, the method further includes displaying a second instance of the digital assistant user interface, including displaying a second dialogue in the second instance of the digital assistant user interface, where the first dialogue remains available for display in the second instance of the digital assistant user interface.

In some embodiments, the method further comprising, prior to displaying the first instance of the digital assistant user interface: detecting a prior request to invoke the digital assistant; detecting a speech input; and providing a transcription of the speech input, where the first dialogue includes the transcription of the speech input.

In some embodiments, the method further comprising, in response to the request to display the user interface different from the digital assistant user interface, ceasing to display the digital assistant user interface.

In some embodiments, the method further comprising: displaying a first affordance in the second instance of the digital assistant user interface; detecting a user selection of the first affordance; and in response to the user selection of the first affordance, displaying at least a portion of the first dialogue in the second instance of the digital assistant user interface.

In some embodiments, the method further comprising, displaying at least a portion of the first dialogue in the second instance of the digital assistant user interface.

In some embodiments, the method further comprising: displaying a second affordance corresponding to a respective sub-portion of the first dialogue; detecting a user selection of the second affordance; and in response to the user selection of the second affordance, ceasing to display at least some of the respective sub-portion of the first dialogue.

In some embodiments, the method further comprising, in response to the user selection of the second affordance, excluding context data associated with the sub-portion of the first dialogue from a context history of the digital assistant.

In some embodiments, the method further comprising: storing context data associated with the first dialogue in a context history of the digital assistant; determining whether the request to invoke the digital assistant satisfies a first predetermined condition; and in accordance with a determination that the request to invoke the digital assistant satisfies the first predetermined condition, invoking the stored context data while displaying the second instance of the digital assistant user interface.

In some embodiments, the first predetermined condition is satisfied when the request to invoke the digital assistant is received within a predetermined context expiration time period.

In some embodiments, the method further comprising, deleting the context data associated with the first dialogue from the context history upon expiration of the predetermined context expiration time period.

In some embodiments, the first predetermined condition is not satisfied when the electronic device is locked.

In some embodiments, the second dialogue includes a user query to the digital assistant, and the method further comprises: storing context data associated with the first dialogue in a context history of the digital assistant; and while displaying the second instance of the digital assistant user interface, in accordance with a determination that a predetermined context condition has been satisfied, responding to the user query to the digital assistant using the stored context data while determining a response to the user query.

In some embodiments, the predetermined context condition is satisfied when, in response to a user action performed during display of the second instance of the digital assistant user interface, at least a portion of the first dialogue is displayed in the second instance of the digital assistant user interface.

In some embodiments, the method further comprising: determining whether the request to invoke the digital assistant satisfies a second predetermined condition; in accordance with a determination that the request to invoke the digital assistant satisfies the second predetermined condition, displaying the second instance of the digital assistant user interface, including displaying the second dialogue in the second instance of the digital assistant user interface, wherein the first dialogue remains available for display in the second instance of the digital assistant user interface; and in accordance with a determination that the request to invoke the digital assistant does not satisfy the second predetermined condition, displaying the second instance of the digital assistant user interface without making the first dialogue available for display in the second instance of the digital assistant user interface.

In some embodiments, the second predetermined condition is satisfied when the request to invoke the digital assistant is received within a predetermined conversation expiration time period.

In some embodiments, the method further comprising: storing context data associated with the first dialogue in a context history of the digital assistant; determining whether the request to invoke the digital assistant satisfies a first predetermined condition, wherein the first predetermined condition is satisfied when the request to invoke the digital assistant is received within a predetermined context expiration time period; in accordance with a determination that the request to invoke the digital assistant satisfies the first predetermined condition, invoking the stored context data while displaying the second instance of the digital assistant user interface; and deleting the context data associated with the first dialogue from the context history upon expiration of the predetermined context expiration time period, where the predetermined context expiration time period is shorter than the predetermined conversation expiration time period.

In some embodiments, the second predetermined condition is not satisfied when the electronic device is locked.

In some embodiments, the second predetermined condition comprises a condition that is satisfied when the request to invoke the digital assistant is received prior to detection of a predetermined number of user interactions with the electronic device after displaying the first dialogue.

In some embodiments, the request to display the user interface different from the digital assistant user interface corresponds to a user input to display the user interface different from the digital assistant user interface.

In some embodiments, the user input to display the user interface different from the digital assistant user interface corresponds to a request to launch an application.

In some embodiments, the user interface different from the digital assistant user interface does not correspond to the digital assistant.

In some embodiments, the user interface different from the digital assistant user interface is associated with an application distinct from the digital assistant.

Some embodiments provide a method of operating a digital assistant, performed at two or more electronic devices each having a display, one or more processors and memory storing one or more programs for execution by the one or more processors, the method comprising, displaying a first dialogue in a first user interface of a digital assistant at a first device. At a second device different from the first device, the method further comprising, displaying a second dialogue in a second user interface of the digital assistant in response to a request to invoke the digital assistant on the second device, where the first dialogue is available for display in the second user interface.

In accordance with some embodiments, a non-transitory computer readable storage medium has stored therein instructions, which, when executed by an electronic device, cause the device to perform the operations of any of the methods described above. In accordance with some embodiments, an electronic device includes one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a memory, and one or more processors to execute one or more programs stored in the memory, the graphical user interface comprising user interfaces displayed in accordance with any of the methods described above. In accordance with some embodiments, an electronic device includes means for performing the operations of any of the methods described above. In accordance with some embodiments, an information processing apparatus, for use in an electronic device includes means for performing the operations of any of the methods described above.

In accordance with some embodiments, an electronic device includes a touch screen display unit configured to display a user interface and to receive touch input and a sound receiving unit configured to receive sound input. The electronic device also includes a processing unit coupled to the touch screen display unit and the sound receiving unit. The processing unit is configured to enable display of a first dialogue in a first instance of a digital assistant user interface on the touch screen display unit. In response to a request to enable display of a user interface different from the digital assistant user interface, the processing unit is configured to enable display of the user interface different from the digital assistant user interface. In response to a request to invoke the digital assistant, the processing unit is further configured to enable display of a second instance of the digital assistant user interface on the touch screen display unit, including enabling display of a second dialogue in the second instance of the digital assistant user interface, where the first dialogue remains available for display in the second instance of the digital assistant user interface.

In accordance with some embodiments, a system includes two or more electronic devices. A first electronic device includes a touch screen display unit configured to display a user interface and to receive touch input, and a sound receiving unit configured to receive sound input. The first electronic device also includes a processing unit coupled to the touch screen display unit and the sound receiving unit. A second electronic device includes a touch screen display unit configured to display a user interface and to receive touch input and a sound receiving unit configured to receive sound input. The second electronic device also includes a processing unit coupled to the touch screen display unit and the sound receiving unit. The processing unit of the first electronic device is configured to enable display of a first dialogue in a first user interface of a digital assistant on the touch screen display unit. In response to a request to invoke the digital assistant on the second electronic device, the processing unit of the second electronic device is configured to enable display of a second dialogue in a second user interface of the digital assistant on the touch screen display unit, where the first dialogue is available for display in the second user interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numerals refer to corresponding parts throughout the drawings.

DESCRIPTION OF EMBODIMENTS

Figure 1:
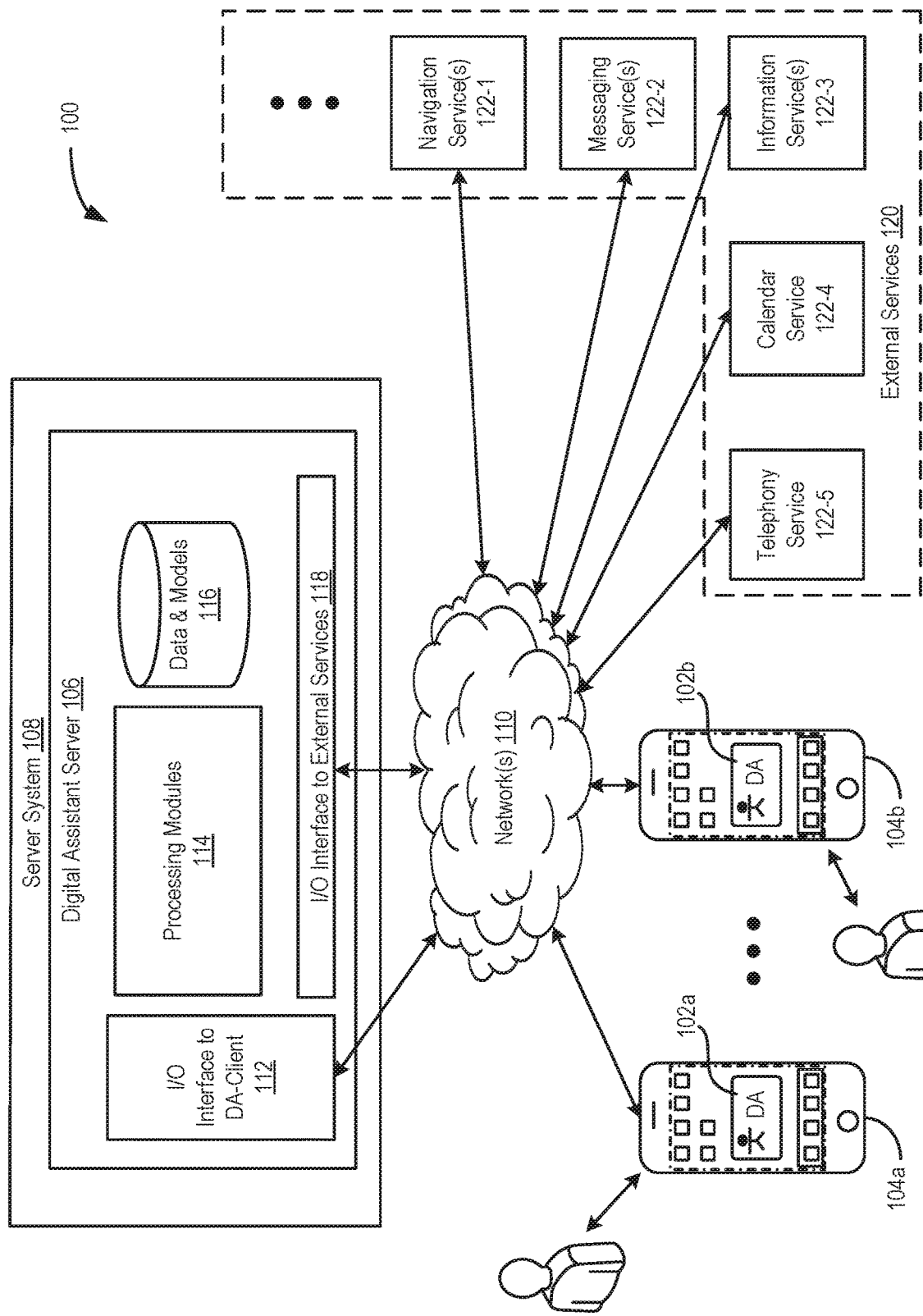
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

Specifically, a digital assistant (DA) is capable of accepting a user request at least partially in the form of a natural language command, request, statement, narrative, and/or inquiry. Typically, the user request seeks either an informational answer or performance of a task by the digital assistant. A satisfactory response to the user request is either provision of the requested informational answer, performance of the requested task, or a combination of the two. For example, a user may ask the digital assistant a question, such as "Where am I right now?" Based on the user's current location, the digital assistant may answer, "You are in Central Park." The user may also request the performance of a task, for example, "Please remind me to call Mom at 4 PM today." In response, the digital assistant may acknowledge the request and then create an appropriate reminder item in the user's electronic schedule. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms (e.g., as text, alerts, music, videos, animations, etc.).

An example of a digital assistant is described in Applicant's U.S. Utility application Ser. No. 12/987,982 for "Intelligent Automated Assistant," filed Jan. 10, 2011, the entire disclosure of which is incorporated herein by reference.

As shown in FIG. 1, in some embodiments, a digital assistant is implemented according to a client-server model. The digital assistant includes a client-side portion 102a, 102b (hereafter "DA-client 102") executed on a user device 104a, 104b, and a server-side portion 106 (hereafter "DA-server 106") executed on a server system 108. DA-client 102 communicates with DA-server 106 through one or more networks 110. DA-client 102 provides client-side functionalities such as user-facing input and output processing and communications with DA-server 106. DA server 106 provides server-side functionalities for any number of DA-clients 102 each residing on a respective user device 104.

In some embodiments, DA-server 106 includes a client-facing I/O interface 112, one or more processing modules 114, data and models 116, and an I/O interface to external services 118. The client-facing I/O interface facilitates the client-facing input and output processing for digital assistant server 106. One or more processing modules 114 utilize data and models 116 to determine the user's intent based on natural language input and perform task execution based on inferred user intent. In some embodiments, DA-server 106 communicates with external services 120 through the network(s) 110 for task completion or information acquisition. The I/O interface to external services 118 facilitates such communications.

Examples of user device 104 include, but are not limited to, a handheld computer, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices. More details on user device 104 are provided in reference to an exemplary user device 104 shown in FIG. 2.

Examples of the communication network(s) 110 include local area networks ("LAN") and wide area networks ("WAN") such as the Internet. Communication network(s) 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Although the digital assistant shown in FIG. 1 includes both a client-side portion (e.g., DA-client 102) and a server-side portion (e.g., DA-server 106), in some embodiments, the functions of a digital assistant is implemented as a standalone application installed on a user device. In addition, the division of functionalities between the client and server portions of the digital assistant can vary in different embodiments. For example, in some embodiments, DA-client 102 is a thin-client that provides only user-facing input and output processing functions, and delegates all other functionalities of the digital assistant to a backend server.

Figure 2:
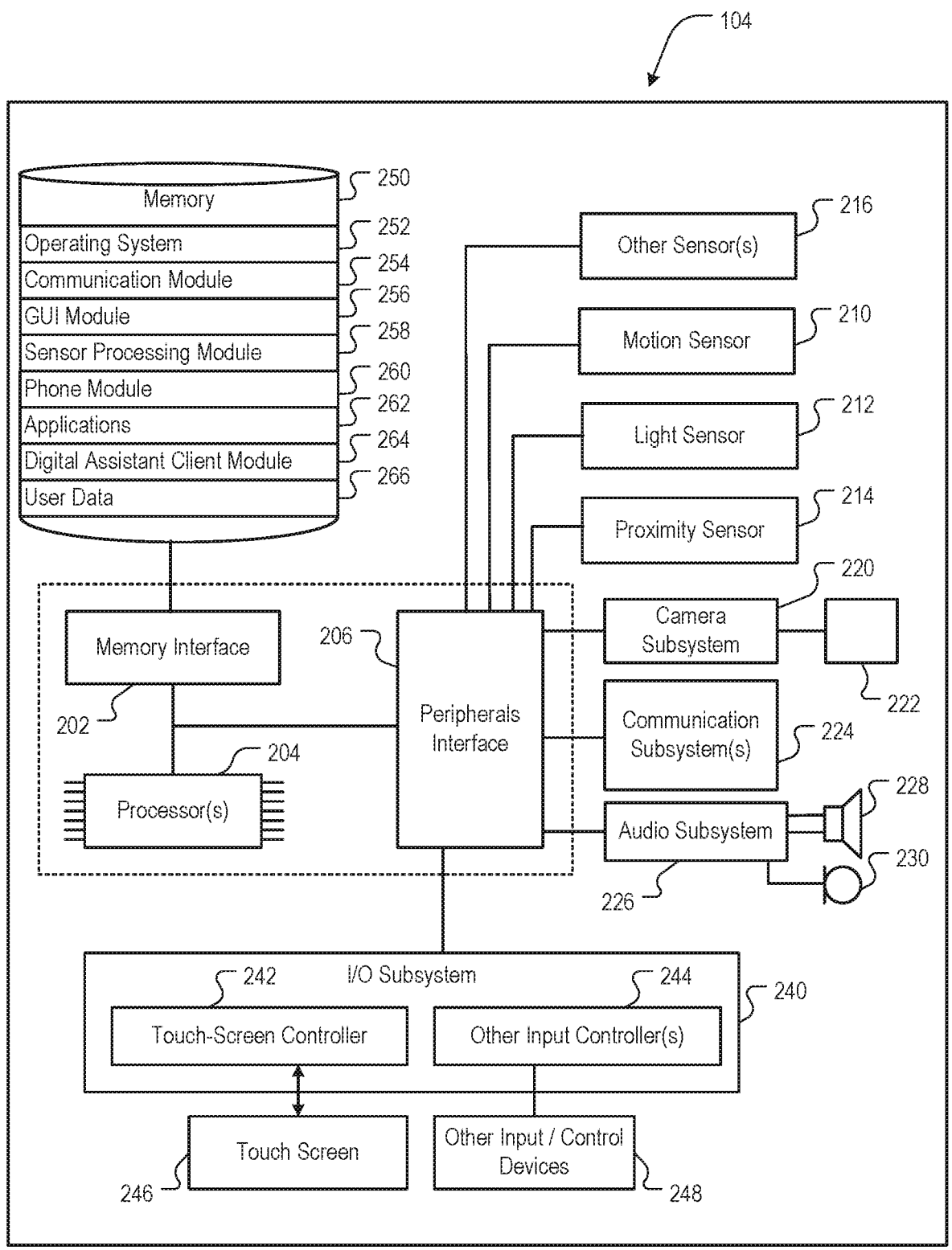
FIG. 2 is a block diagram illustrating a digital assistant client system in accordance with some embodiments.

FIG. 2 is a block diagram of a user-device 104 in accordance with some embodiments. User device 104 includes a memory interface 202, one or more processors 204, and a peripherals interface 206. The various components in user device 104 are coupled by one or more communication buses or signal lines. User device 104 includes various sensors, subsystems, and peripheral devices that are coupled to the peripherals interface 206. The sensors, subsystems, and peripheral devices gather information and/or facilitate various functionalities of user device 104.

For example, a motion sensor 210, a light sensor 212, and a proximity sensor 214 are coupled to the peripherals interface 206 to facilitate orientation, light, and proximity sensing functions. One or more other sensors 216, such as a positioning system (e.g., a GPS receiver), a temperature sensor, a biometric sensor, a gyroscope, a compass, an accelerometer, and the like, are also connected to peripherals interface 206, to facilitate related functionalities.

In some embodiments, a camera subsystem 220 and an optical sensor 222 are utilized to facilitate camera functions, such as taking photographs and recording video clips. Communication functions are facilitated through one or more wired and/or wireless communication subsystems 224, which can include various communication ports, radio frequency receivers and transmitters, and/or optical (e.g., infrared) receivers and transmitters. An audio subsystem 226 is coupled to speakers 228 and a microphone 230 to facilitate voice-enabled functions, such as voice recognition, voice replication, digital recording, and telephony functions.

In some embodiments, an I/O subsystem 240 is also coupled to peripheral interface 206. I/O subsystem 240 includes a touch screen controller 242 and/or other input controller(s) 244. Touch-screen controller 242 is coupled to a touch screen 246. Touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. Other input controller(s) 244 can be coupled to other input/control devices 248, such as one or more buttons, rocker switches, a thumb-wheel, an infrared port, a USB port, and/or a pointer device such as a stylus.

In some embodiments, memory interface 202 is coupled to memory 250. Memory 250 can include high-speed random access memory and/or non-volatile memory, such as one or more magnetic disk storage devices, one or more optical storage devices, and/or flash memory (e.g., NAND or NOR).

In some embodiments, the memory 250 stores an operating system 252, a communication module 254, a graphical user interface module 256, a sensor processing module 258, a phone module 260, and applications 262. Operating system 252 includes instructions for handling basic system services and for performing hardware dependent tasks. Communication module 254 facilitates communicating with one or more additional devices, one or more computers and/or one or more servers. Graphical user interface module 256 facilitates graphic user interface processing. Sensor processing module 258 facilitates sensor-related processing and functions. Phone module 260 facilitates phone-related processes and functions. Application module 262 facilitates various functionalities of user applications, such as electronic-messaging, web browsing, media processing, navigation, imaging and/or other processes and functions.

As described in this specification, memory 250 also stores client-side digital assistant instructions (e.g., in a digital assistant client module 264) and various user data 266 (e.g., user-specific vocabulary data, preference data, and/or other data such as the user's electronic address book, to-do lists, shopping lists, etc.) to provide the client-side functionalities of the digital assistant.

In various embodiments, digital assistant client module 264 is capable of accepting voice input (e.g., speech input), text input, touch input, and/or gestural input through various user interfaces (e.g., I/O subsystem 244) of user device 104. Digital assistant client module 264 is also capable of providing output in audio (e.g., speech output), visual, and/or tactile forms. For example, output can be provided as voice, sound, alerts, text messages, menus, graphics, videos, animations, vibrations, and/or combinations of two or more of the above. During operation, digital assistant client module 264 communicates with the digital assistant server using communication subsystems 224.

In some embodiments, digital assistant client module 264 utilizes the various sensors, subsystems and peripheral devices to gather additional information from the surrounding environment of user device 104 to establish a context associated with a user, the current user interaction, and/or the current user input. In some embodiments, digital assistant client module 264 provides the context information or a subset thereof with the user input to the digital assistant server to help infer the user's intent. In some embodiments, the digital assistant also uses the context information to determine how to prepare and deliver outputs to the user.

In some embodiments, the context information that accompanies the user input includes sensor information, such as lighting, ambient noise, ambient temperature, images or videos of the surrounding environment, and the like. In some embodiments, the context information also includes the physical state of user device 104 (e.g., device orientation, device location, device temperature, power level, speed, acceleration, motion patterns, cellular signals strength, etc.). In some embodiments, information related to the software state of user device 104 (e.g., running processes, installed programs, past and present network activities, background services, error logs, resources usage, etc.) is provided to the digital assistant server as context information associated with a user input.

In some embodiments, digital assistant client module 264 selectively provides information (e.g., user data 266) stored on user device 104 in response to requests from the digital assistant server. In some embodiments, digital assistant client module 264 also elicits additional input from the user via a natural language dialogue or other user interfaces upon request by digital assistant server 106. Digital assistant client module 264 passes the additional input to digital assistant server 106 to help digital assistant server 106 in intent inference and/or fulfillment of the user's intent expressed in the user request.

In various embodiments, memory 250 includes additional instructions or fewer instructions. Furthermore, various functions of user device 104 may be implemented in hardware and/or in firmware, including in one or more signal processing and/or application specific integrated circuits.

Figure 3A:
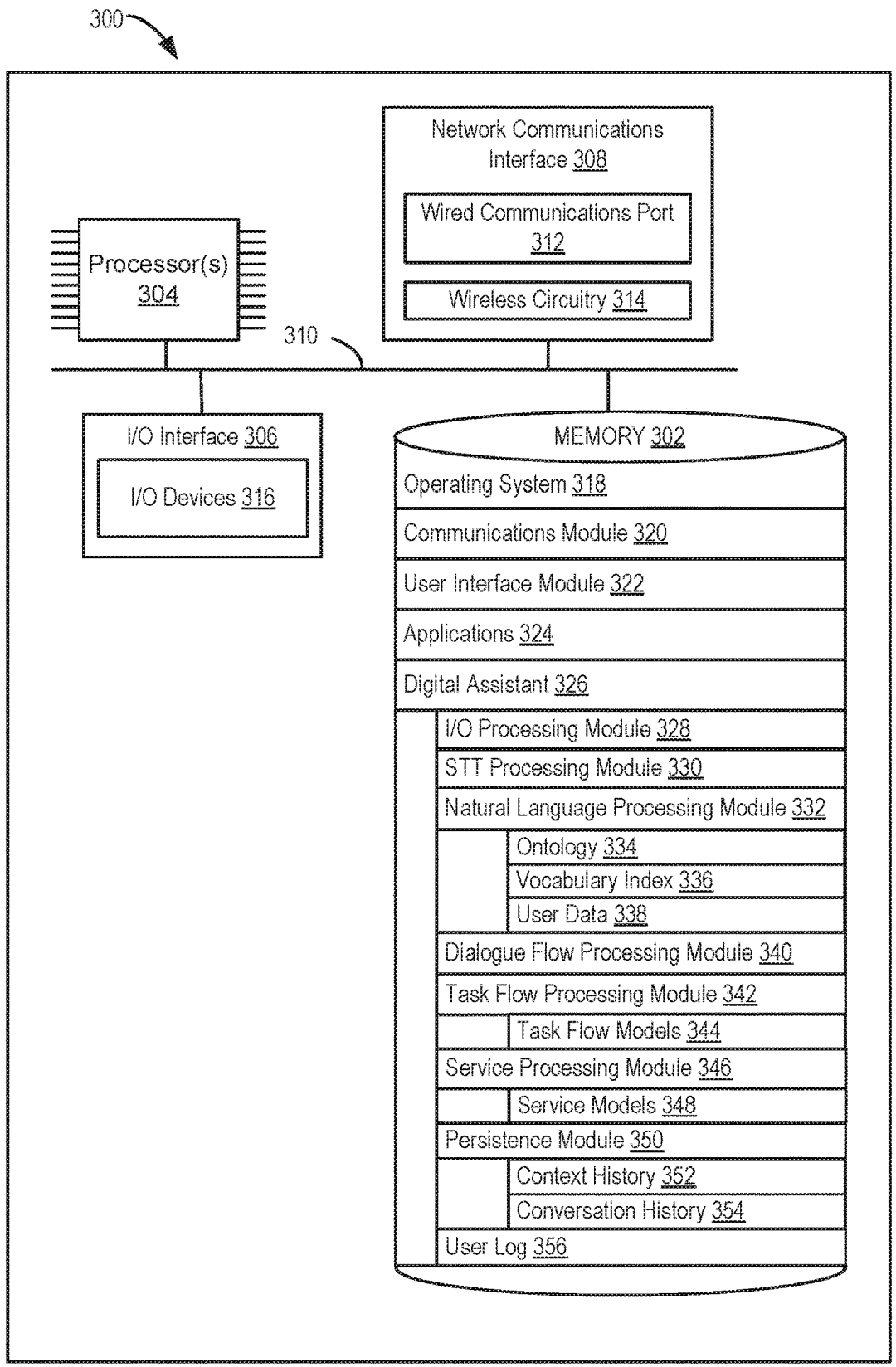
FIG. 3A is a block diagram illustrating a digital assistant system or a server portion thereof in accordance with some embodiments.

FIG. 3A is a block diagram of an example digital assistant system 300 in accordance with some embodiments. In some embodiments, digital assistant system 300 is implemented on a standalone computer system. In some embodiments, digital assistant system 300 is distributed across multiple computers. In some embodiments, some of the modules and functions of the digital assistant are divided into a server portion and a client portion, where the client portion resides on a user device (e.g., user device 104) and communicates with the server portion (e.g., server system 108) through one or more networks (e.g., network(s) 110). In some embodiments, digital assistant system 300 is an embodiment of server system 108 (and/or digital assistant server 106) shown in FIG. 1. It should be noted that digital assistant system 300 is only one example of a digital assistant system, and that digital assistant system 300 may have more or fewer components than shown, may combine two or more components, or may have a different configuration or arrangement of the components. The various components shown in FIG. 3A may be implemented in hardware, software instructions for execution by one or more processors, firmware, including one or more signal processing and/or application specific integrated circuits, or a combination of thereof.

Digital assistant system 300 includes memory 302, one or more processors 304, an input/output (I/O) interface 306, and a network communications interface 308. These components communicate with one another over one or more communication buses or signal lines 310.

In some embodiments, memory 302 includes a non-transitory computer readable storage medium, such as high-speed random access memory and/or a non-volatile storage medium (e.g., one or more magnetic disk storage devices, flash memory devices, or other non-volatile solid-state memory devices).

In some embodiments, I/O interface 306 couples input/output devices 316 of digital assistant system 300, such as displays, keyboards, touch screens, and microphones, to user interface module 322. I/O interface 306, in conjunction with user interface module 322, receives user inputs (e.g., voice input, keyboard inputs, touch inputs, etc.) and processes them accordingly. In some embodiments, digital assistant system 300 includes any of the components and I/O and communication interfaces described with respect to user device 104 in FIG. 2 (e.g., when the digital assistant is implemented on a standalone user device). In some embodiments, digital assistant system 300 represents the server portion of a digital assistant implementation, and interacts with the user through a client-side portion residing on a user device (e.g., user device 104 shown in FIG. 2).

In some embodiments, network communications interface 308 includes wired communication port(s) 312 and/or wireless transmission and reception circuitry 314. Wired communication port(s) receive and send communication signals via one or more wired interfaces such as Ethernet, Universal Serial Bus (USB), FIREWIRE, and the like. Wireless circuitry 314 receives and sends RF signals and/or optical signals from/to communications networks and other communications devices. The wireless communications, optionally, use any of a plurality of communications standards, protocols and technologies, such as GSM, EDGE, CDMA, TDMA, Bluetooth, Wi-Fi, VoIP, Wi-MAX, or any other suitable communication protocol. Network communications interface 308 enables communication between digital assistant system 300 and other devices via one or more networks (e.g., the Internet, an intranet, a wireless network, such as a cellular telephone network, a wireless local area network (LAN) or a metropolitan area network (MAN)).

In some embodiments, memory 302, or the computer readable storage media of memory 302, stores programs, modules, instructions, and data structures including all or a subset of: an operating system 318, a communications module 320, a user interface module 322, one or more applications 324, and a digital assistant module 326. One or more processors 304 execute these programs, modules, and instructions, and reads/writes from/to the data structures.

Operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 320 facilitates communications over network communications interface 308 between digital assistant system 300 and other devices. For example, communication module 320, optionally, communicates with communication interface 254 of user device 104 shown in FIG. 2. Communications module 320 also includes various components for handling data received by wireless circuitry 314 and/or wired communications port 312.

User interface module 322 receives commands and/or inputs from a user via I/O interface 306 (e.g., from a keyboard, touch screen, pointing device, controller, and/or microphone), and generates user interface objects on a display. User interface module 322 also prepares and delivers outputs (e.g., speech, sound, animation, text, icons, vibrations, haptic feedback, light, etc.) to the user via I/O interface 306 (e.g., through displays, audio channels, speakers, touch-pads, etc.).

The one or more applications 324 include programs and/or modules that are configured to be executed by the one or more processors 304. For example, if the digital assistant system is implemented on a standalone user device, one or more applications 324, optionally, include user applications, such as games, a calendar application, a navigation application, or an email application. If digital assistant system 300 is implemented on a server farm, the one or more applications 324, optionally, include resource management applications, diagnostic applications, or scheduling applications.

Memory 302 also stores digital assistant module 326 (or the server portion of a digital assistant). In some embodiments, digital assistant module 326 includes the following sub-modules, or a subset or superset thereof: an input/output processing module 328, a speech-to-text (STT) processing module 330, a natural language processing module 332, a dialogue flow processing module 340, a task flow processing module 342, a service processing module 346, and a background processing module 350. Each of these modules has access to one or more of the following data and models of the digital assistant 326, or a subset or superset thereof: ontology 334, vocabulary index 336, user data 338, task flow models 344, service models 348, and user log 352.

In some embodiments, using the processing modules, data, and models implemented in digital assistant module 326, digital assistant system 300 performs at least some of the following: identifying a user's intent expressed in a natural language input received from the user; actively eliciting and obtaining information needed to fully infer the user's intent (e.g., by disambiguating words, names, intentions, etc.); determining the task flow for fulfilling the inferred intent; and executing the task flow to fulfill the inferred intent. In some embodiments, the digital assistant also takes appropriate actions when a satisfactory response was not or could not be provided to the user for various reasons.

Figure 3B:
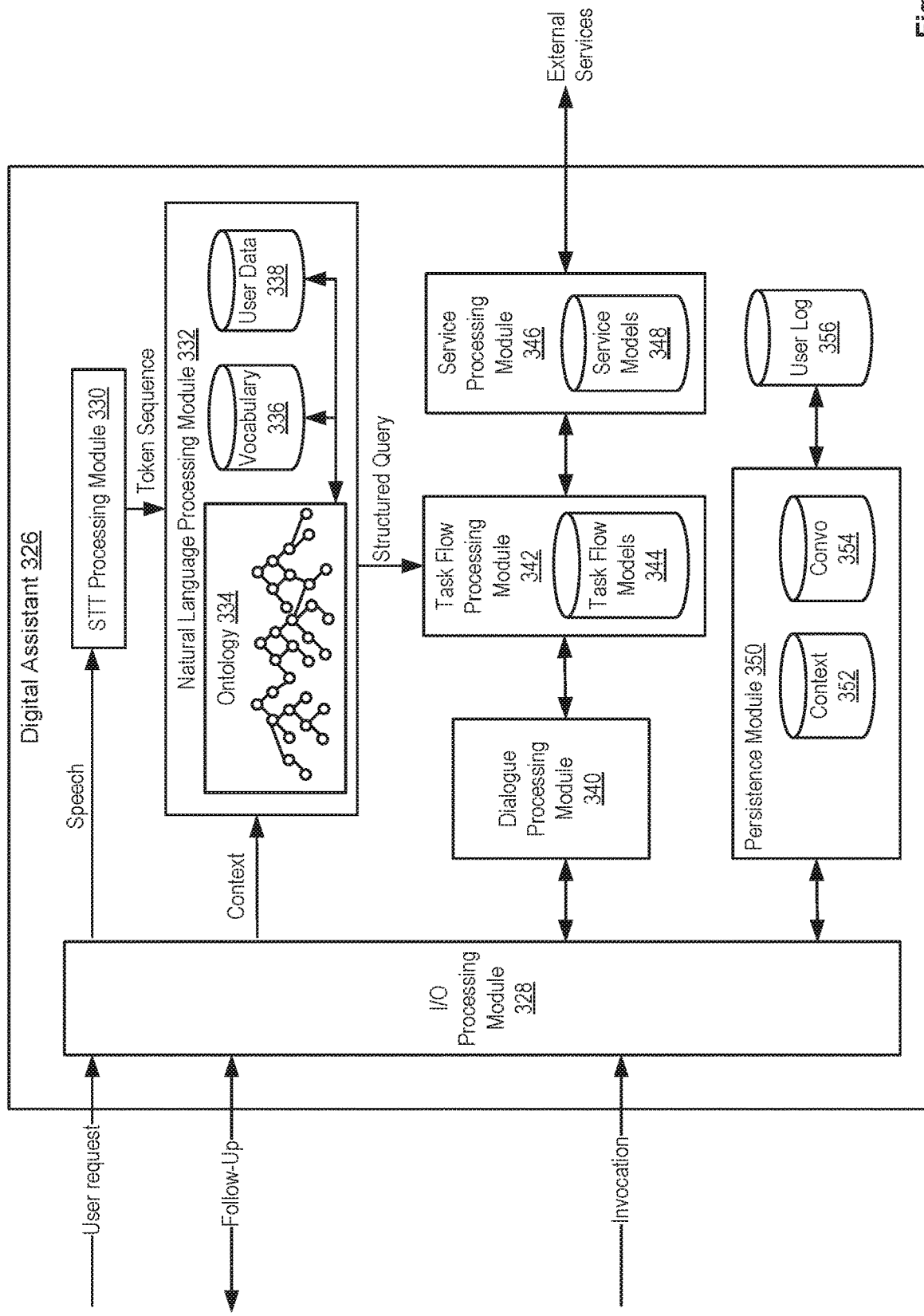
FIG. 3B is a block diagram illustrating functions of the digital assistant shown in FIG. 3A in accordance with some embodiments.

In some embodiments, as shown in FIG. 3B, I/O processing module 328 interacts with the user through the I/O devices 316 in FIG. 3A or with a user device (e.g., user device 104 in FIG. 1) through the network communications interface 308 in FIG. 3A to obtain user input (e.g., a speech input) and to provide responses (e.g., as speech outputs) to the user input. I/O processing module 328, optionally, obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., user device 104 in FIG. 1) at the time the user request is received, and/or information related to the surrounding environment of the user at the time that the user request was received. In some embodiments, I/O processing module 328 also sends follow-up questions to, and receives answers from, the user regarding the user request. When a user request is received by I/O processing module 328 and the user request contains a speech input, I/O processing module 328 forwards the speech input to the speech-to-text (STT) processing module 330 for speech-to-text conversion.

STT processing module 330 receives speech input (e.g., a user utterance captured in a voice recording) through I/O processing module 328. In some embodiments, STT processing module 330 uses various acoustic and language models to recognize the speech input as a sequence of phonemes, and ultimately, a sequence of words or tokens written in one or more languages. The speech-to-text processing module 330 can be implemented using any suitable speech recognition techniques, acoustic models, and language models such as Hidden Markov Models, Dynamic Time Warping (DTW) based speech recognition, and other statistical and/or analytical techniques. In some embodiments, speech-to-text processing can be performed at least partially by a third party service or on the user's device. Once STT processing module 330 obtains the result of the speech-to-text processing (e.g., a sequence of words or tokens), STT processing module 330 passes the result to natural language processing module 332 for intent inference.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

Natural language processing module 332 (sometimes herein also called a "natural language processor") of the digital assistant takes the sequence of words or tokens (or token sequence) generated by speech-to-text processing module 330, and attempts to associate the token sequence with one or more actionable intents recognized by the digital assistant. An "actionable intent" represents a task that can be performed by the digital assistant and has an associated task flow implemented in task flow models 344. The associated task flow is a series of programmed actions and steps that the digital assistant takes in order to perform the task. The scope of a digital assistant's capabilities is dependent on the number and variety of task flows that have been implemented and stored in task flow models 344 or, in other words, on the number and variety of actionable intents that the digital assistant recognizes. The effectiveness of the digital assistant, however, is also dependent on the digital assistant's ability to infer the correct actionable intent(s) from the user request expressed in natural language.

In some embodiments, in addition to the token sequence obtained from STT processing module 330, natural language processor 332 also receives context information associated with the user request (e.g., from I/O processing module 328). Natural language processor 332, optionally, uses the context information to clarify, supplement, and/or further define the information contained in the token sequence received from STT processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on ontology 334. Ontology 334 is a hierarchical structure containing many nodes, each node representing either an "actionable intent" or a "property" relevant to one or more of the "actionable intents" or other "properties." As noted above, an "actionable intent" represents a task that the digital assistant is capable of performing (i.e., it is actionable or can be acted on). A "property" represents a parameter associated with an actionable intent or a sub-aspect of another property. A linkage between an actionable intent node and a property node in ontology 334 defines how a parameter represented by the property node pertains to the task represented by the actionable intent node.

Figure 3C:
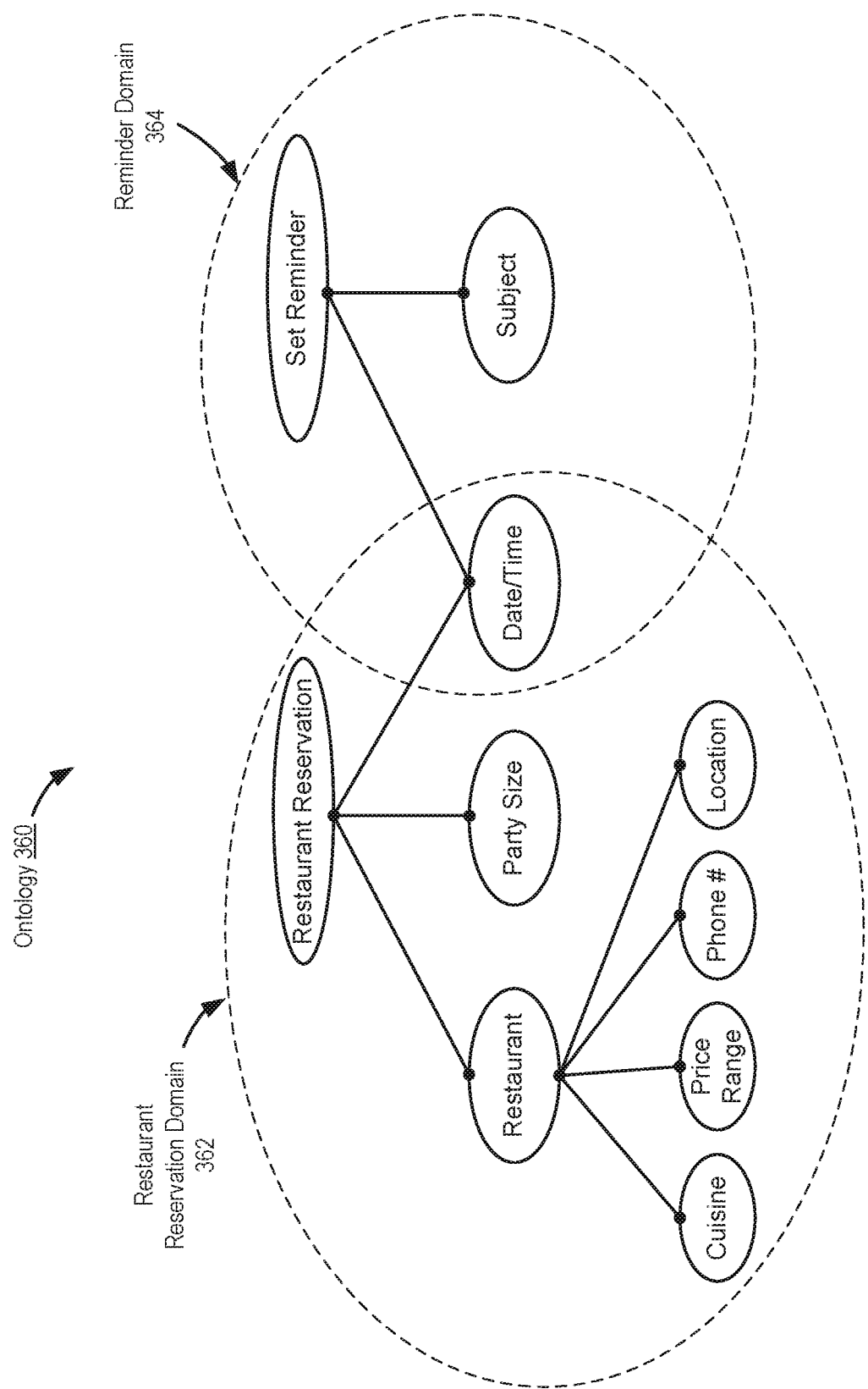
FIG. 3C is a diagram of a portion of an ontology shown in FIG. 3B in accordance with some embodiments.

In some embodiments, ontology 334 is made up of actionable intent nodes and property nodes. Within ontology 334, each actionable intent node is linked to one or more property nodes either directly or through one or more intermediate property nodes. Similarly, each property node is linked to one or more actionable intent nodes either directly or through one or more intermediate property nodes. For example, as shown in FIG. 3C, ontology 334 optionally includes a "restaurant reservation" node—an actionable intent node. Property nodes "restaurant," "date/time" (for the reservation), and "party size" are each directly linked to the actionable intent node (e.g., the "restaurant reservation" node). In addition, property nodes "cuisine," "price range," "phone number," and "location" are sub-nodes of the property node "restaurant," and are each linked to the "restaurant reservation" node through the intermediate property node "restaurant." For another example, as shown in FIG. 3C, ontology 334 may also include a "set reminder" node (e.g., another actionable intent node). Property nodes "date/time"

(for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 334.

An actionable intent node, along with its linked property nodes, is sometimes described as a "domain." In the present discussion, each domain is associated with a respective actionable intent, and refers to the group of nodes (and the relationships therebetween) associated with the particular actionable intent. For example, ontology 334 shown in FIG. 3C includes an example of a restaurant reservation domain 362 and an example of a reminder domain 364 within ontology 334. The restaurant reservation domain includes the actionable intent node "restaurant reservation," property nodes "restaurant," "date/time," and "party size," and sub-property nodes "cuisine," "price range," "phone number," and "location." Reminder domain 364 includes the actionable intent node "set reminder," and property nodes "subject" and "date/time." In some embodiments, ontology 334 is made up of many domains. Each domain optionally shares one or more property nodes with one or more other domains. For example, the "date/time" property node is optionally associated with many different domains (e.g., a scheduling domain, a travel reservation domain, a movie ticket domain, etc.), in addition to restaurant reservation domain 362 and reminder domain 364.

While FIG. 3C illustrates two example domains within ontology 334, other domains (or actionable intents) include, for example, "initiate a phone call," "find directions," "schedule a meeting," "send a message," and "provide an answer to a question," and so on. A "send a message" domain is associated with a "send a message" actionable intent node, and optionally further includes property nodes such as "recipient(s)," "message type," and "message body." The property node "recipient" is optionally further defined, for example, by the sub-property nodes such as "recipient name" and "message address."

In some embodiments, the ontology 334 includes all the domains (and hence actionable intents) that the digital assistant is capable of understanding and acting upon. In some embodiments, ontology 334 is optionally modified, such as by adding or removing entire domains or nodes, or by modifying relationships between the nodes within ontology 334.

In some embodiments, nodes associated with multiple related actionable intents are optionally clustered under a "super domain" in ontology 334. For example, a "travels" super domain optionally includes a cluster of property nodes and actionable intent nodes related to travel. The actionable intent nodes related to travel optionally include "airline reservation," "hotel reservation," "car rental," "get directions," "find points of interest," and so on. The actionable intent nodes under the same super domain (e.g., the "travels" super domain) sometimes have many property nodes in common. For example, the actionable intent nodes for "airline reservation," "hotel reservation," "car rental," "get directions," "find points of interest" sometimes share one or more of the property nodes "start location," "destination," "departure date/time," "arrival date/time," and "party size."

In some embodiments, each node in ontology 334 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in vocabulary index 336 in association with the property or actionable intent represented by the node. For example, returning to FIG. 3B, the vocabulary associated with the node for the property of "restaurant" optionally includes words such as "food," "drinks," "cuisine," "hungry," "eat," "pizza," "fast food," "meal," and so on. For another example, the vocabulary associated with the node for the actionable intent of "initiate a phone call" optionally includes words and phrases such as "call," "phone," "dial," "call this number," "make a call to," and so on. The vocabulary index 336, optionally, includes words and phrases in different languages.

Natural language processor 332 receives the token sequence (e.g., a text string) from speech-to-text processing module 330, and determines what nodes are implicated by the words in the token sequence. In some embodiments, if a word or phrase in the token sequence is found to be associated with one or more nodes in ontology 334 (via vocabulary index 336), the word or phrase will "trigger" or "activate" those nodes. Based on the quantity and/or relative importance of the activated nodes, natural language processor 332 will select one of the actionable intents as the task that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant has previously correctly interpreted a similar request from a user.

In some embodiments, the digital assistant also stores names of specific entities in vocabulary index 336, so that when one of these names is detected in the user request, natural language processor 332 will be able to recognize that the name refers to a specific instance of a property or sub-property in the ontology. In some embodiments, the names of specific entities are names of businesses, restaurants, people, movies, and the like. In some embodiments, the digital assistant searches and identifies specific entity names from other data sources, such as the user's address book, a movies database, a musicians database, and/or a restaurant database. In some embodiments, when natural language processor 332 identifies that a word in the token sequence is a name of a specific entity (e.g., a name in the user's address book), that word is given additional significance in selecting the actionable intent within the ontology for the user request.

For example, when the words "Mr. Santo" are recognized in a user request and the last name "Santo" is found in vocabulary index 336 as one of the contacts in the user's address book, then it is likely that the user request corresponds to a "send a message" or an "initiate a phone call" domain. For another example, when the words "ABC Café" are found in a user request and the term "ABC Café" is found in the vocabulary index 336 as the name of a particular restaurant in the user's city, then it is likely that the user request corresponds to a "restaurant reservation" or a "find restaurants" domain.

User data 338 includes user-specific information, such as user-specific vocabulary, user preferences, user address or home location, user's default and secondary languages, user's address book, and other short-term or long-term information for each user. In some embodiments, natural language processor 332 uses the user-specific information to supplement the information contained in a user input to further define the user intent. For example, for a user request "invite my friends to my birthday party," natural language processor 332 is able to access user data 338 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some embodiments, once natural language processor 332 identifies an actionable intent (or domain) based on the user request, natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user states to the DA, "Make me a dinner reservation at a sushi place at 7." In this case, natural language processor 332 may be able to correctly identify the actionable intent to be "restaurant reservation" based on the user input. According to the ontology, a structured query for a "restaurant reservation" domain optionally includes parameters such as {Cuisine}, {Time}, {Date}, {Party Size}, and the like. In some embodiments, based on the information contained in the user's utterance, natural language processor 332 generates a partial structured query for the restaurant reservation domain, where the partial structured query includes the parameters {Cuisine="Sushi"} and {Time="7 PM"}. In this example, the user's utterance, however, contains insufficient information to complete the structured query associated with the domain. Therefore, other necessary parameters such as {Party Size} and {Date} are not specified in the structured query based on the information currently available. In some embodiments, natural language processor 332 populates some parameters of the structured query with received context information. For example, in some embodiments, if the user requested a sushi restaurant "near me," natural language processor 332 populates a {location} parameter in the structured query with GPS coordinates from user device 104.

In some embodiments, natural language processor 332 passes the structured query (including any completed parameters) to task flow processing module 342 (sometimes herein also called a "task flow processor"). Task flow processor 342 is configured to receive the structured query from natural language processor 332, complete the structured query, if necessary, and perform the actions required to "complete" the user's ultimate request. In some embodiments, the various procedures necessary to complete these tasks are provided in task flow models 344. In some embodiments, task flow models 344 include procedures for obtaining additional information from the user, and task flows for performing actions associated with the actionable intent.

As described above, in order to complete a structured query, task flow processor 342 sometimes needs to initiate additional dialogue with the user in order to obtain additional information, and/or disambiguate potentially ambiguous utterances. When such interactions are necessary, task flow processor 342 invokes dialogue processing module 340 (sometimes herein also called a "dialogue processor") to engage in a dialogue with the user. In some embodiments, dialogue processor 340 determines how (and/or when) to ask the user for the additional information, and receives and processes the user responses. The questions are provided to and answers are received from the users through I/O processing module 328. In some embodiments, dialogue processor 340 presents dialogue output to the user via audio and/or visual output, and receives input from the user via spoken or physical (e.g., clicking) responses. Continuing with the example above, when task flow processor 342 invokes dialogue flow processor 340 to determine the "party size" and "date" information for the structured query associated with the domain "restaurant reservation," dialogue flow processor 335 generates questions, such as "For how many people?" and "On which day?," to pass to the user. Once answers are received from the user, the dialogue flow processor 340 can then populate the structured query with the missing information, or pass the information to task flow processor 342 to complete the missing information from the structured query.

Once task flow processor 342 has completed the structured query for an actionable intent, task flow processor 342 proceeds to perform the ultimate task associated with the actionable intent. Accordingly, task flow processor 342 executes the steps and instructions in the task flow model according to the specific parameters contained in the structured query. For example, the task flow model for the actionable intent of "restaurant reservation," optionally, includes steps and instructions for contacting a restaurant and actually requesting a reservation for a particular party size at a particular time. For example, using a structured query, such as {restaurant reservation, restaurant=ABC Café, date=Mar. 12, 2012, time=7 PM, party size=5}, task flow processor 342, optionally, performs the steps of: (1) logging onto a server of the ABC Café or a restaurant reservation system such as OPENTABLE®; (2) entering the date, time, and party size information in a form on the website; (3) submitting the form; and (4) making a calendar entry for the reservation in the user's calendar.

In some embodiments, task flow processor 342 employs the assistance of a service processing module 346 (sometimes herein also called a "service processor") to complete a task requested in the user input or to provide an informational answer requested in the user input. For example, service processor 346 can act on behalf of task flow processor 342 to make a phone call, set a calendar entry, invoke a map search, invoke or interact with other user applications installed on the user device, and invoke or interact with third party services (e.g., a restaurant reservation portal, a social networking website, a banking portal, etc.). In some embodiments, the protocols and application programming interfaces (API) required by each service can be specified by a respective service model among services models 348. Service processor 346 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processor 342, service processor 346 can establish a network connection with the online reservation service using the web address stored in the service model, and send the necessary parameters of the reservation (e.g., time, date, party size) to the online reservation interface in a format according to the API of the online reservation service.

In some embodiments, natural language processor 332, dialogue processor 340, and task flow processor 342 are used collectively and iteratively to infer and define the user's intent, obtain information to further clarify and refine the user intent, and finally generate a response (e.g., an output to the user, or the completion of a task) to fulfill the user's intent.

In some embodiments, after all of the tasks needed to fulfill the user's request have been performed, digital assistant 326 formulates a confirmation response, and sends the response to the user through the I/O processing module 328. If the user request seeks an informational answer, the confirmation response presents the requested information to the user. In some embodiments, the digital assistant also requests the user to indicate whether the user is satisfied with the response produced by digital assistant 326.

In some embodiments, the digital assistant 326 includes a persistence module 350 with context history 352 and conversation history 354. The persistence module 350 is configured to enable conversation and/or context persistence across two or more non-continuous instances of a digital assistant. Persistence module 350 is discussed in more detail below with reference to FIG. 4.

More details on the digital assistant can be found in the U.S. Utility application Ser. No. 12/987,982, entitled "Intelligent Automated Assistant," filed Jan. 18, 2010, and also in U.S. Utility Application No. 61/493,201, entitled "Generating and Processing Data Items That Represent Tasks to Perform," filed Jun. 3, 2011, the entire disclosures of which are incorporated herein by reference.

Figure 4:
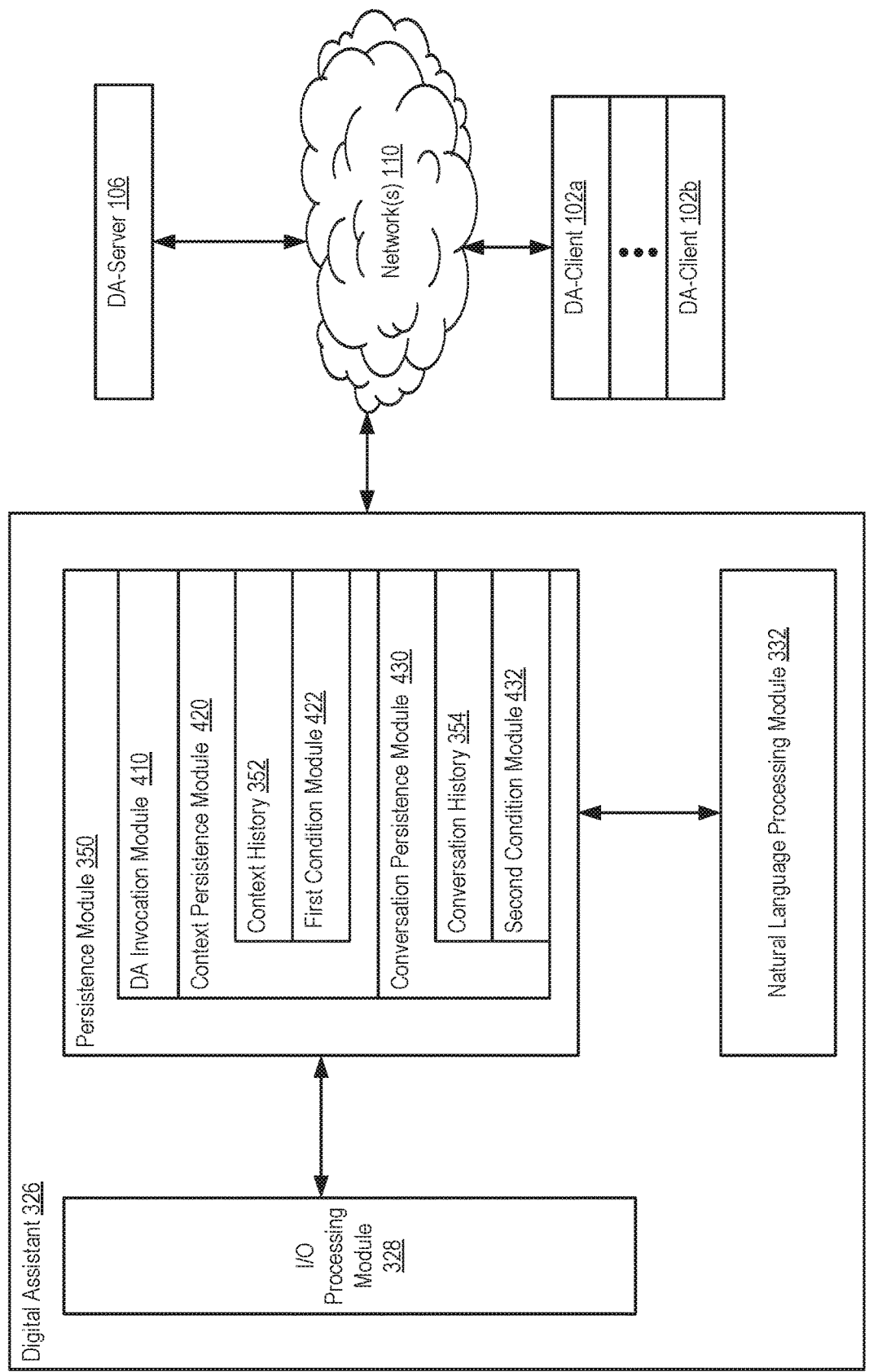
FIG. 4 is a block diagram of a persistence module shown in FIG. 3B in accordance with some embodiments.

FIG. 4 illustrates a block diagram of a persistence module 350 included in digital assistant 326 in accordance with some embodiments. Persistence module 350 includes a digital assistant (DA) invocation module 410, a context persistence module 420, and a conversation persistence module 430. DA invocation module is configured to detect a user request to invoke the DA. For example, the detection of a long press on home button 509 of user device 104 or the reception of a predefined speech input (e.g., a speech input stating, "Hey, Siri") invokes the DA.

More details on the audibly invoking a digital assistant are described in U.S. Provisional Application Ser. No. 61/762,260, filed on Feb. 7, 2013, entitled "Voice Trigger for a Digital Assistant," the entire disclosure of which is incorporated herein by reference.

Context persistence module 420 is configured to enable the persistence of contextual information across more than one instance of the DA. In some embodiments, context information from a previous instance (or session) of a DA user interface is used in intent inference by natural language processor 332 during a subsequent instance of the DA user interface. For example, while in a first instance of a DA user interface, a user asks the DA, "What is the weather in New York City?" In response to the user request, the DA indicates the current temperature and prevailing weather in New York City. Subsequently, the user leaves the first instance of the DA user interface, goes to a user interface different from the DA user interface (e.g., the home screen of the device, the lock screen of the device, or an application separate from the DA), and re-enters the DA user interface in a second instance of the DA user interface at a time following (or later than) exiting the first instance of the DA user interface. While in the second instance of the DA user interface, the user asks the DA, "What about in D.C.?" The DA is enabled to use contextual information corresponding to the dialogue between the user and the DA from the first instance of the DA user interface to answer the user's question in the second instance of the DA user interface. For example, the DA maintains the "weather" context while in the second instance of the DA user interface and responds to the user's request by visually and/or audibly presenting the current temperature and prevailing weather in Washington, D.C.

Context persistence module 420 includes context history 352 and a first condition module 422. Context history 352 is a short term, or cache, memory that stores contextual information from one or more previous instances of the DA. In some embodiments, context history 352 is separate from user log 356 and only stores contextual information related to dialogue between the DA and the user. In some embodiments, context history 352 is stored in DA-server 106 of server system 108 (e.g., in data 116 of DA-sever 106). First condition module 422 triggers the usage of contextual information stored in context history 352 in a second instance of a DA as long as a first predetermined condition is satisfied. In some embodiments, the first predetermined condition is a context expiration time period (e.g., one minute). For example, contextual information from a first instance of a DA is used in a second instance of the DA as long as the second instance of the DA is invoked within one minute of leaving the first instance of the DA. In some embodiments, if the first predetermined condition is not satisfied (e.g., the content expiration time period expires), the contextual information related to the first instance of the DA is deleted from context history 352.

Conversation persistence module 430 is configured to enable the persistence of conversation (or dialogue) information across more than one instance of the DA. In some embodiments, conversation information including at least a portion of a transcript of a dialogue between a user and a DA in a previous instance of a DA user interface is available for display in a subsequent instance of the DA user interface. For example, while in a first instance of a DA user interface, a user asks the DA, "Show me nearby Pakistani restaurants," and receives a list of six Pakistani restaurants within a ten mile radius of the user's current location. Subsequently, the user leaves the first instance of the DA user interface, goes to a user interface different from the DA user interface (e.g., the home screen of the device, the lock screen of the device, or an application separate from the DA), and re-enters the DA user interface in a second instance of the DA user interface. While in the second instance of the DA user interface, the list of six Pakistani restaurants is available for display. In some embodiments, a fraction of the previous dialogue between the user and the DA is displayed, or a peek through of the previous dialogue between the user and the DA is displayed under a partially transparent banner. In some embodiments, the remainder of the dialogue between the user and the DA from the first instance of the DA user interface is available for display by scrolling up while in the second instance of the DA user interface.

Conversation persistence module 430 includes conversation history 354 and a second condition module 432. Conversation history 354 is a short term, or cache, memory that stores conversation information including a transcript of a dialogue between the user and the DA from one or more previous instances of the DA. In some embodiments, conversation history 354 is a separate memory from context history 352. In some other embodiments, conversation history 354 and context history 352 are included in the same memory. In some embodiments, conversation history 354 is stored in DA-server 106 of server system 108 (e.g., in data 116 of DA-sever 106). Second condition module 432 triggers the usage of conversation information stored in conversation history 354 in a second instance of a DA as long as a second predetermined condition is satisfied. In some embodiments, the second predetermined condition is a conversation expiration time period (e.g., eight minutes). For example, conversation information (e.g., a transcript of dialogue) from a first instance of a DA is available for display in a second instance of the DA as long as the second instance of the DA is invoked within eight minutes of leaving the first instance of the DA. In some embodiments, if the second predetermined condition is not satisfied (e.g., the conversation expiration time period expires), the conversation information related to the first instance of the DA is deleted from conversation history 354.

Although FIG. 4 does not explicitly show the communication interfaces between all components of digital assistant 326 in FIG. 3B, it is to be understood that the components shown in FIG. 4 are capable of communicating with other components of digital assistant 326 in FIG. 3B either directly or through one or more other interfaces, such as application programming interfaces (APIs), database query interfaces, and/or other interfaces, protocols, and/or communication channels.

Attention is now directed towards embodiments of user interfaces ("UI") that are, optionally, implemented on user device 104.

Figure 5A:
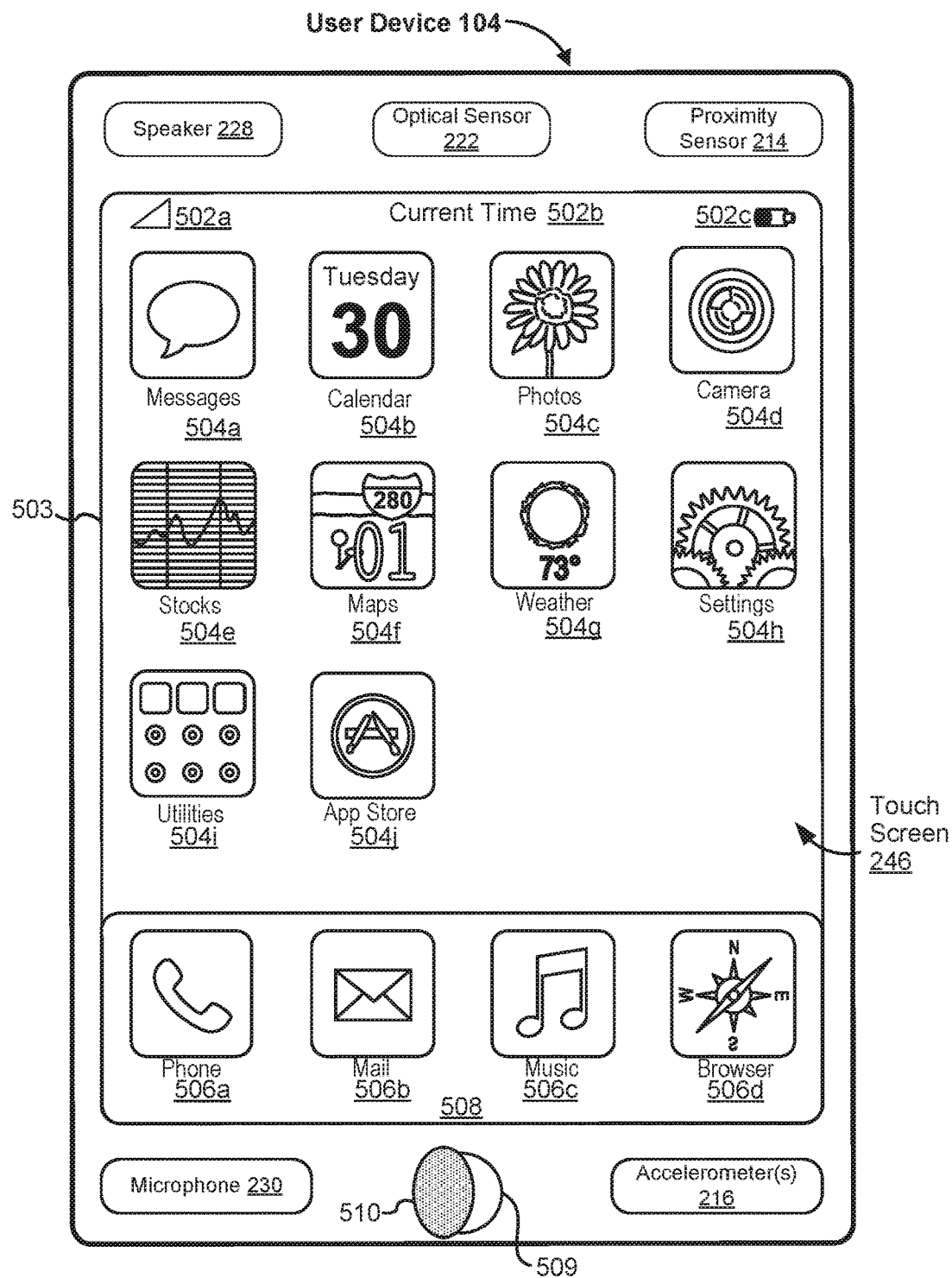
FIGS. 5A-OO illustrate exemplary user interfaces for enabling context and/or conversation persistence in accordance with some embodiments.

FIGS. 5A-OO illustrate exemplary user interfaces for enabling context and/or conversation persistence. FIGS. 6A-D are flow diagrams illustrating a method of enabling context and/or conversation persistence. The user interfaces in FIGS. 5A-OO are used to illustrate the processes illustrated in FIGS. 6A-D.

FIGS. 5A-OO illustrate a user device 104 with a touch screen 246 configured to display a user interface 503 and to receive touch input, a proximity sensor 214, other sensors 216 (e.g., one or more accelerometers), optical sensor 222 (a component of camera subsystem 220), a speaker 228 configured to generate sound, and a microphone 230 configured to receive sound input (e.g., speech input). User device 104, optionally, includes one or more physical buttons, such as "home" or menu button 509. Home button 509 is, optionally, used to navigate to a home screen or any application in a set of applications that are, optionally executed on user device 104. Alternatively, in some embodiments, the home button is implemented as a soft key (e.g., a user interface object, sometimes herein called an affordance, or user interface affordance) in a user interface displayed on touch screen 246.

FIG. 5A illustrates an exemplary user interface for a menu of applications on user device 104 in accordance with some embodiments. In some embodiments, user interface 503 includes the following elements, or a subset or superset thereof:

Signal strength indicator(s) 502a for wireless communication(s), such as cellular and Wi-Fi signals;
Current time indicator 502b;
Battery status indicator 502c;
Tray 508 with icons for frequently used applications, such as:
Icon 506a for a telephone module, labeled "Phone";
Icon 506b for an e-mail client module, labeled "Mail";
Icon 506c for a video and music player module, labeled "Music"; and
Icon 506d for an Internet browser module, labeled "Browser."
Icons for other applications, such as:
Icon 504a for a messages module, which provides access to SMS and MMS messages, labeled "Messages";
Icon 504b for a calendar module, labeled "Calendar";
Icon 504c for an image management module, labeled "Photos";
Icon 504d for a camera module, labeled "Camera";
Icon 504e for a stocks widget, labeled "Stocks";
Icon 504f for a map module, labeled "Maps";
Icon 504g for a weather widget, labeled "Weather";
Icon 504h for a settings application or module, which provides access to settings for user device 104, labeled "Settings";
Icon 504i for a utilities module, which provides access to one or more utility applications, labeled "Utilities"; and
Icon 504j for an application store module, which provides access to a marketplace for applications, labeled "App Store."

It should be noted that the icon labels illustrated in FIG. 5A are merely exemplary. For example, icon 506c for the video and music player module is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5A illustrates user device 104 displaying user interface 503 on touch screen 246 with a plurality of application icons 504 and tray icons 506 in tray 508. FIG. 5A further illustrates detecting a user touch input 510 over home button 509.

Figure 5B:
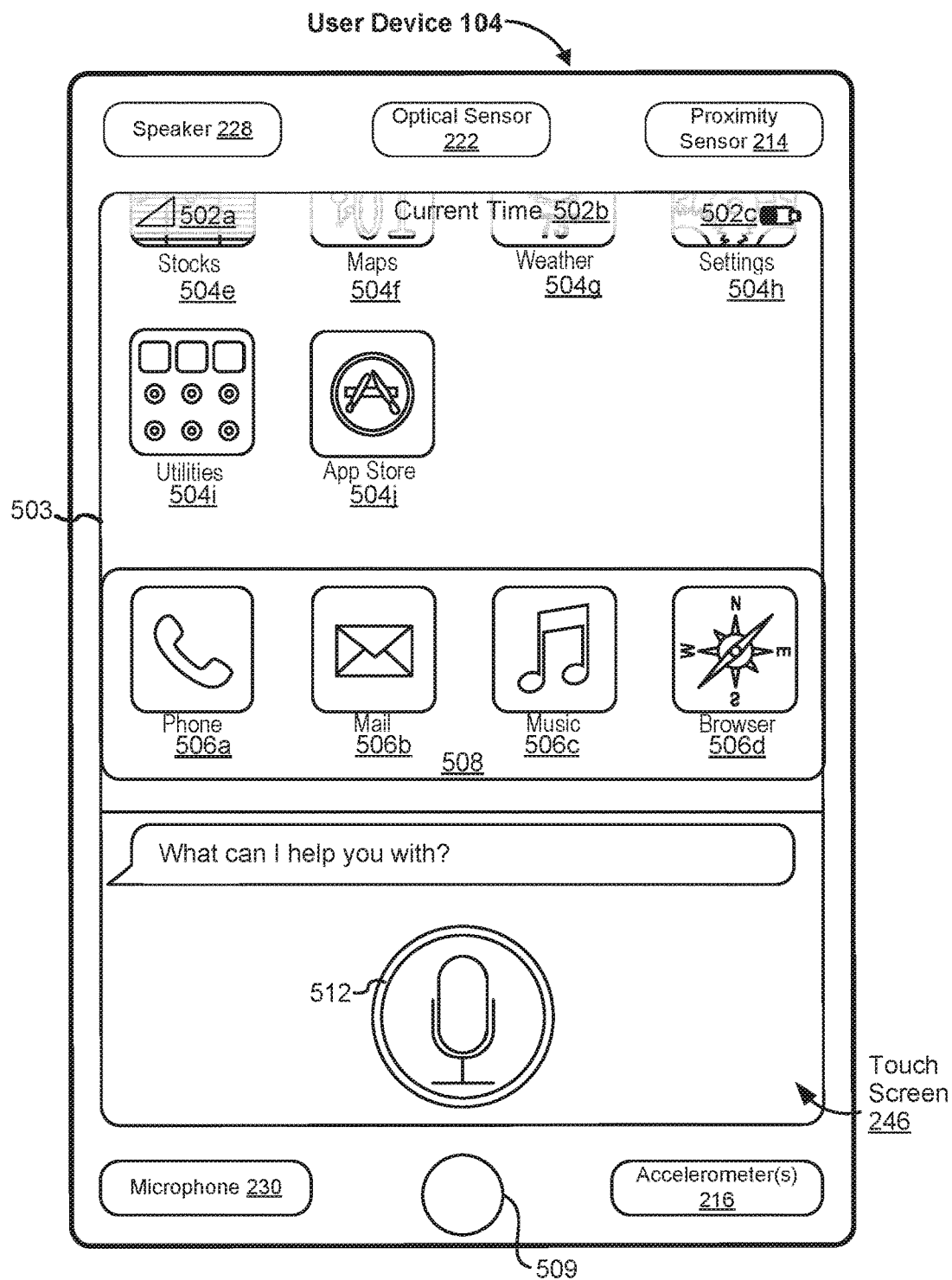

FIG. 5B illustrates invoking a first instance of a digital assistant (DA) in response to detecting the long press with user touch input 510 over home button 509 in FIG. 5A. In some embodiments, a long press is a stationary touch contact held for more than a predetermined amount of time (e.g., 500 ms, 750 ms, 1 second, etc.). In response to invoking the DA, the DA audibly prompts the user by asking, "What can I help you with?" The DA's question is also transcribed in user interface 503. FIG. 5B further illustrates a digital assistant (DA) button 512. In some embodiments, DA button 512 is implemented as a soft key (e.g., a user interface object) in user interface 503. In some embodiments, in response to detecting a touch input over DA button 512, user device 104 is configured to activate (e.g., turn microphone 230 on) and enable the DA to receive an additional question. For example, in response to the DA's prompt, the user asks the DA, "What's the temperature in Palo Alto?"

Figure 5C:
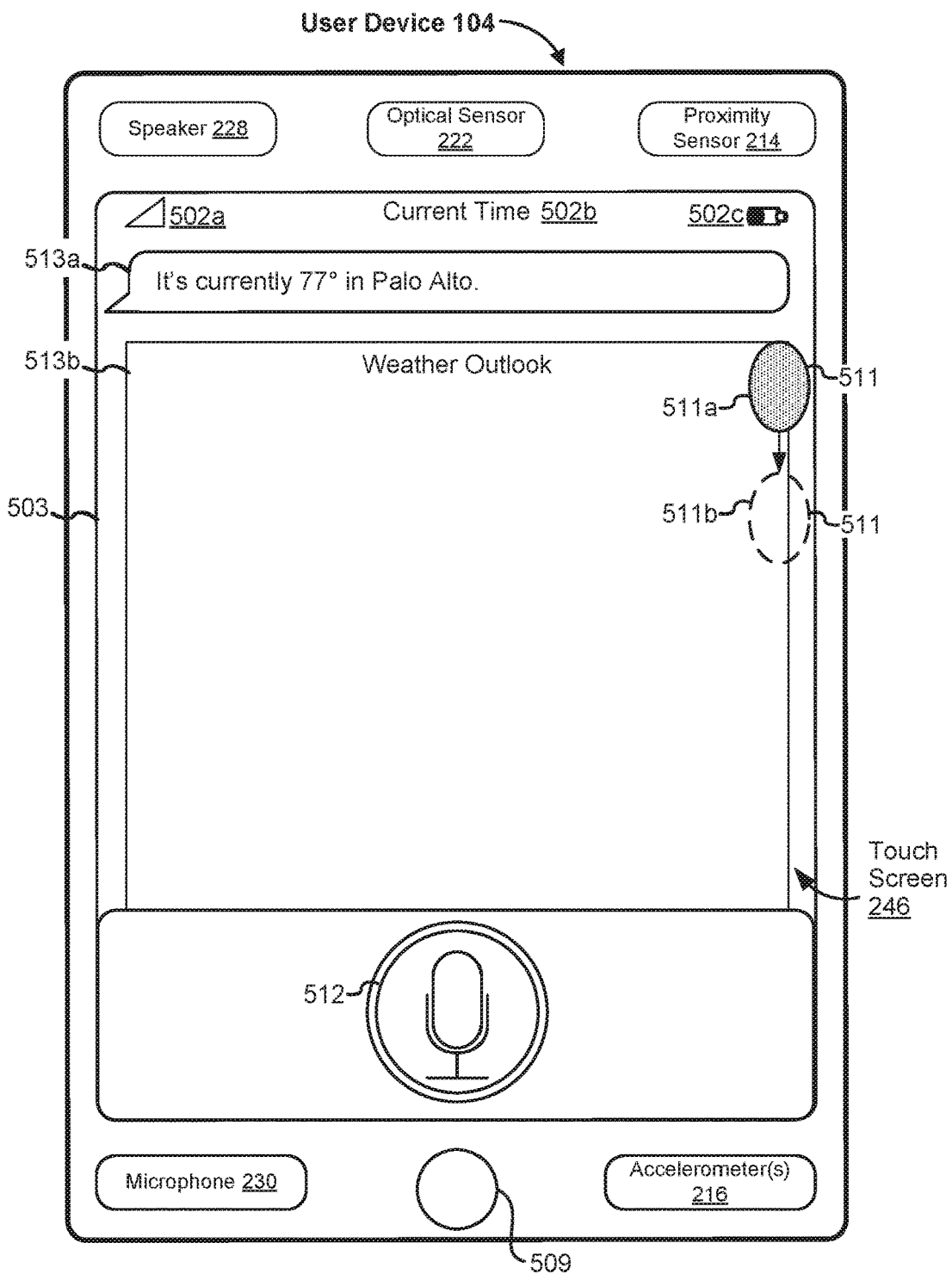

FIG. 5C illustrates the DA's response to the user's question within a DA user interface. The DA responds to the user's question by stating, "It's currently 77° in Palo Alto," which is transcribed in box 513a. The DA also displays a weather outlook 513b for the next twenty hour hours, three days, week, or the like. FIG. 5C further illustrates detecting a downward dragging gesture of user touch input 511 from position 511a to 511b.

Figure 5D:
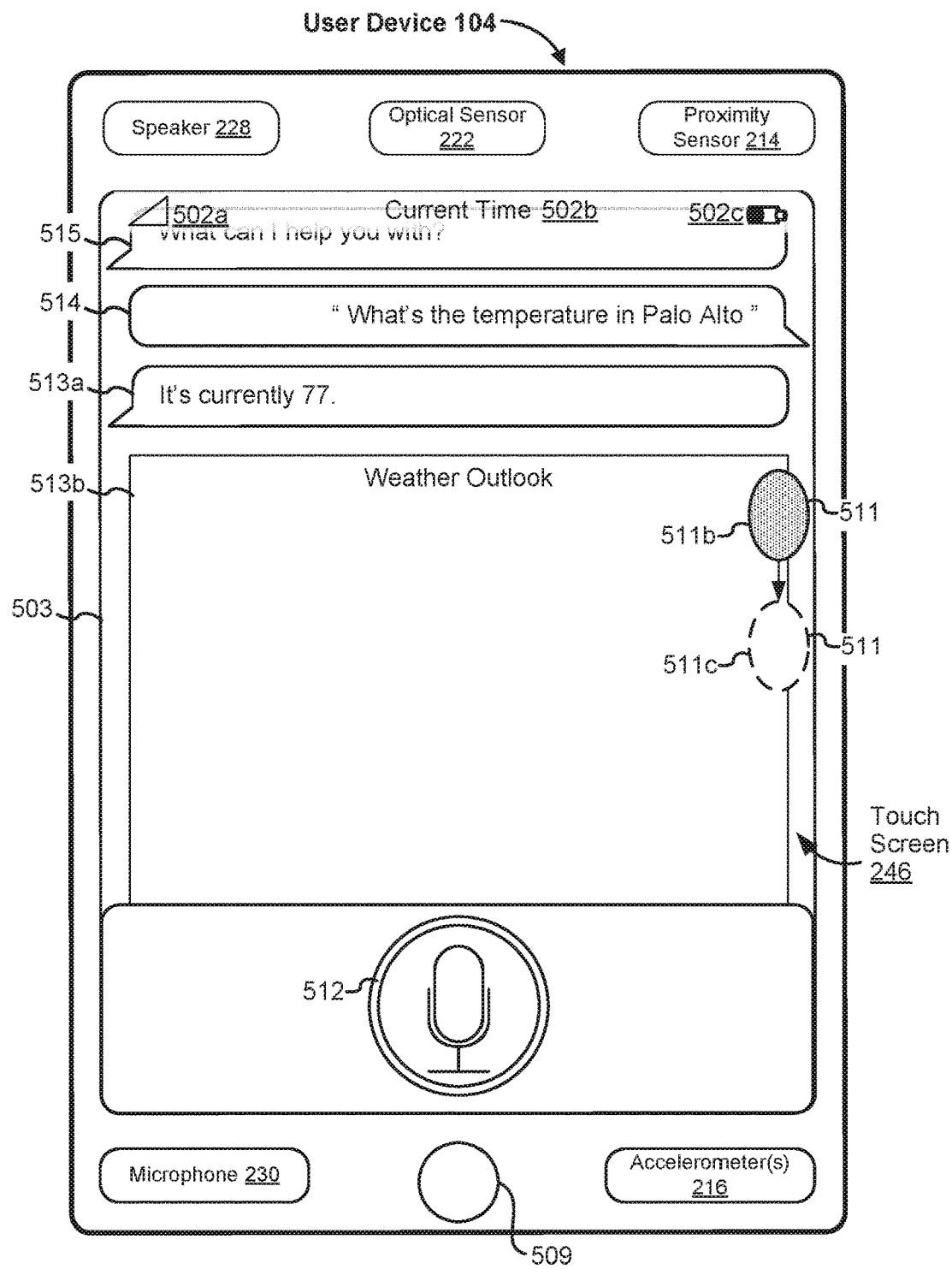

FIG. 5D illustrates scrolling up a transcription (e.g., a speech to text transcription) of the current dialogue (or conversation) between the user and the DA within the DA user interface in response to detecting the downward dragging gesture in FIG. 5C. FIG. 5D shows a transcription of the user's question in box 514 and a partially displayed transcription of the DA's prompt in box 515. FIG. 5D further illustrates detecting a downward dragging gesture of user touch input 511 from position 511b to 511c.

Figure 5E:
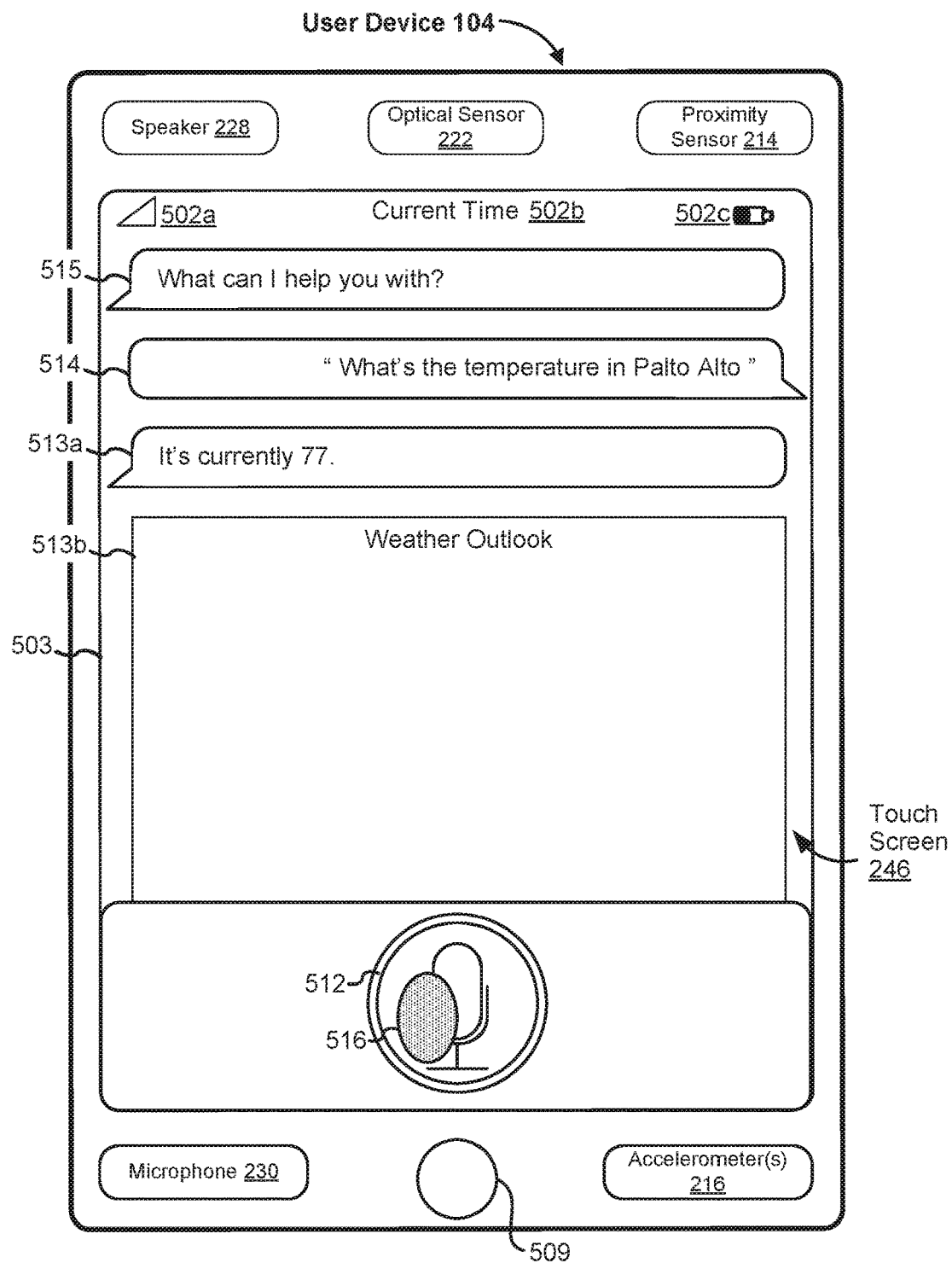

FIG. 5E illustrates scrolling to the top of the transcription of the current dialogue (or conversation) between the user and the DA within the DA user interface in response to detecting the downward dragging gesture in FIG. 5D. FIG. 5E shows box 515 fully displayed in user interface 503. FIG. 5E further illustrates detecting a user touch input 516 over DA button 512. In response to user touch input 516 over DA button 512, the DA is activated (e.g., microphone 230 is turned on) and enabled to receive an additional question or request from the user. For example, after user device 104 detects touch input 516, the user asks the DA, "Show me nearby restaurants."

Figure 5F:
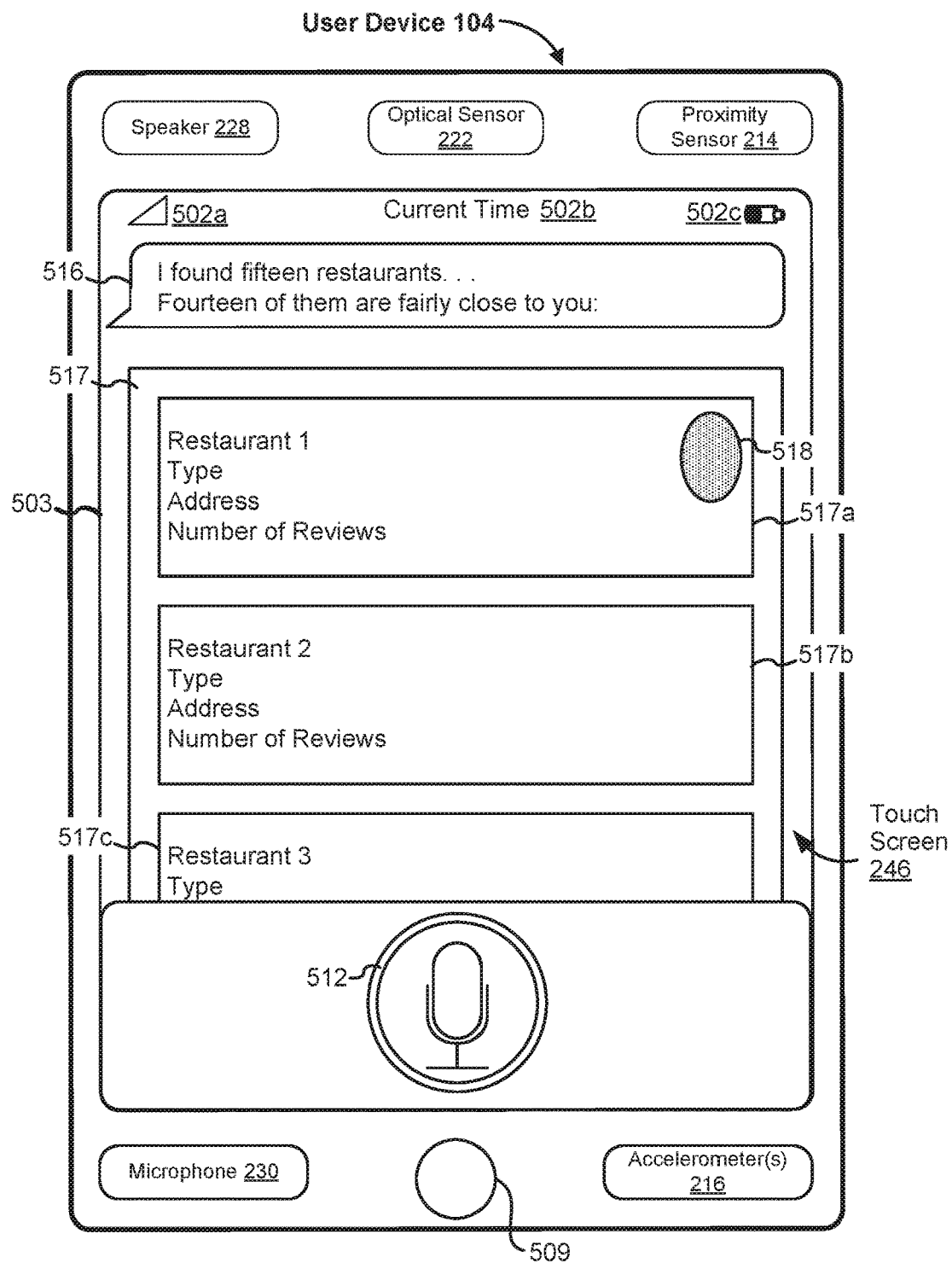

FIG. 5F illustrates the DA's response to the user's request within the DA user interface. The DA responds to the user's request by stating, "I found fifteen restaurants . . . . Fourteen of them are fairly close to you," which is transcribed in box 516. The DA also displays a list 517 of fourteen restaurants nearby the user's current location including information container 517a pertaining to restaurant 1, information container 517b pertaining to restaurant 2, and information container 517c pertaining to restaurant 3. FIG. 5C further illustrates detecting a user touch input 518 over information container 517a pertaining to restaurant 1.

Figure 5G:
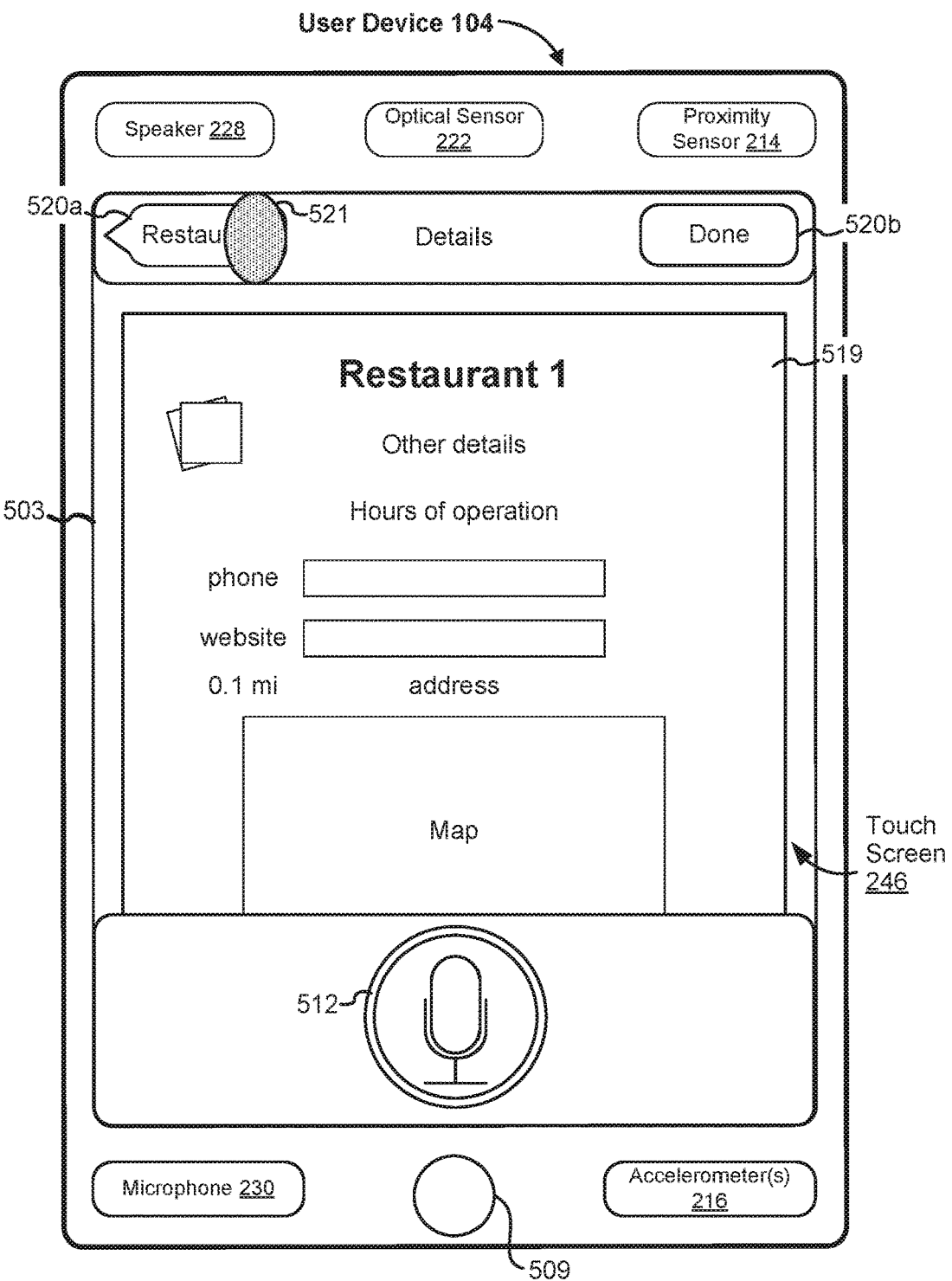

FIG. 5G illustrates displaying a break out of detailed information 519 related to "Restaurant 1" within the DA user interface. Detailed information 519 is displayed in response to detecting touch input 518 over the information container 517a pertaining to "Restaurant 1" in FIG. 5F. Detailed information 519 optionally includes one or more of: photos of Restaurant 1, Restaurant 1's hours of operation, Restaurant 1's phone number and website, the distance from the user's current location to Restaurant 1, and a map marking Restaurant 1's location relative to the user's current location. FIG. 5G shows "restaurants" button 520a configured to take the user back to list 517 of restaurants and "done" button 520b configured to exit the DA user interface and take the user to a home screen (e.g., done button 520b functions similarly to home button 509). FIG. 5G further illustrates detecting a user touch input 521 over restaurants button 520a.

More details on the display of related information within an instance of a DA user interface are described in U.S. Provisional Application Ser. No. 61/657,736, filed on Jun. 8, 2012, entitled "Intelligent Automated Assistant," the entire disclosure of which is incorporated herein by reference.

Figure 5H:
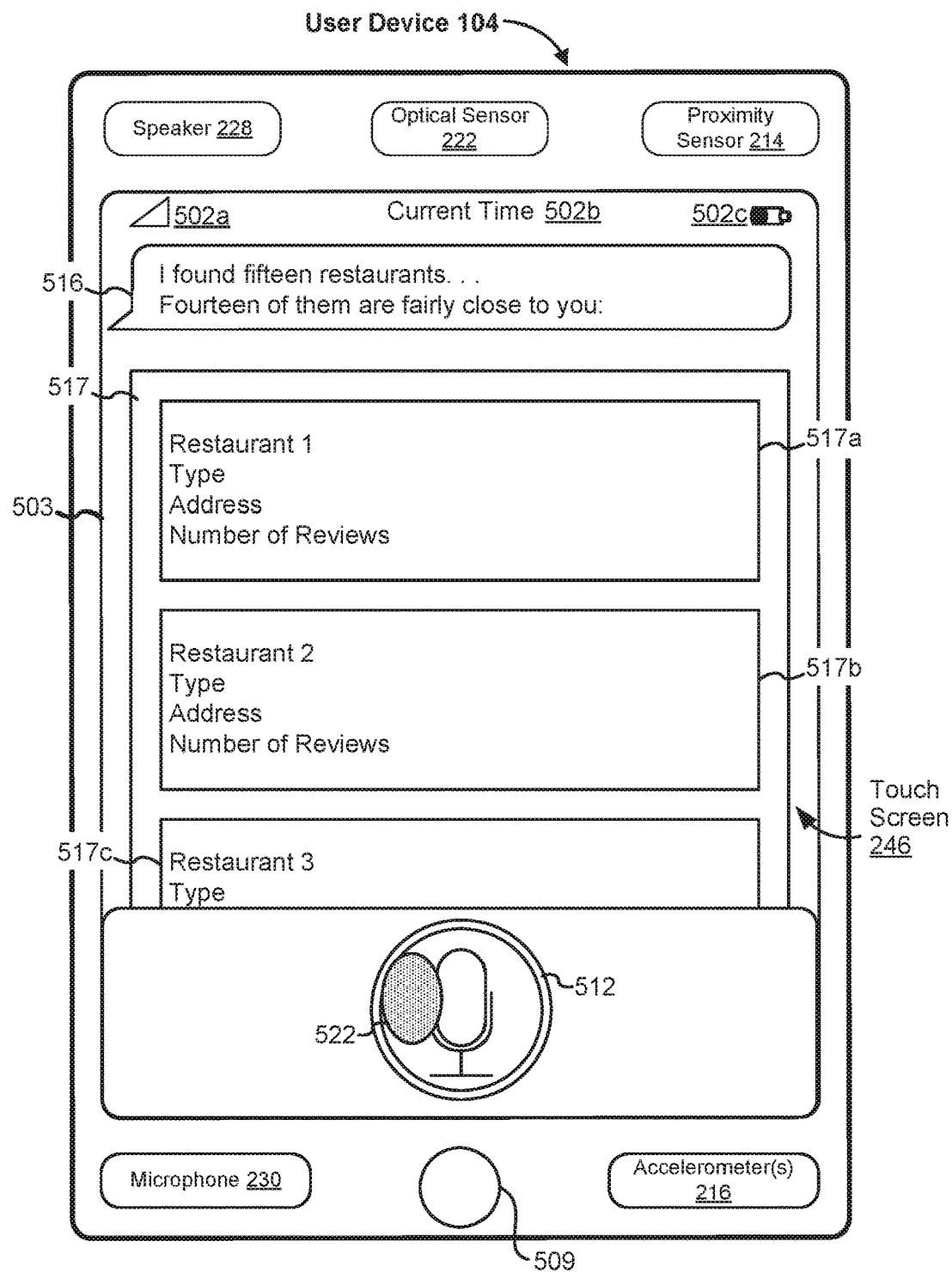

FIG. 5H illustrates displaying the transcription of the current dialogue (or conversation) between the user and the DA in response to detecting user touch input 521 over restaurants button 520a in FIG. 5G. The displayed transcription includes the same information as in FIG. 5F. FIG. 5H further illustrates detecting user touch input 522 over DA button 512. In response to user touch input 522 over DA button 512, the DA is activated and enabled to receive an additional question or request from the user. For example, after user device 104 detects touch input 522, the user asks the DA, "What's the temperature in Charleston S.C."

Figure 5I:
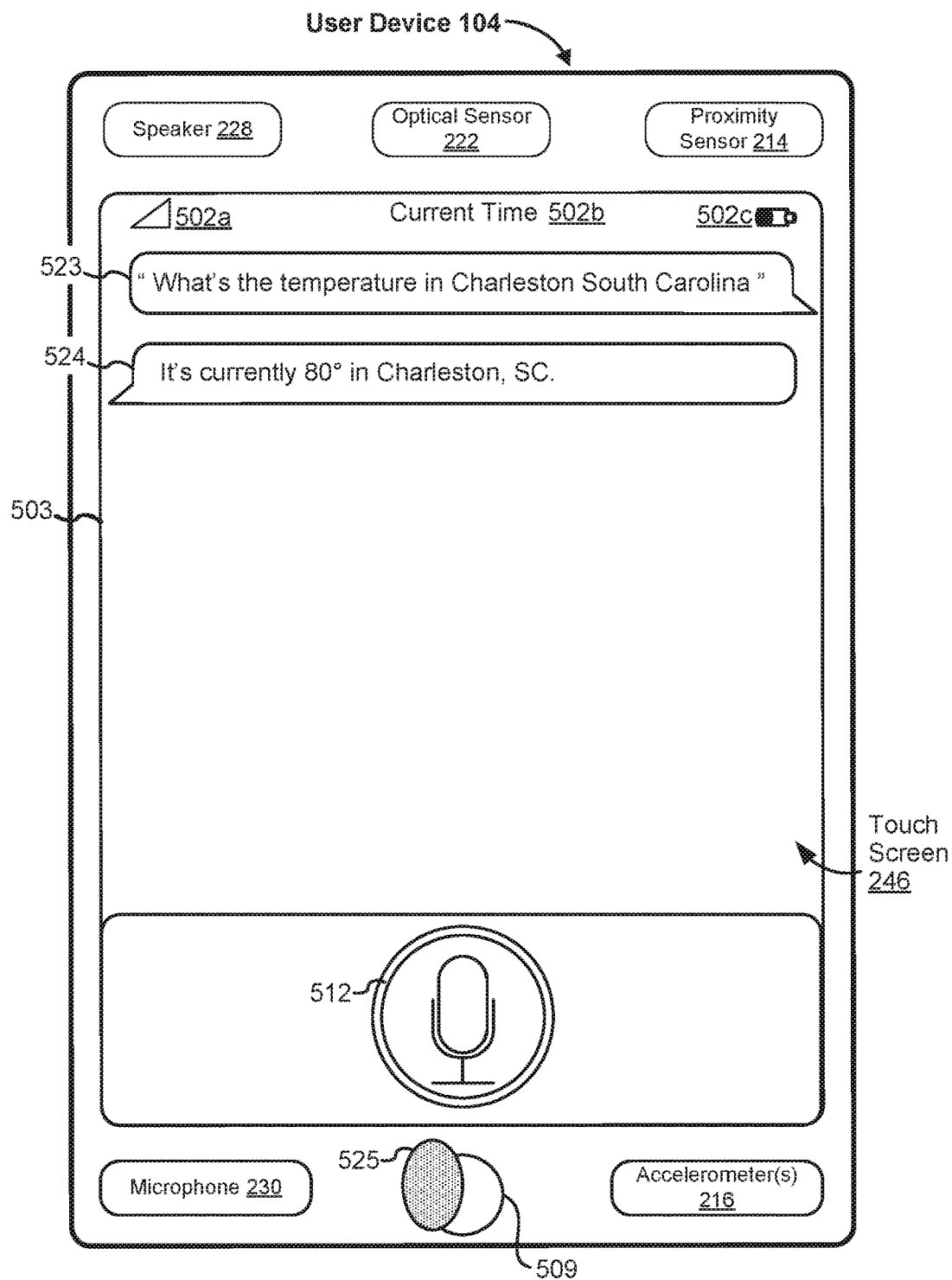

FIG. 5I illustrates the DA's response to the user's request, which is transcribed in box 523, within the DA user interface. The DA responds to the user's request by stating, "It's currently 80° in Charleston, S.C.," which is transcribed in box 524. FIG. 5I further illustrates detecting a user touch input 525 over home button 509.

Figure 5J:
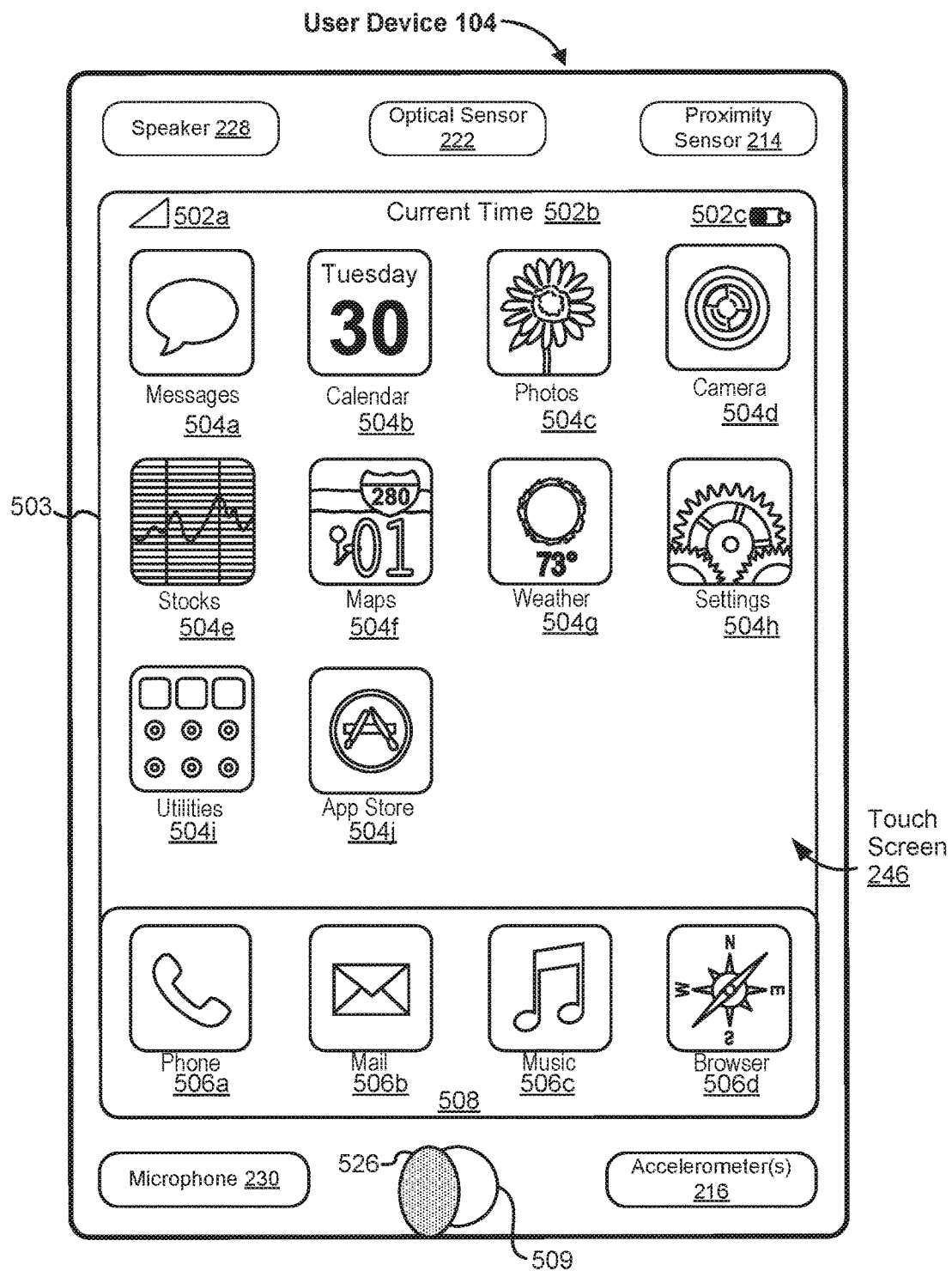

FIG. 5J illustrates displaying a user interface (e.g., a home screen) different from the DA user interface in response to detecting user touch input 525 over home button 509 in FIG. 5I. FIG. 5J further illustrates detecting a user touch input 526 over home button 509.

Figure 5K:
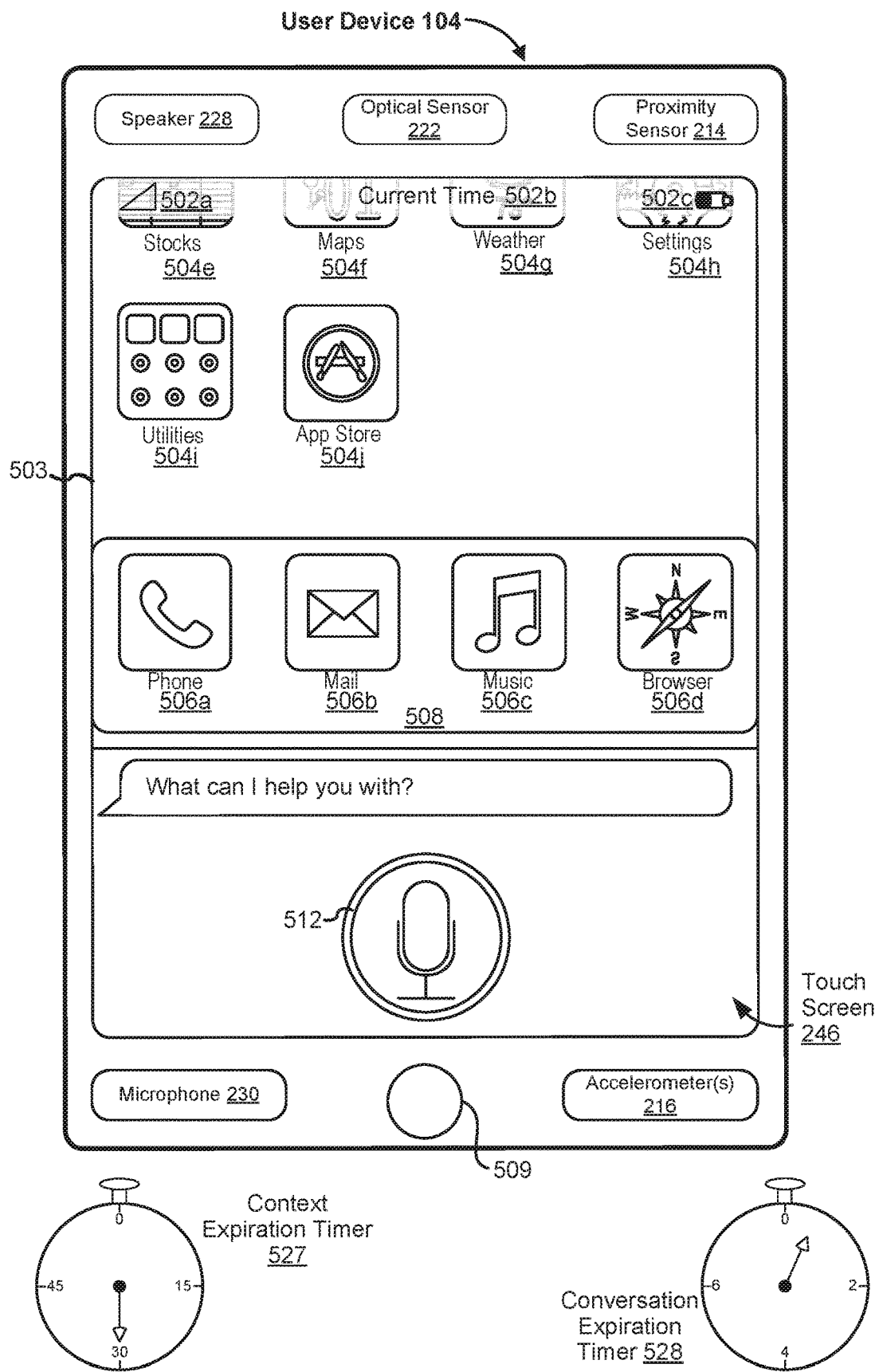

FIG. 5K illustrates invoking a second instance of a digital assistant (DA) in response to detecting the long press with user touch input 526 over home button 509 in FIG. 5J. FIG. 5K further illustrates a context expiration timer 527 and a conversation expiration timer 528. In some implementations, context expiration timer 527 is a sixty second timer that starts upon the user exiting the DA user interface. In some other implementations, context expiration timer 527 is a predetermined duration (e.g., 0, 2, 3, 4, 5, 6, 7, 8, etc. minutes) or a user defined duration. If the user invokes a subsequent instance of the DA within sixty seconds of exiting the DA user interface (or, more generally, before context expiration timer 527 expires), contextual information from the previous instance of the DA is enabled for use by the natural language processor for intent inference in the subsequent instance of the DA. If the user does not invoke a subsequent instance of the DA before context expiration timer 527 expires, contextual information from the previous instance of the DA is deleted from a context history memory.

In some implementations, conversation expiration timer 528 is an eight minute timer that starts upon the user exiting the DA user interface. In some other implementations, conversation expiration timer 528 is a predetermined duration (e.g., 0, 2, 4, 6, 8, 10, etc. minutes) or a user defined duration. If the user invokes a subsequent instance of the DA within eight minutes second of exiting the DA user interface (or, more generally, before conversation expiration timer 528 expires), a portion of the transcript of the dialogue (or conversation) between the user and the DA from the previous instance of the DA is available for display in the subsequent instance of the DA user interface. If the user does not invoke a subsequent instance of the DA before conversation expiration timer 528 expires (e.g., within eight minutes second of exiting the DA user interface), the aforementioned portion of the transcript of the dialogue (or conversation) between the user and the DA from the previous instance of the DA is not available for display in the subsequent instance of the DA user interface.

FIG. 5K further illustrates that the invocation of the second instance of a digital assistant (DA) occurs, in this example, approximately thirty seconds after exiting the first instance of the DA user interface in response to detecting user touch input 525 over home button 509 in FIG. 5I. Therefore, neither context expiration timer 527 nor conversation expiration timer 528 has expired, and both context and conversation information from the first instance of the DA user interface persists in the second instance of the DA user interface. In response to invoking the second instance of the DA, the DA audibly prompts the user by asking, "What can I help you with?" For example, in response to the prompt, the user asks the DA, "What about in Paris France?"

Figure 5L:
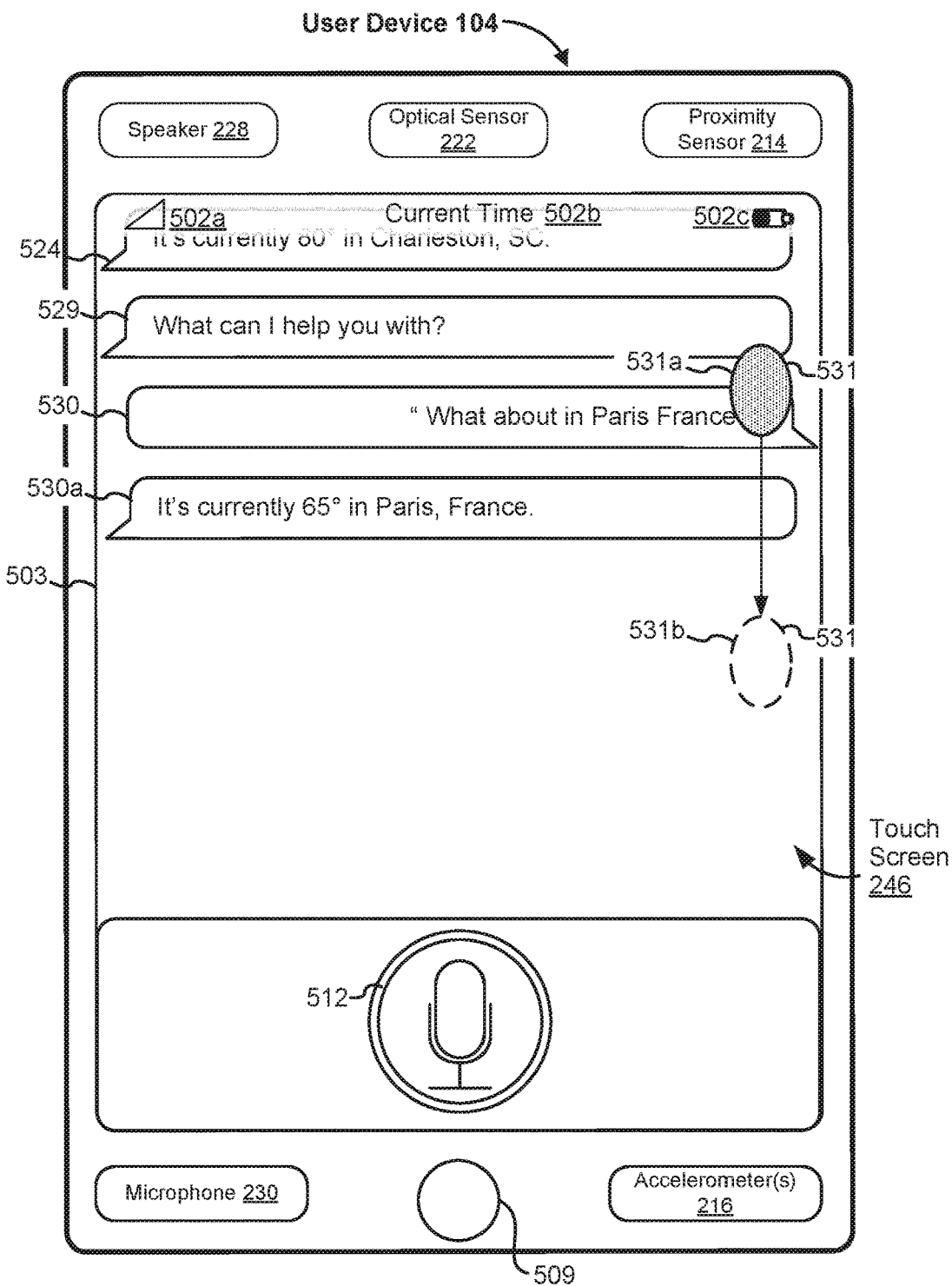

FIG. 5L illustrates the second instance of the DA user interface in an embodiment including a scrollable transcript where at least a portion of the dialogue (or conversation) from the first instance of the DA user interface is available for display. FIG. 5L further illustrates the response to the user's question, which is transcribed in box 530, within the second instance of the DA user interface. The DA responds to the user's question by stating that, "It's currently 65° in Paris France," which is transcribed in box 530a. The DA responds to the user's question with the aid of contextual information from the first instance of the DA user interface (e.g., weather context). Furthermore, a transcription of the DA's prompt is displayed in box 529, and a portion of the transcription of the dialogue (or conversation) between the user and the DA from the first instance of the DA user interface is partially displayed in box 524. FIG. 5L further illustrates detecting a downward dragging gesture (sometimes also herein called a "swipe gesture") of user touch input 531 from position 531a to 531b.

Figure 5M:
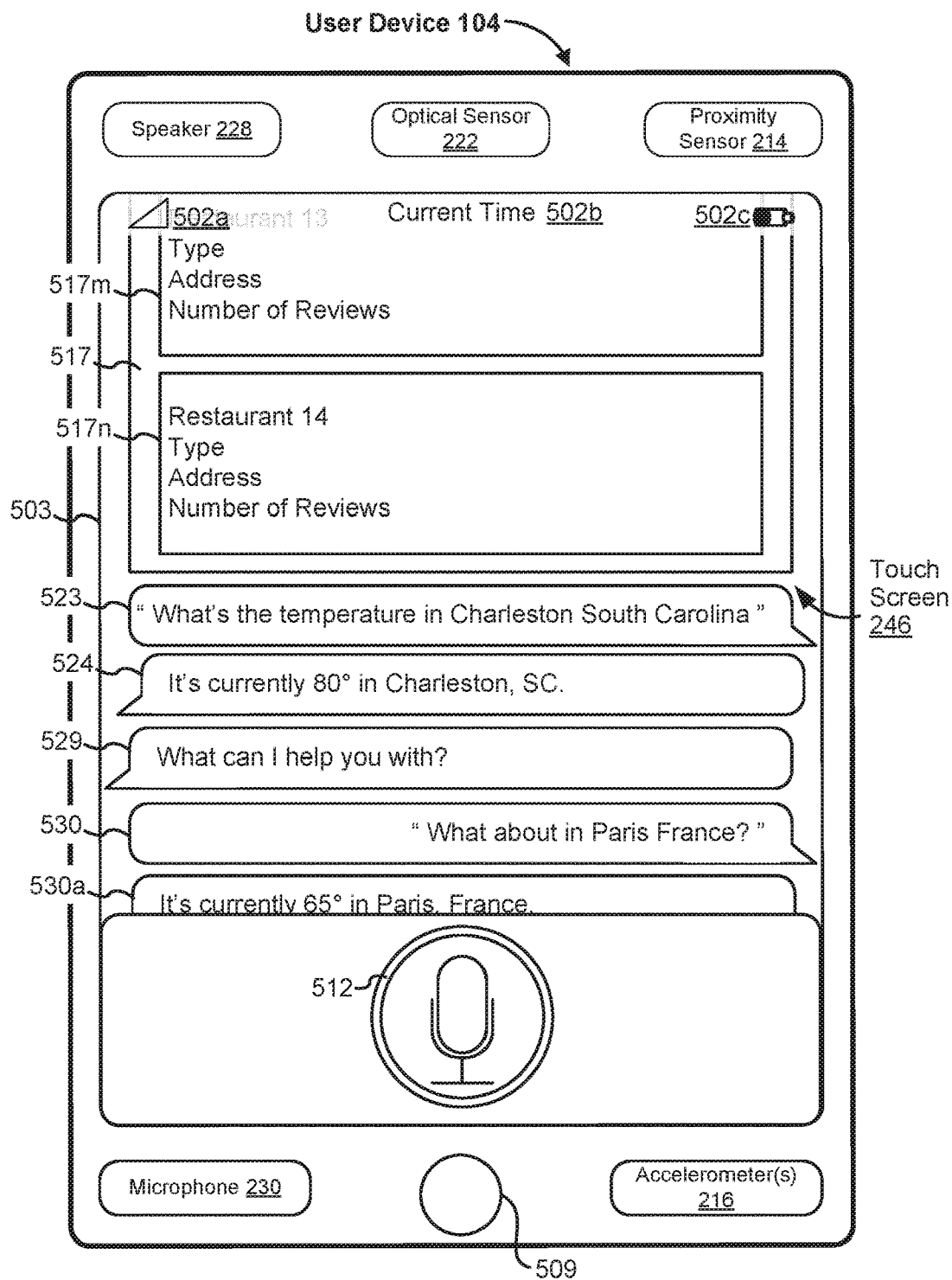

FIG. 5M illustrates scrolling down a transcription (e.g., a speech to text transcription) of the dialogue (or conversation) between the user and the DA within the second instance of the DA user interface in response to detecting the downward dragging gesture detected in FIG. 5L. The displayed transcription includes dialogue from the current (second) instance of the DA user interface and dialogue from the previous (first) instance of the DA user interface. The displayed transcription includes the dialogue from the second instance of the DA user interface displayed in FIG. 5L. In box 524, the displayed transcription includes the user's question from the first instance of the DA user interface, "What's the temperature in Charleston S.C.?" In box 523, the displayed transcription also includes the DA's response, "It's currently 80° in Charleston, S.C.," to the user's question. The displayed transcription further includes the list 517 of restaurants from the first instance of the DA user interface including information container 517n pertaining to Restaurant 14 and a portion of information container 517m pertaining to Restaurant 13.

Figure 5N:
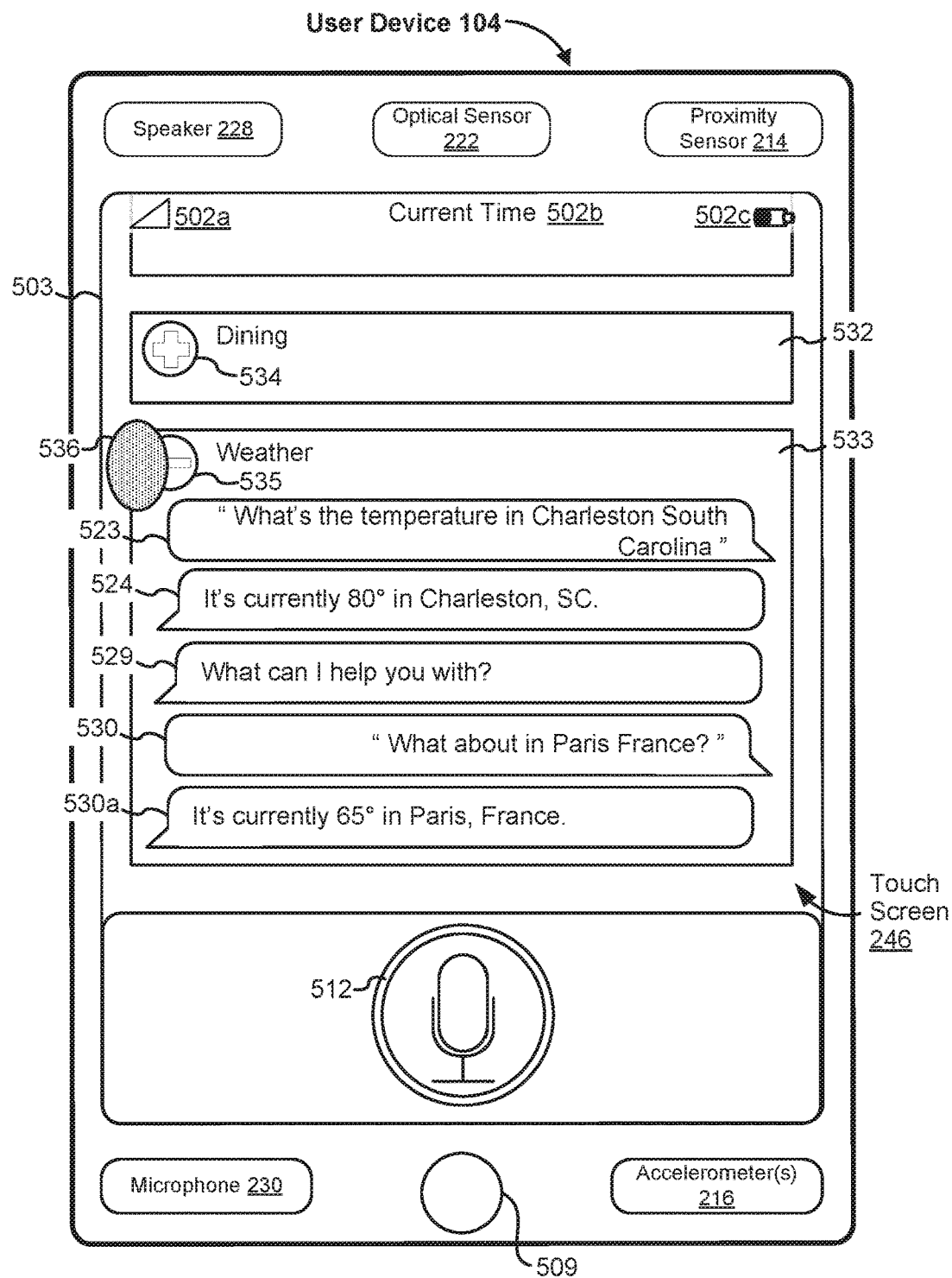

FIG. 5N illustrates the second instance of the DA user interface in another embodiment including a collapsible directory structure for a transcript of a dialogue between the user and the DA. In some embodiments, the directory structure divides question and answer pairs from the transcript into respective partitions. In some other embodiments, the directory structure divides the transcript into similar topics. FIG. 5N shows the dialogue from the first and second instances of the DA user interface divided into a dining topic 532 and a weather topic 533.

As shown in FIG. 5N, dining topic 532 is currently minimized (or collapsed), and button 534 is configured to maximize dining topic 532 so as to show at least a portion of the dialogue corresponding to the dining topic 532. Weather topic 533 is currently maximized and displays at least a portion of the dialogue related to weather from the first and second instances of the DA user interface. Button 535 is configured to minimize weather topic 533 so as to cease displaying the portion of the dialogue related to weather from the first and second instances of the DA user interface. FIG. 5N further illustrates detecting a user touch input 536 over button 535. Each user interface button is sometimes herein called an affordance, or user interface affordance, or user interface objection.

Figure 5O:
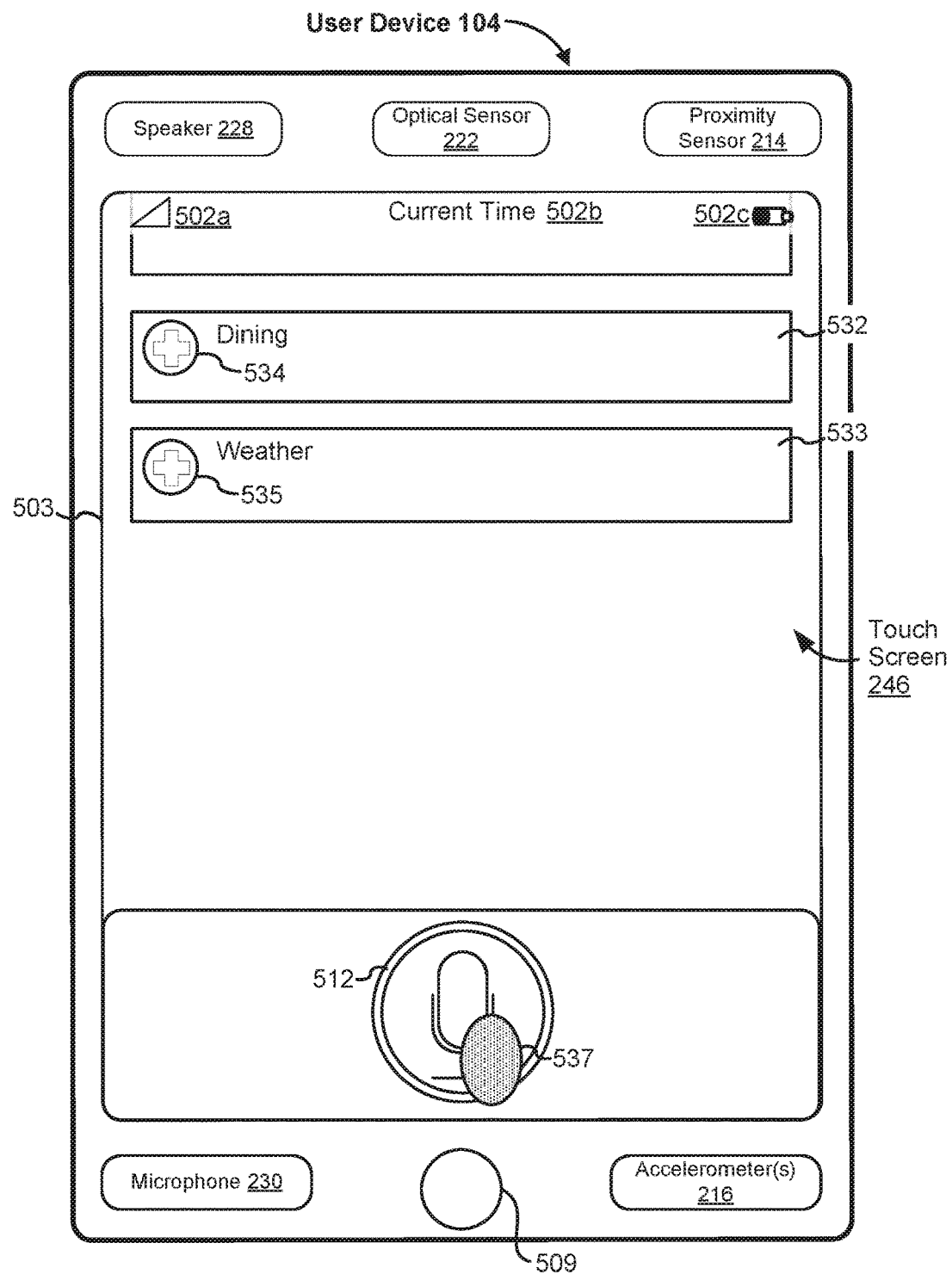

FIG. 5O illustrates minimizing weather topic 533 in response to detecting user touch input 536 over button 535 in FIG. 5N. FIG. 5O further illustrates detecting a user touch input 537 over DA button 512. In response to user touch input 537 over DA button 512, the DA is activated (e.g., microphone 230 is turned on) and enabled to receive an additional question or request from the user. For example, after user device 104 detects touch input 5137, the user asks the DA, "What about in Munich?"

In some embodiments, if a respective topic is minimized within the collapsible directory structure, contextual information for portions of the dialogue related to the respective topic are excluded from context history. In turn, the excluded contextual information is not used in intent inference by natural language processor 332 when the DA is attempting to respond to a user's question or request.

Figure 5P:
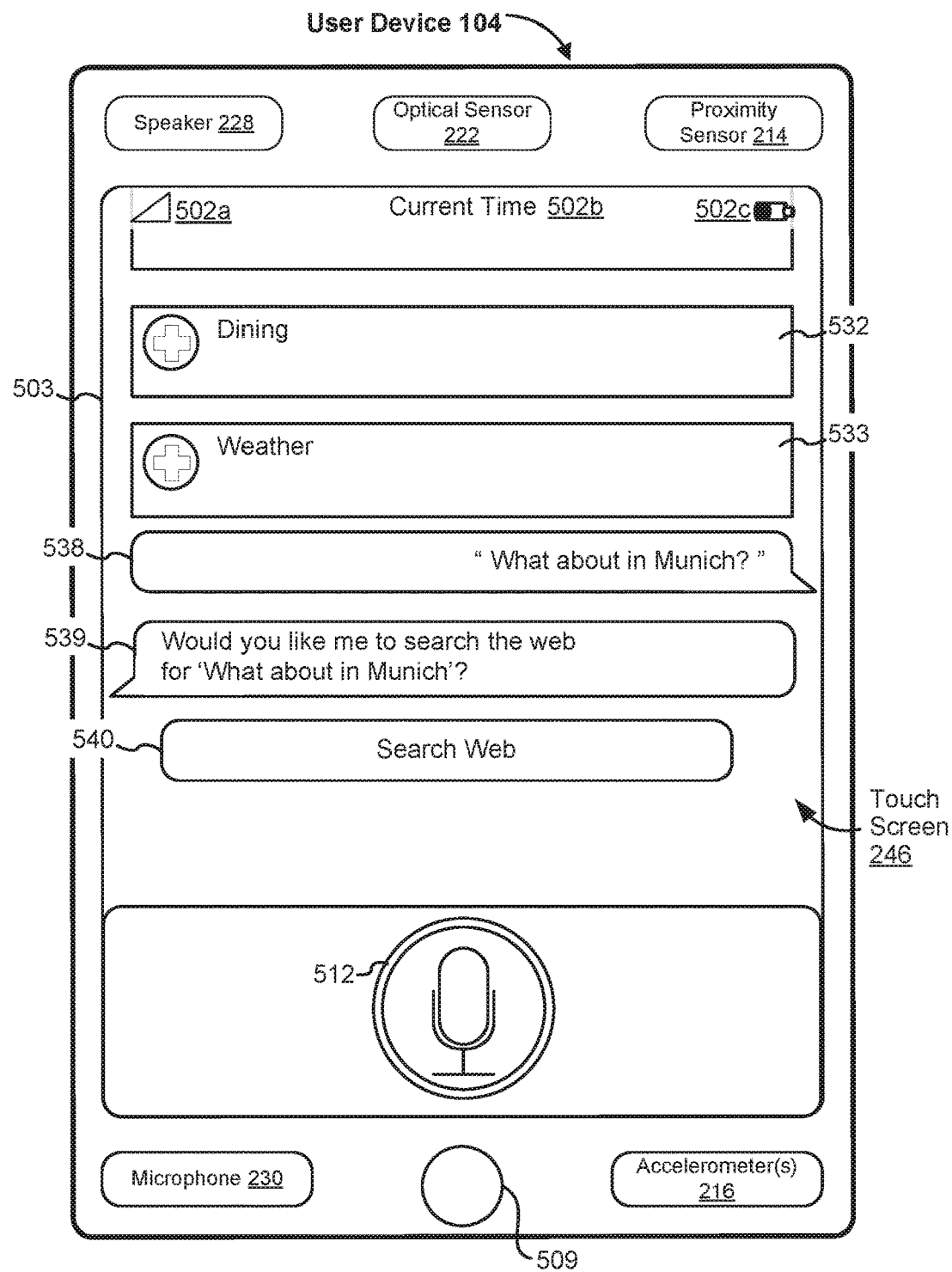

FIG. 5P illustrates the DA's response to the user's question, which is transcribed in box 538, within the second instance of the DA user interface. The DA responds to the user's request by stating, "Would you like me to search the web for 'What about Munich'?" The second instance of the DA user interface also displays a "search the web" button 540 which is configured to execute a web search for 'What about in Munich.' In FIG. 5P, the DA does not infer that the user's question "What about in Munich?" refers to weather because contextual information related to weather topic 533 has been excluded from the context history.

Figure 5Q:
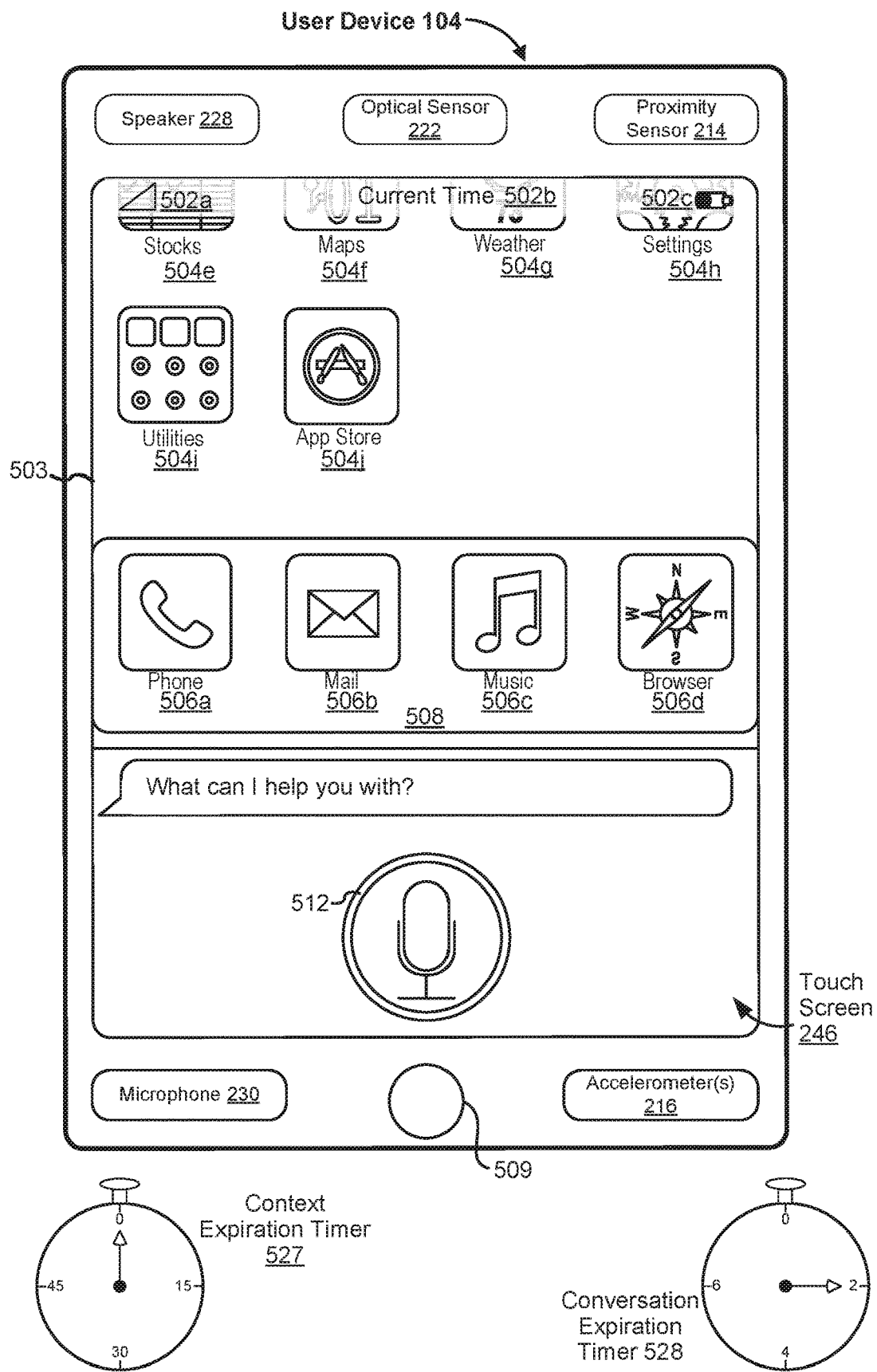

FIG. 5Q illustrates invoking a second instance of a digital assistant (DA) in response to detecting the long press with user touch input 526 over home button 509 in FIG. 5J. FIG. 5Q further illustrates that the invocation of the second instance of a digital assistant (DA) occurs, in this example, approximately two minutes (e.g., conversation expiration timer 528 is at the two minute marker) after exiting the first instance of the DA user interface in response to user touch input 525 over home button 509 in FIG. 5I. Therefore, context expiration timer 527 has expired, and only conversation information from the first instance of the DA user interface persists in the second instance of the DA user interface. In response to invoking the second instance of the DA, the DA audibly prompts the user by asking, "What can I help you with?" For example, in response to the prompt, the user asks the DA, "What about in Paris France?"

Figure 5R:
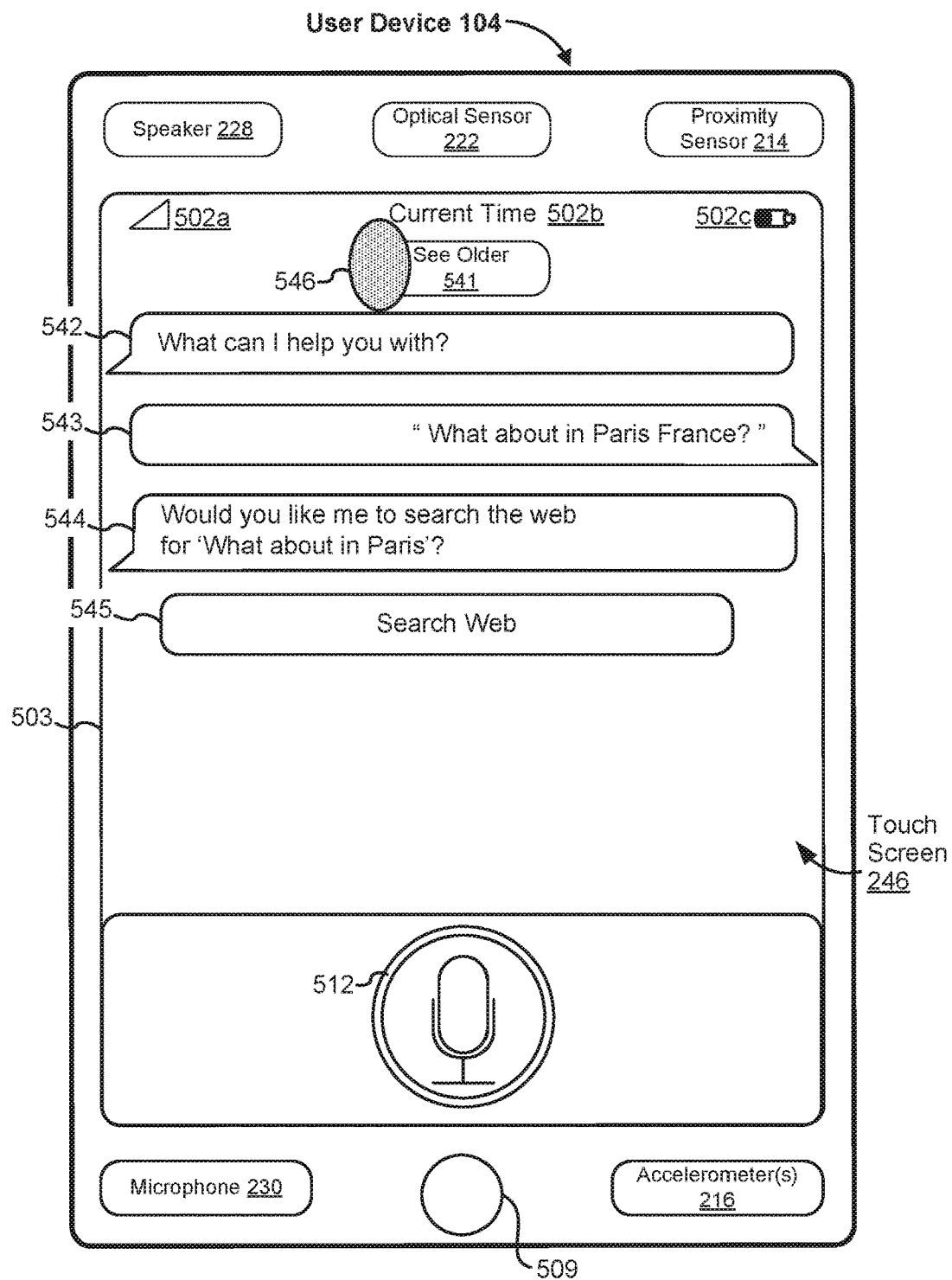

FIG. 5R illustrates the second instance of the DA user interface in an embodiment where a transcript of the dialogue (or conversation) between the user and the DA from the first instance of the DA user interface is available for display. FIG. 5R also illustrates "see older" button 541 displayed in user interface 503. "See older" button 541 is configured to display at least a portion of the transcript of the dialogue from the first instance of the DA user interface. A transcription of dialogue from the second instance of the DA user interface is displayed below "see older" button 541. The transcription of dialogue from the second instance of the DA user interface includes the DA's prompt displayed in box 542, the user's question displayed in box 543, and the DA's response displayed in box 544.

As transcribed in box 544, the DA responds to the user's question by stating, "Would you like me to search the web for 'What about in Paris France'?" The second instance of the DA user interface also displays a "search the web" button 545 which is configured to execute a web search for 'What about in Paris France.' In FIG. 5R, the DA does not infer that the user's question, transcribed in box 543, refers to weather because contextual information from the first instance of the DA user interface has been deleted from the context history due to context expiration timer expiring prior to invocation of the second instance of the DA. FIG. 5R further illustrates detecting user touch input 546 over "see older" button 541.

Figure 5S:
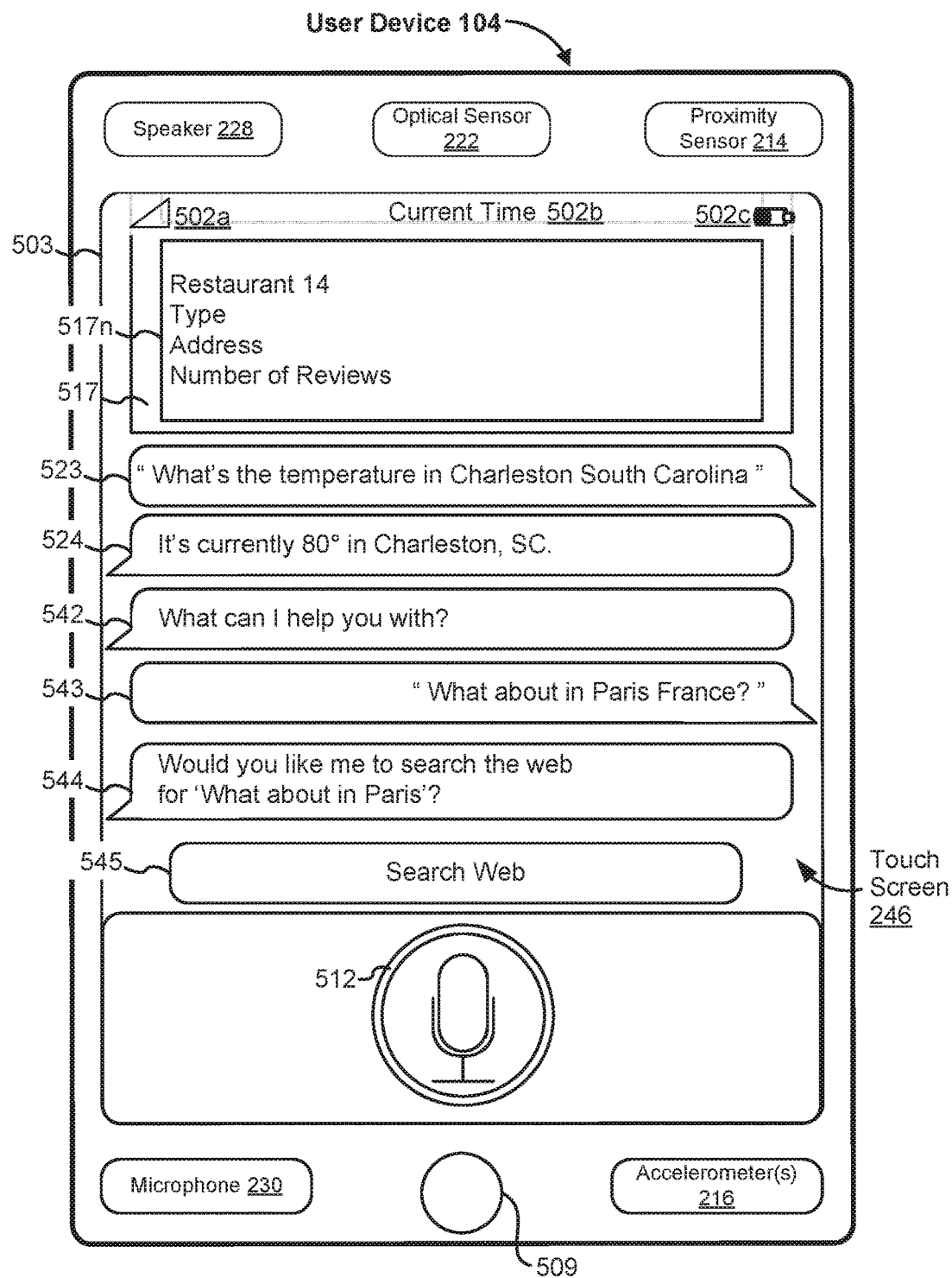

FIG. 5S illustrates displaying, in the second instance of the DA user interface, at least a portion of the transcript of the dialogue from the first instance of the DA user interface in response detecting to user touch input 546 over "see older" button 541 in FIG. 5R. The displayed transcription includes dialogue from the current (second) instance of the DA user interface and dialogue from the previous (first) instance of the DA user interface. The displayed transcription includes the dialogue from the second instance of the DA user interface displayed in FIG. 5R. The displayed transcription includes the user's question "What's the temperature in Charleston S.C.?" and the DA's response "It's currently 80° in Charleston, S.C." from the first instance of the DA user interface. The displayed transcription further includes list 517 of restaurants from the first instance of the DA user interface including information container 517*n* pertaining to Restaurant 14.

Figure 5T:
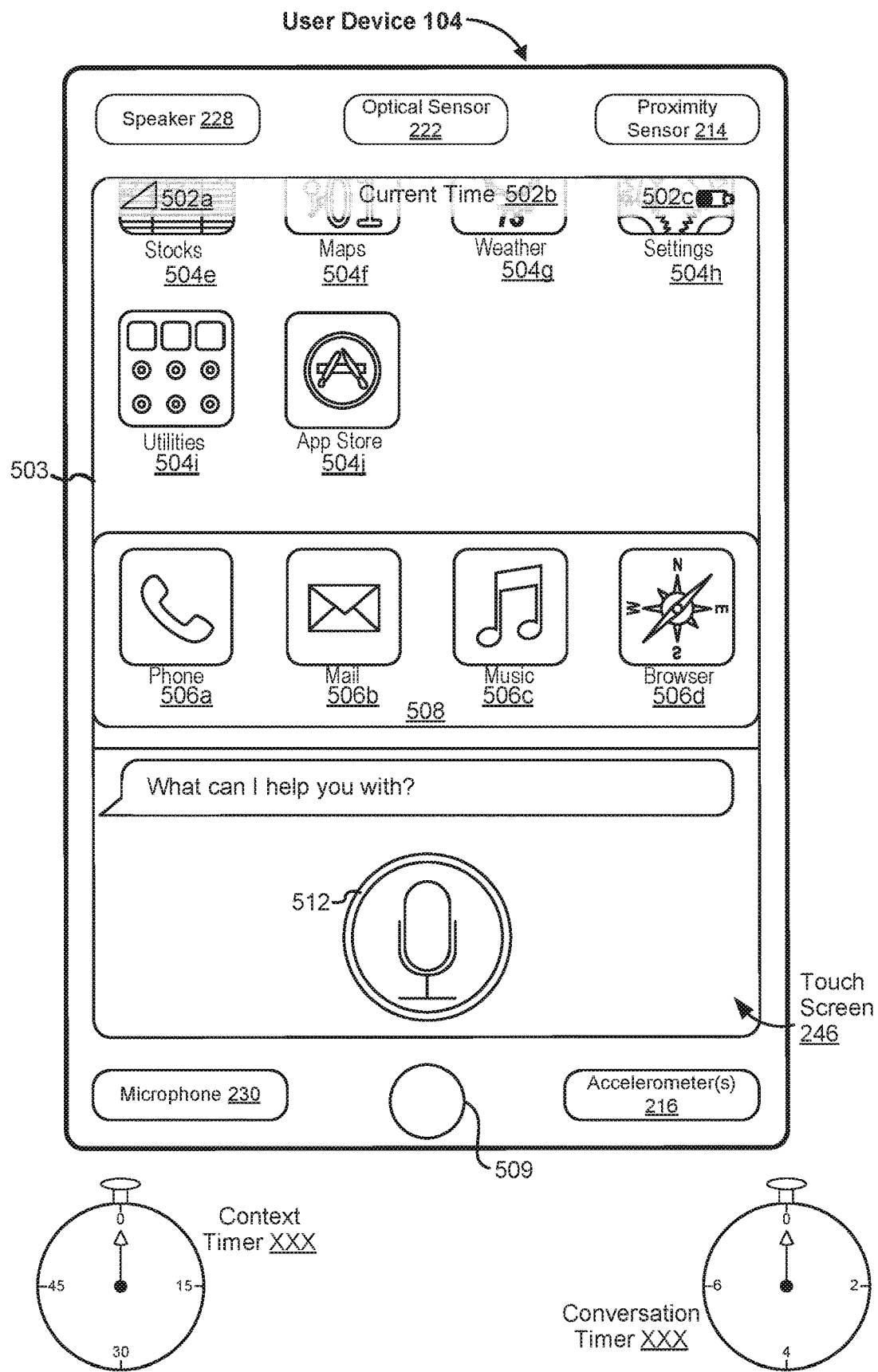

FIG. 5T illustrates invoking a second instance of a digital assistant (DA) in response to detecting the long press with user touch input 526 over home button 509 in FIG. 5J. FIG. 5T further illustrates that the invocation of the second instance of a digital assistant (DA) occurs more than eight minutes after exiting the first instance of the DA user interface in response to user touch input 525 over home button 509 in FIG. 5I. Therefore, both context expiration timer 527 and conversation expiration timer 528 have expired, and neither context nor conversation information from the first instance of the DA user interface persists in the second instance of the DA user interface. In response to invoking the second instance of the DA, after the expiration of both context expiration timer 527 and conversation expiration timer 528, the DA audibly prompts the user by asking, "What can I help you with?" For example, in response to the prompt, the user asks the DA, "What about in Paris France?"

Figure 5U:
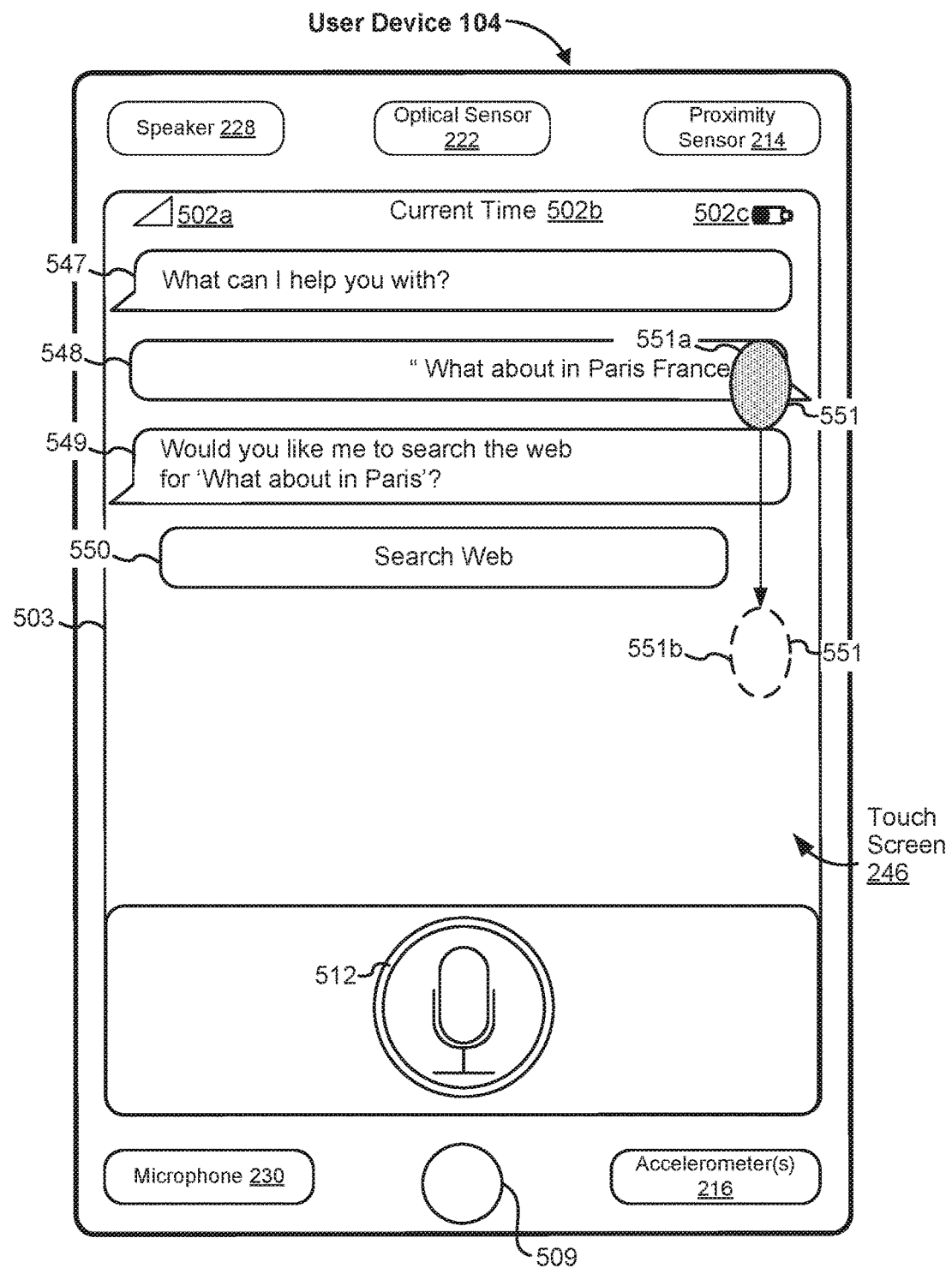

FIG. 5U illustrates the second instance of the DA user interface in an embodiment where a transcript of the dialogue (or conversation) between the user and the DA from the first instance of the DA user interface is not available for display. As transcribed in box 549, the DA responds to the user's question by stating, "Would you like me to search the web for 'What about in Paris France'?" The second instance of the DA user interface also displays "search the web" button 550 which is configured to execute a web search for 'What about in Paris France.' In FIG. 5U, the DA does not infer that the user's question, transcribed in box 548, refers to weather because contextual information from the first instance of the DA user interface has been deleted from the context history due to context expiration timer 527 expiring prior to the invocation of the second instance of the DA. FIG. 5U further illustrates detecting a downward dragging gesture of user touch input 551 from position 551*a* to 551*b*.

Figure 5V:
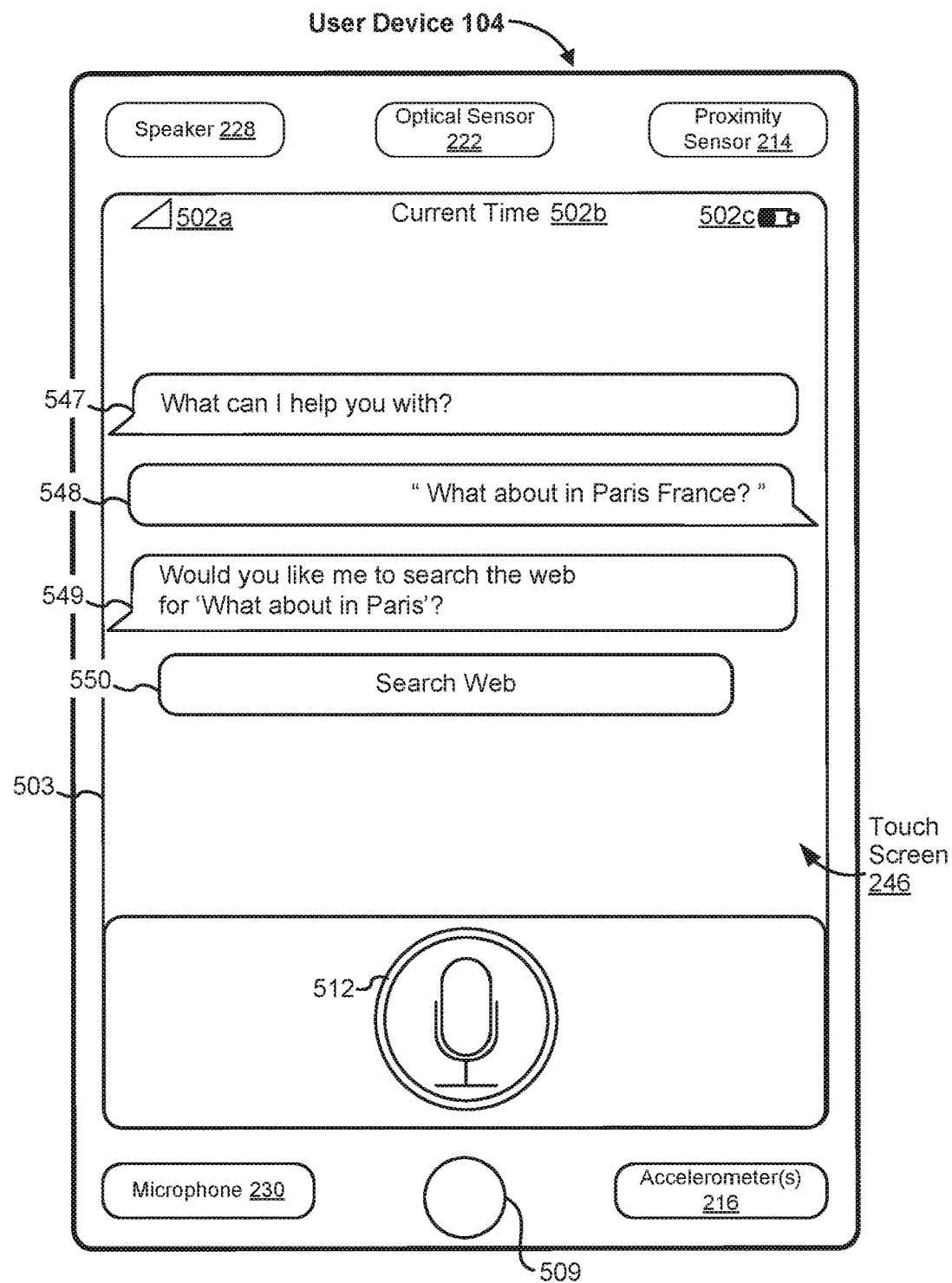

FIG. 5V illustrates scrolling up user interface 503 in response to detecting the downward dragging gesture in FIG. 5U. A portion of the transcript from the first instance of the DA user interface is not available for display even after scrolling upwards because the conversation expiration timer 528 expired before the second instance of the DA was invoked.

Figure 5W:
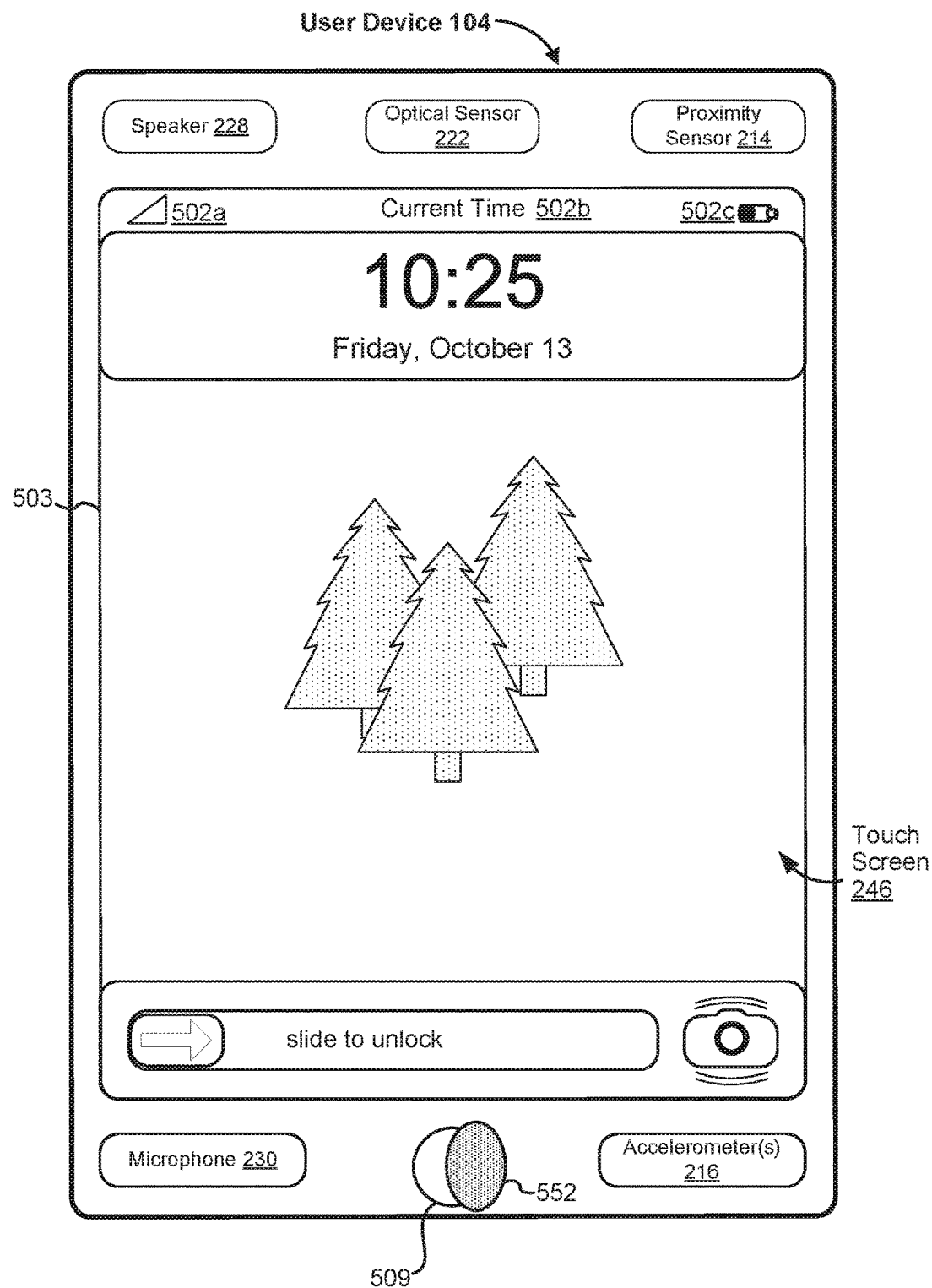

FIG. 5W illustrates displaying a user interface (e.g., a lock screen) different from the DA user interface. FIG. 5W further illustrates detecting a user touch input 552 over home button 509.

Figure 5X:
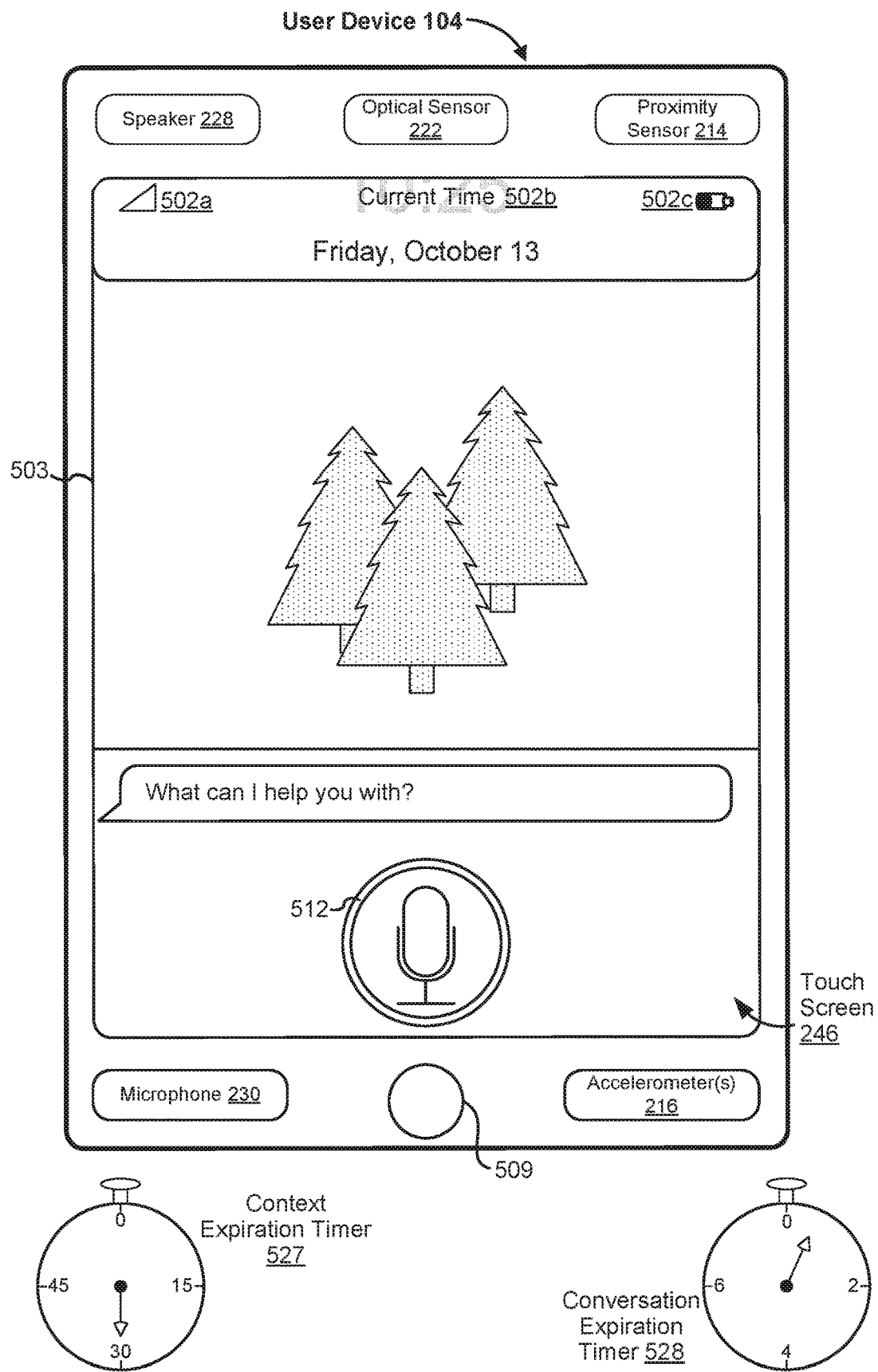

FIG. 5X illustrates invoking a second instance of a digital assistant (DA) in response to detecting the long press with user touch input 552 over home button 509 in FIG. 5W. FIG. 5X further illustrates that the invocation of the second instance of a digital assistant (DA) occurs, in this example, approximately thirty seconds after exiting the first instance of the DA user interface in response to user touch input 525 over home button 509 in FIG. 5I. In some embodiments, while user device 104 is locked, neither context nor conversation information from the first instance of the DA user interface persists in the second instance of the DA user interface even when neither the context expiration timer 527 nor the conversation expiration timer have expired. In response to invoking the second instance of the DA, the DA audibly prompts the user by asking, "What can I help you with?" For example, in response to the prompt, the user asks the DA, "What about in Budapest?"

Figure 5Y:
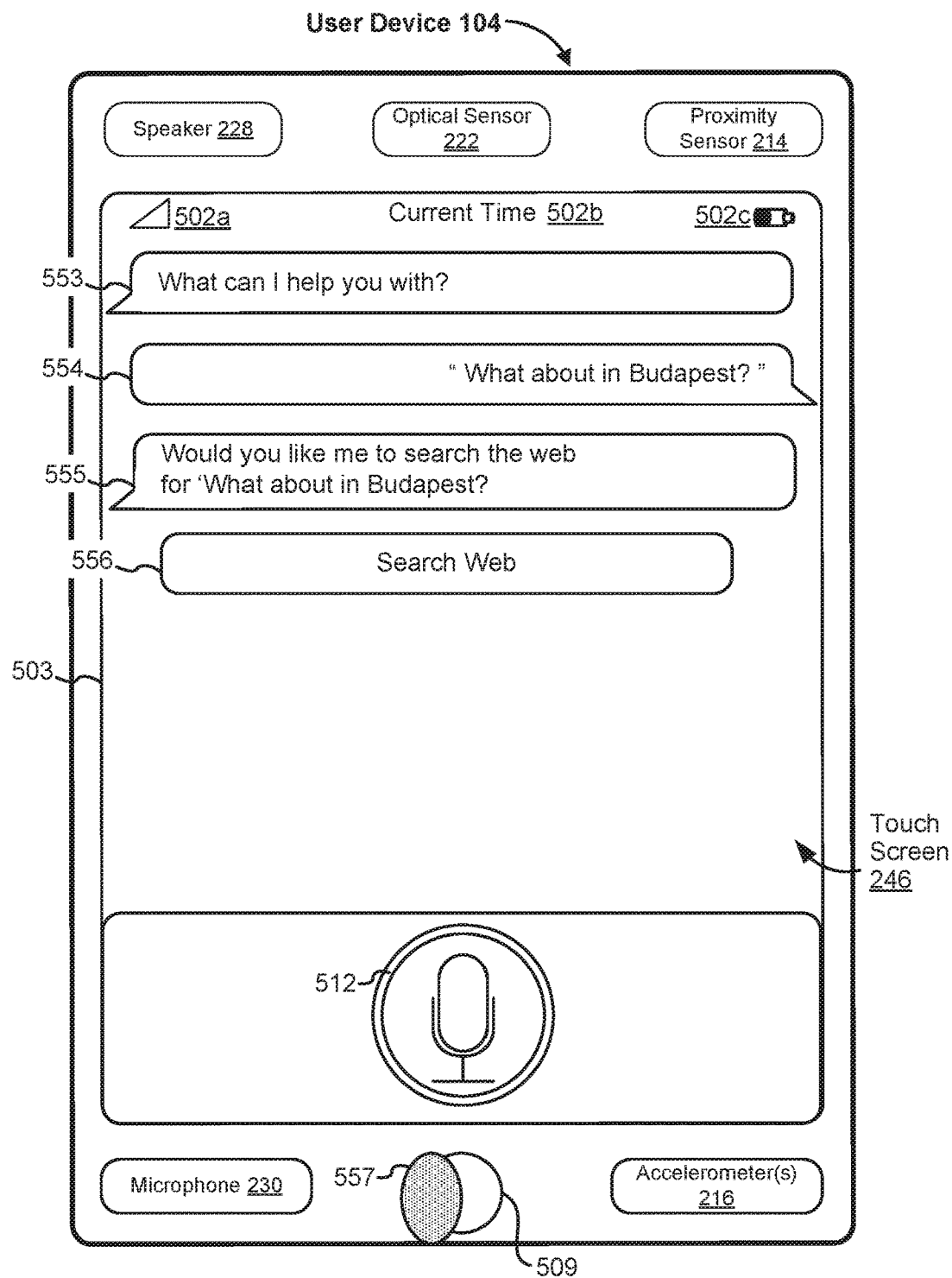

FIG. 5Y illustrates the second instance of the DA user interface in an embodiment where a transcript of the dialogue (or conversation) between the user and the DA from the first instance of the DA user interface is not available for display. As transcribed in box 555, the DA responds to the user's question by stating, "Would you like me to search the web for 'What about in Budapest'?" The second instance of the DA user interface also displays "search the web" button 556 which is configured to execute a web search for 'What about in Budapest.' In FIG. 5Y, the DA does not infer that the user's question, transcribed in box 554, refers to weather because contextual information from the first instance of the DA user interface is excluded from context history while user device 104 is locked. FIG. 5Y further illustrates detecting a user touch input 557 over home button 509.

Figure 5Z:
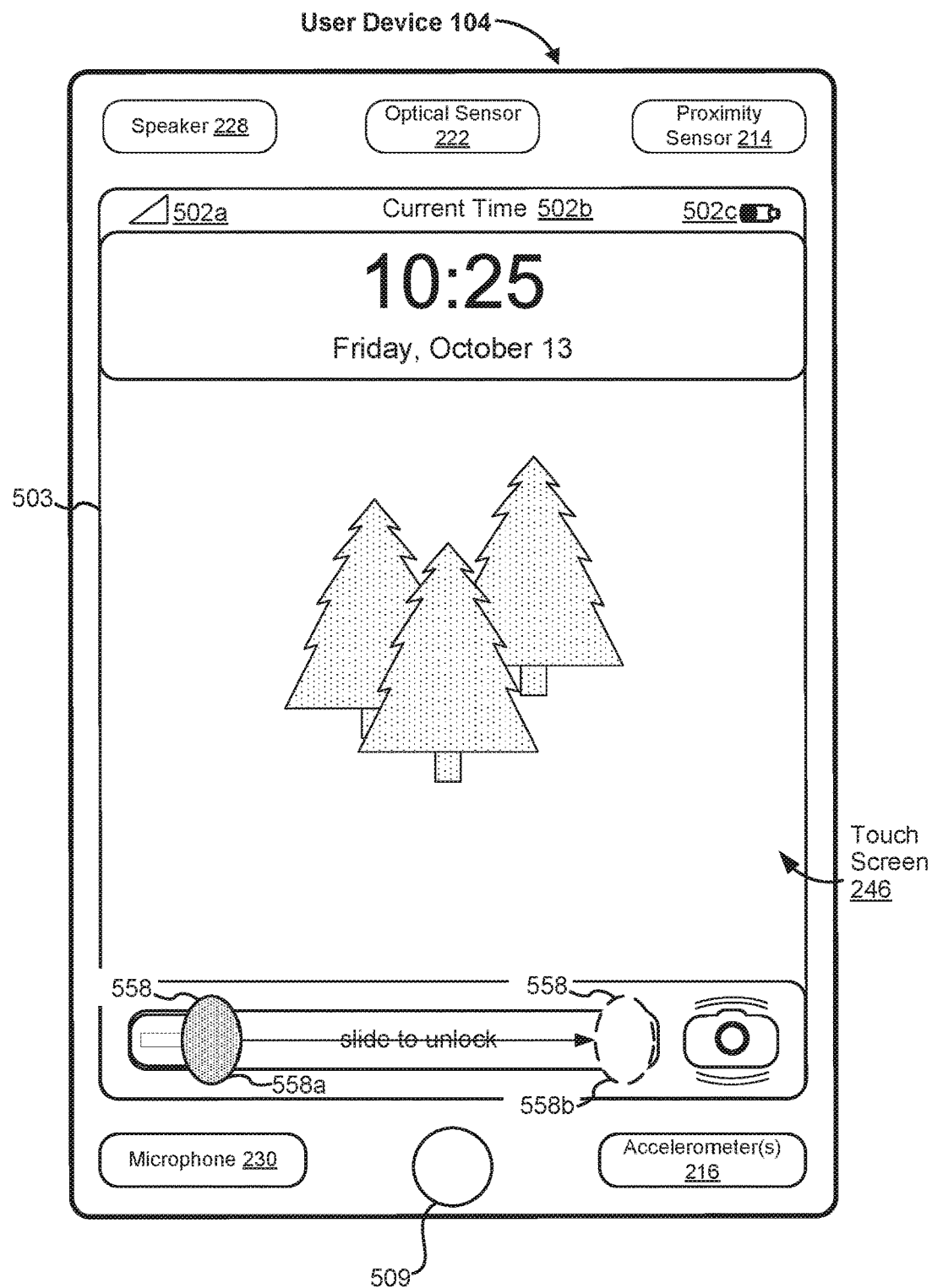
Figure 5A:
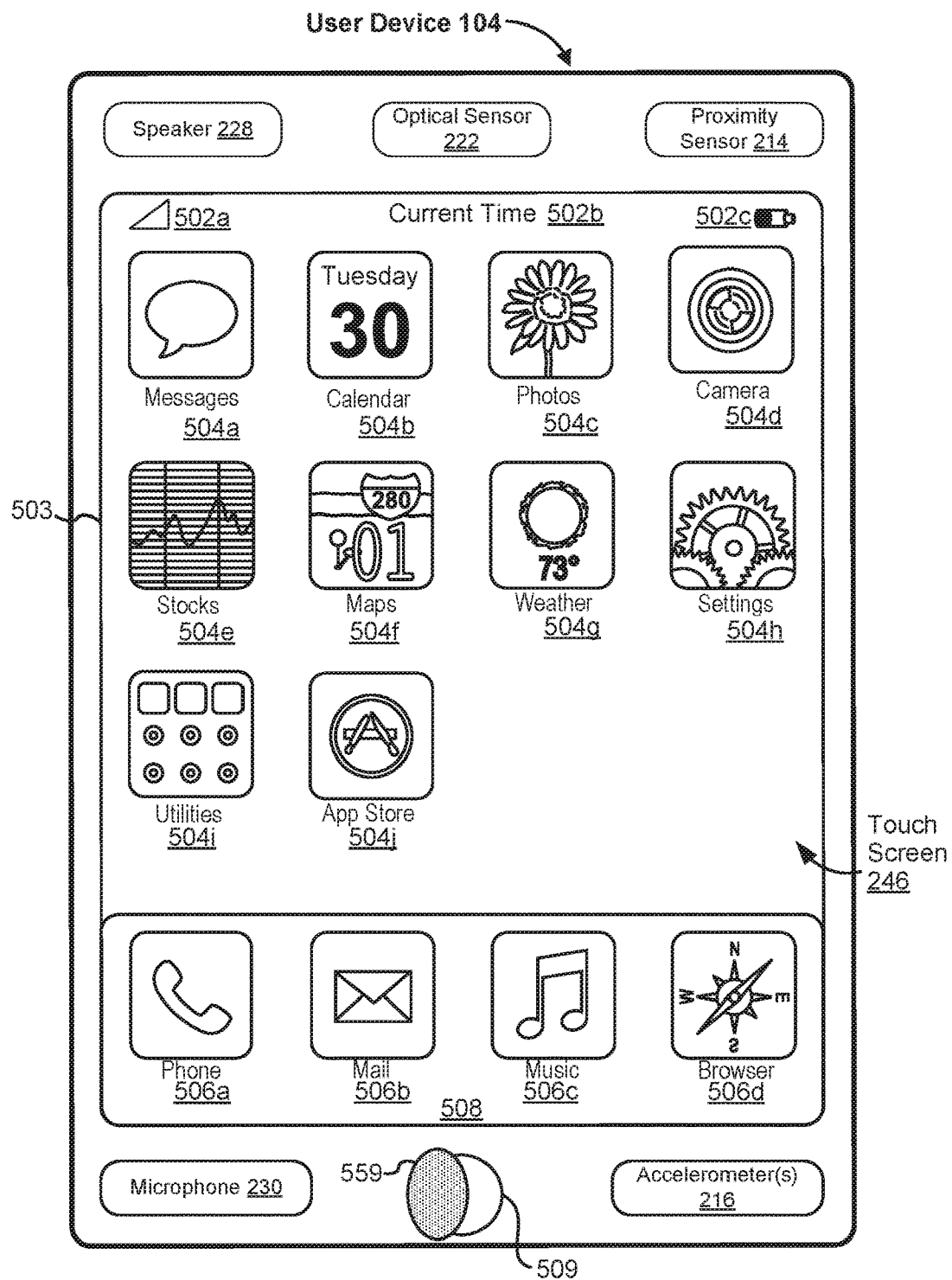
Figure 5B:
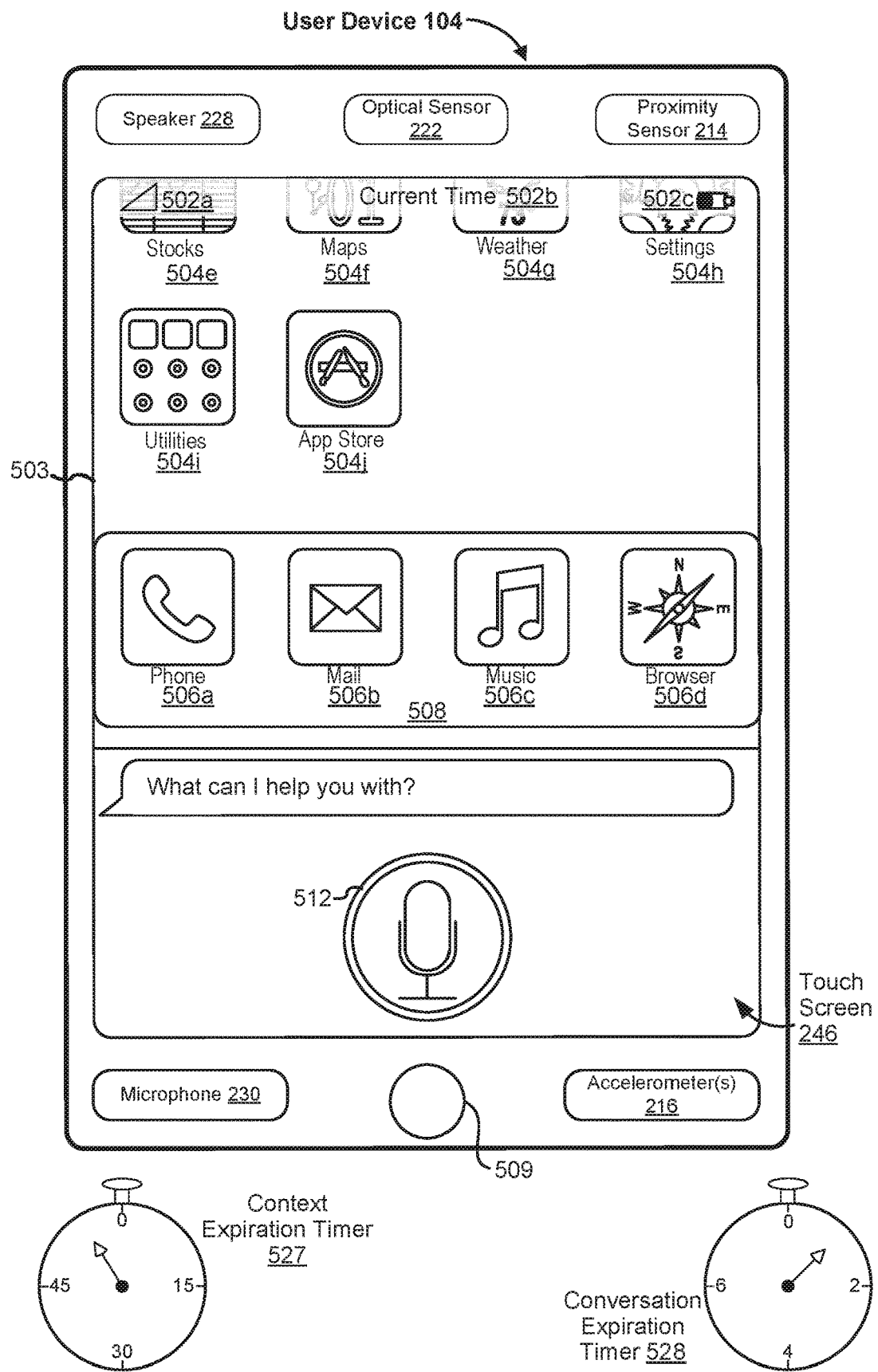
Figure 5C:
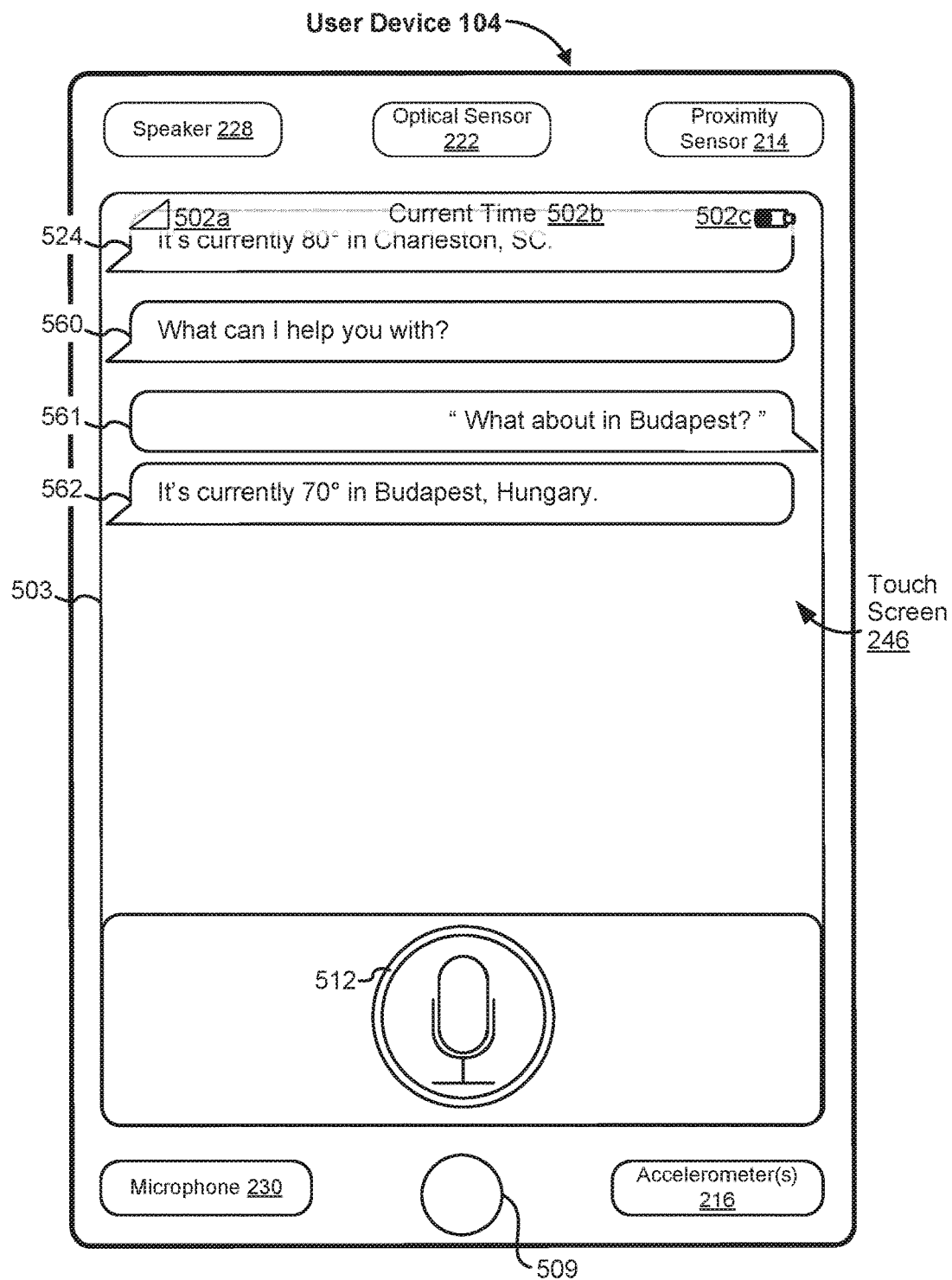
Figure 5D:
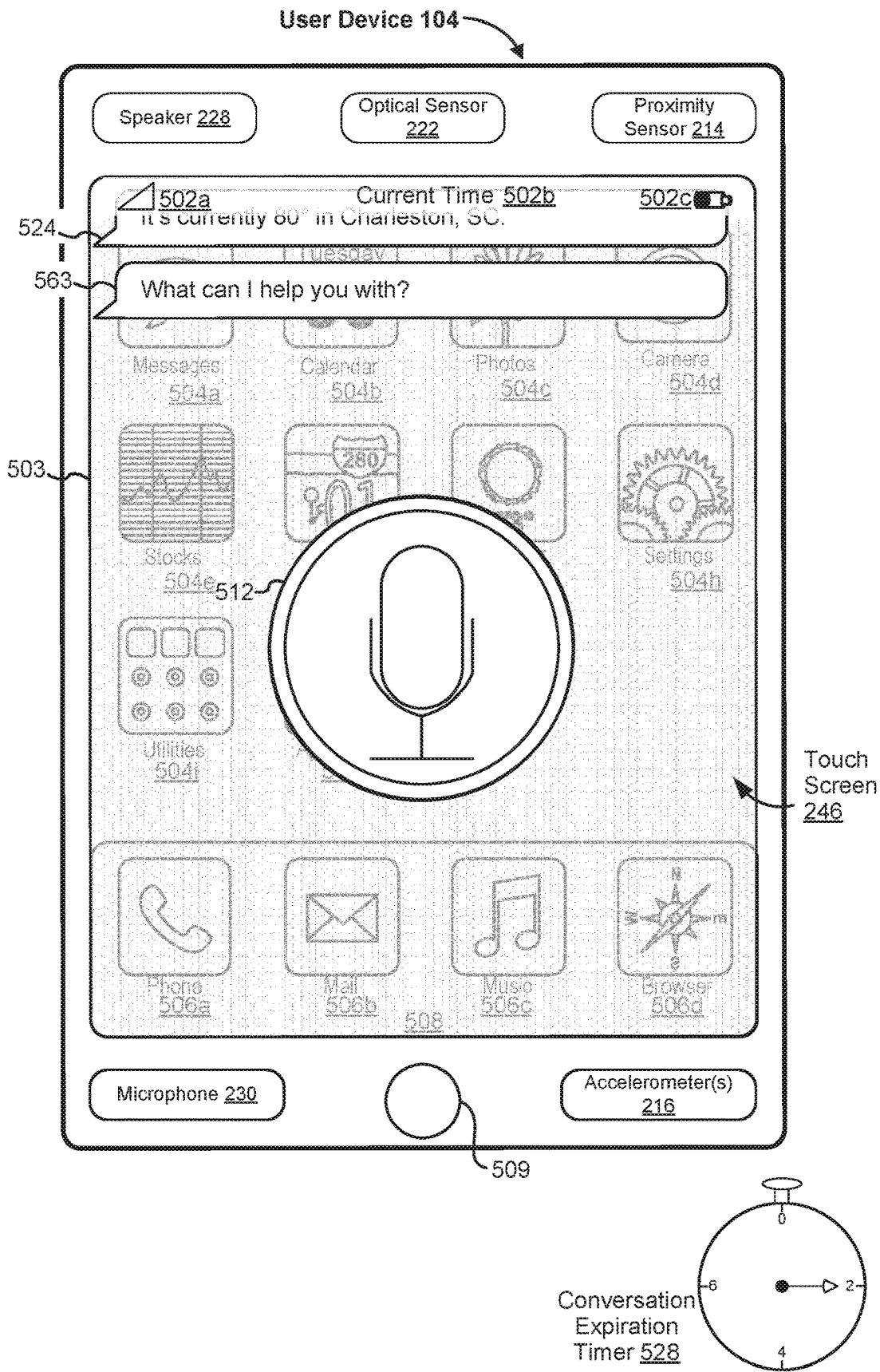
Figure 5E:
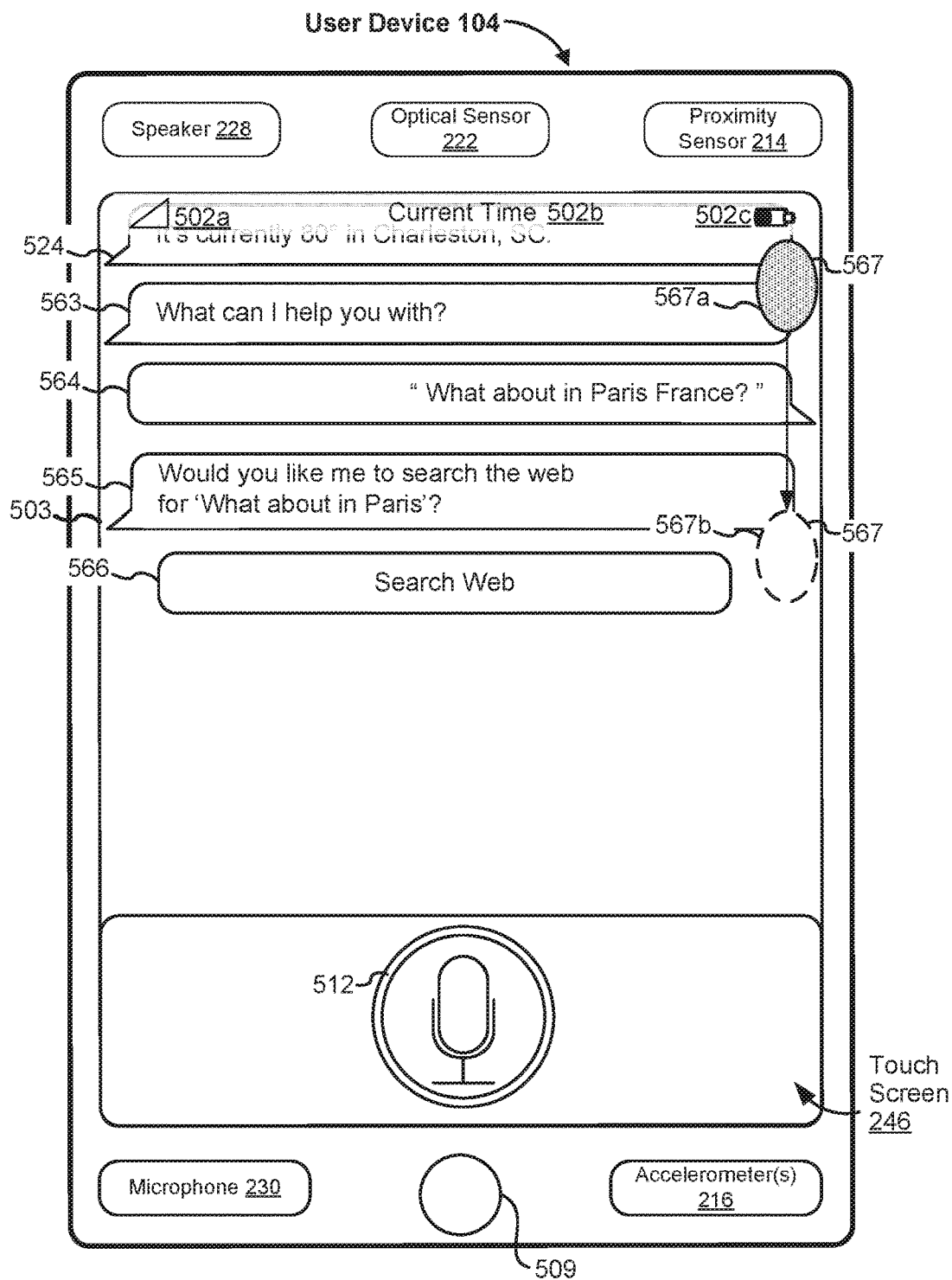
Figure 5F:
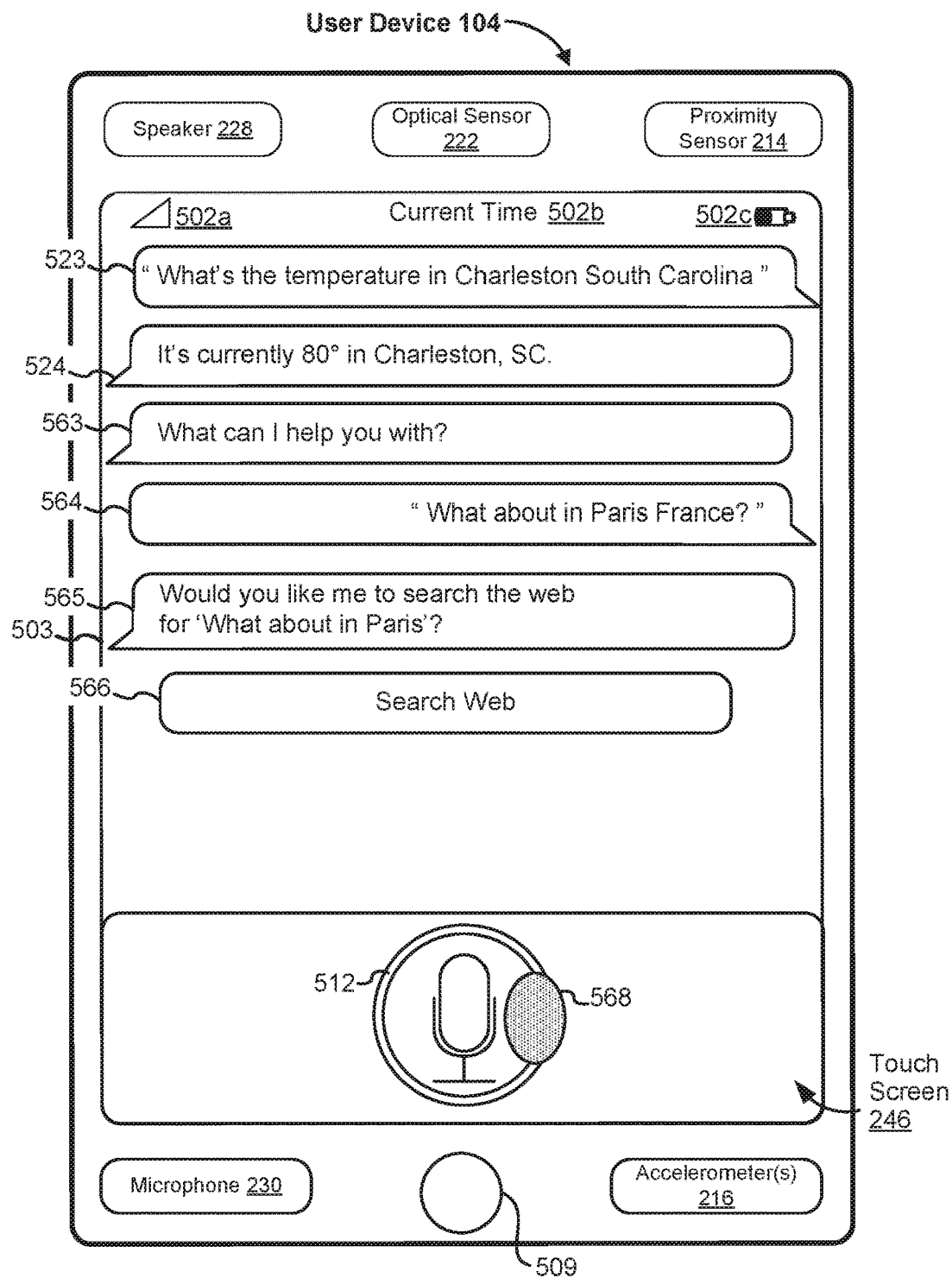
Figure 5G:
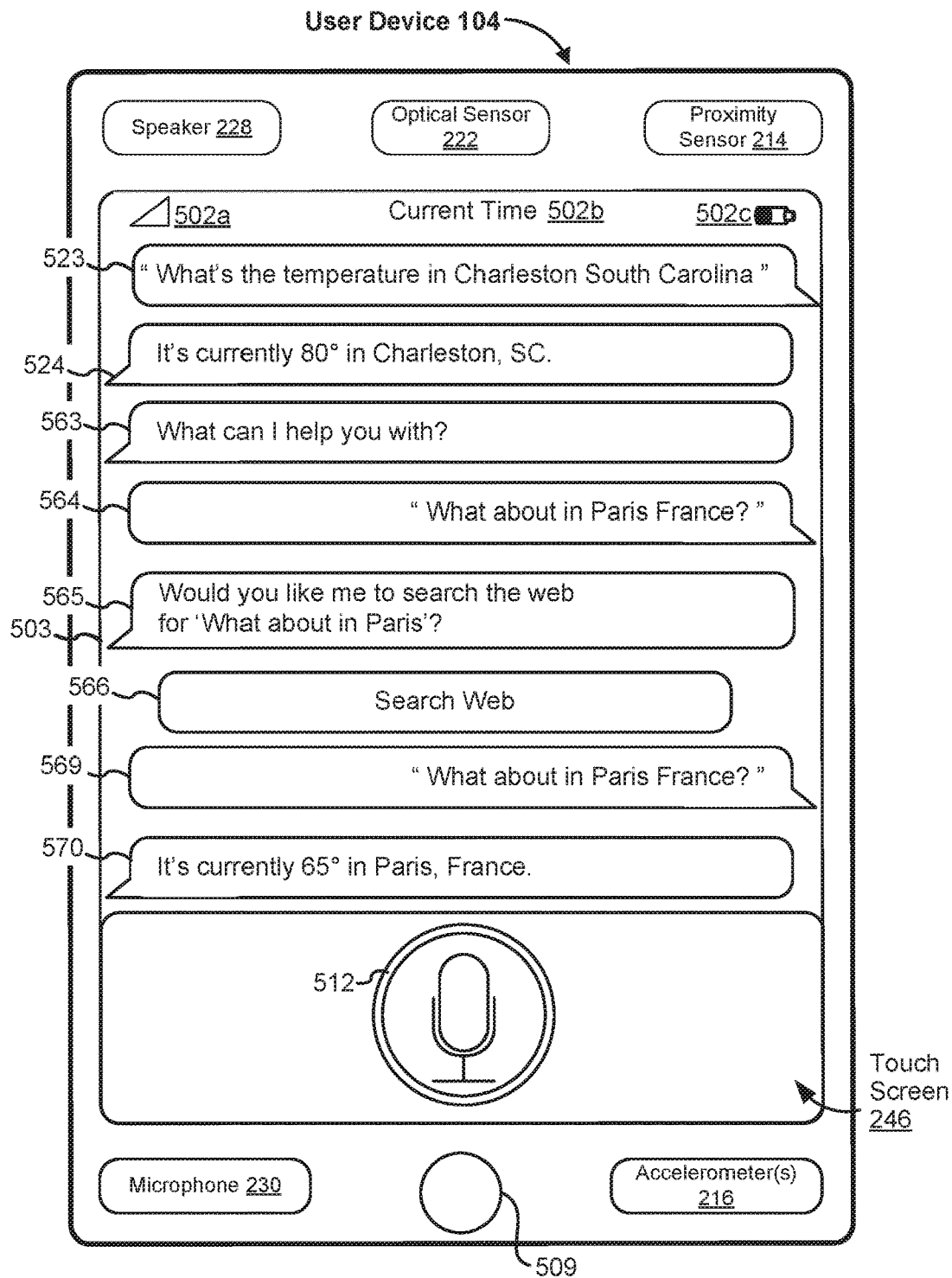
Figure 5H:
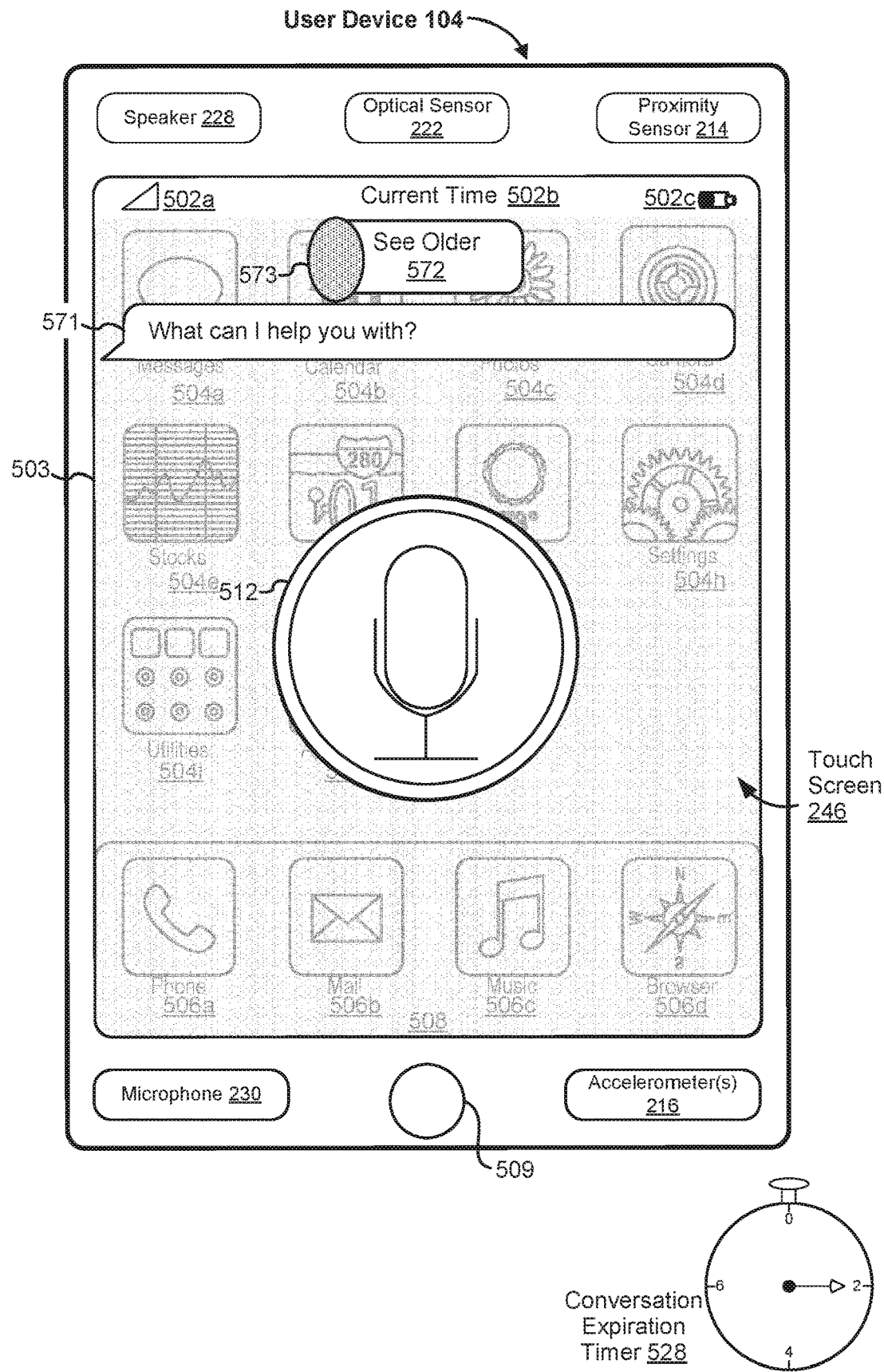
Figure 5I:
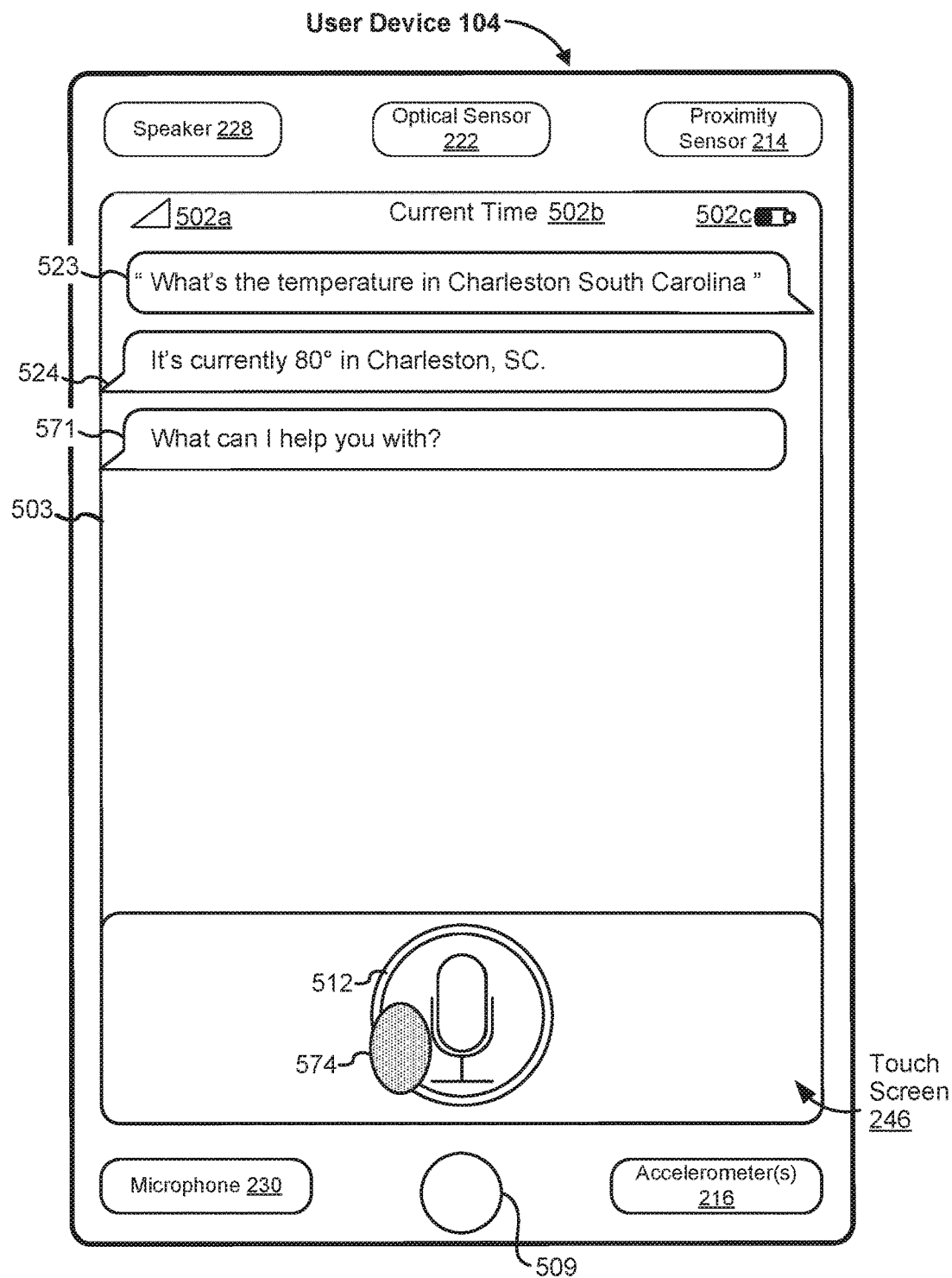
Figure 5J:
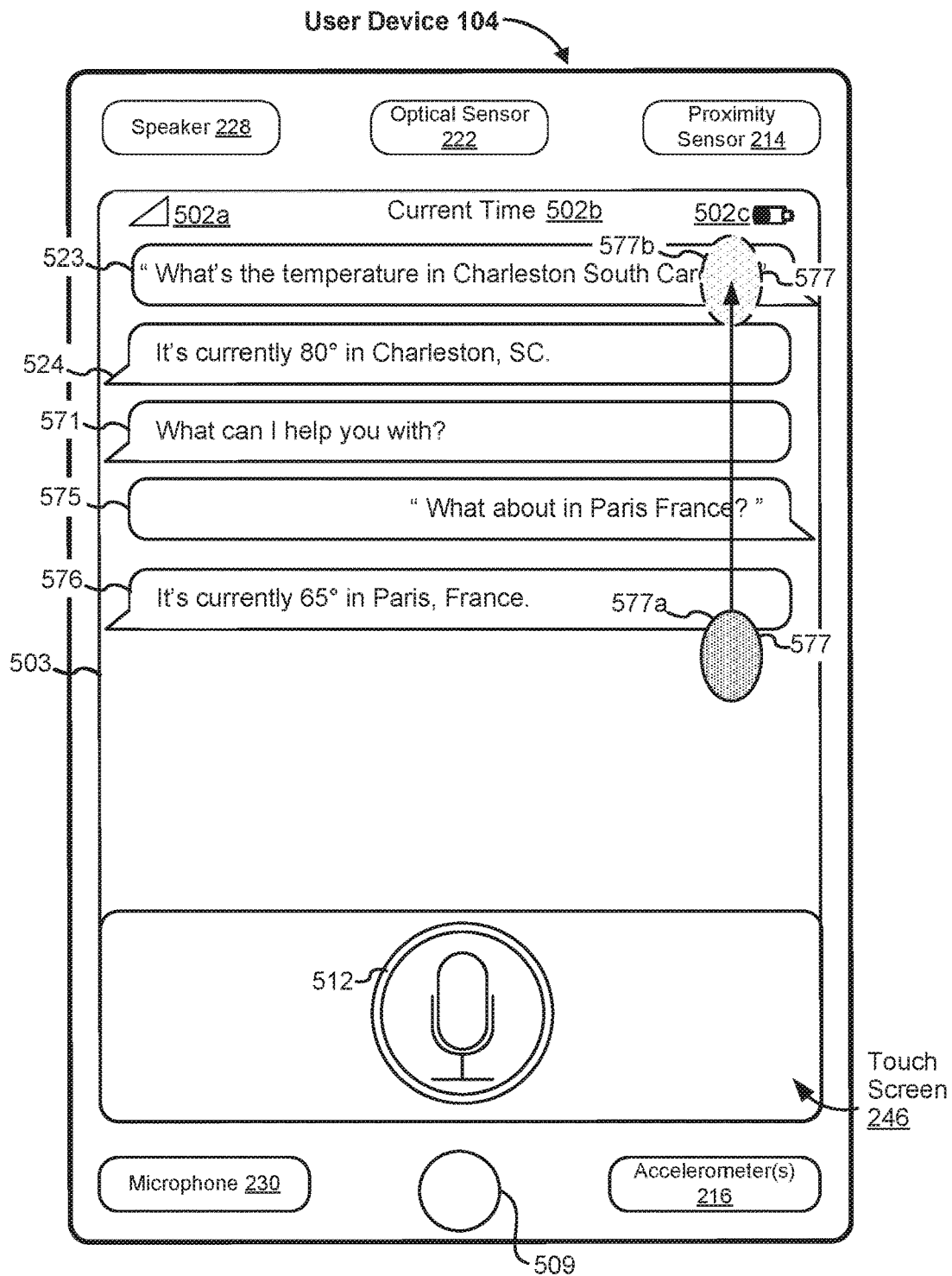
Figure 5K:
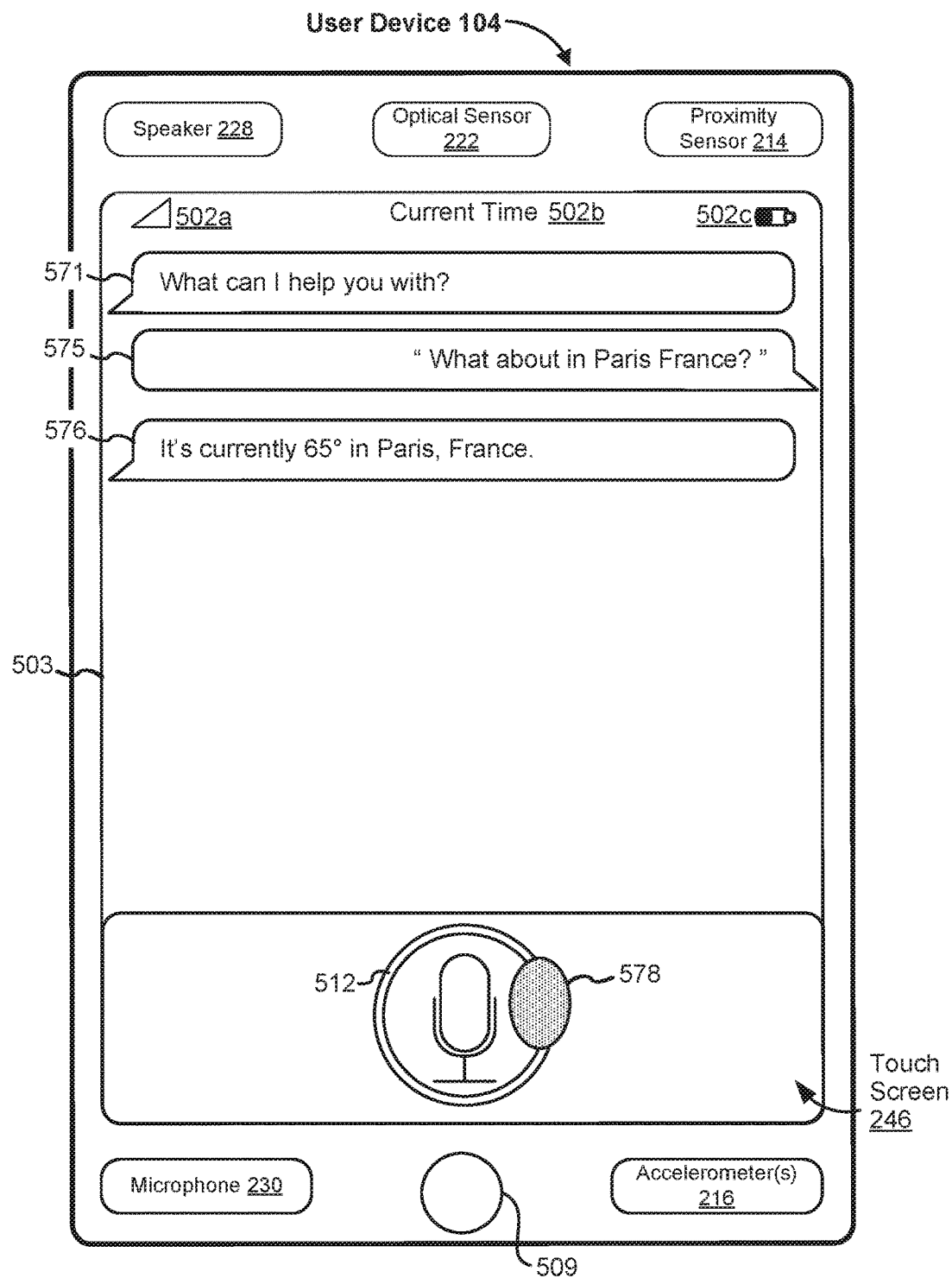
Figure 5L:
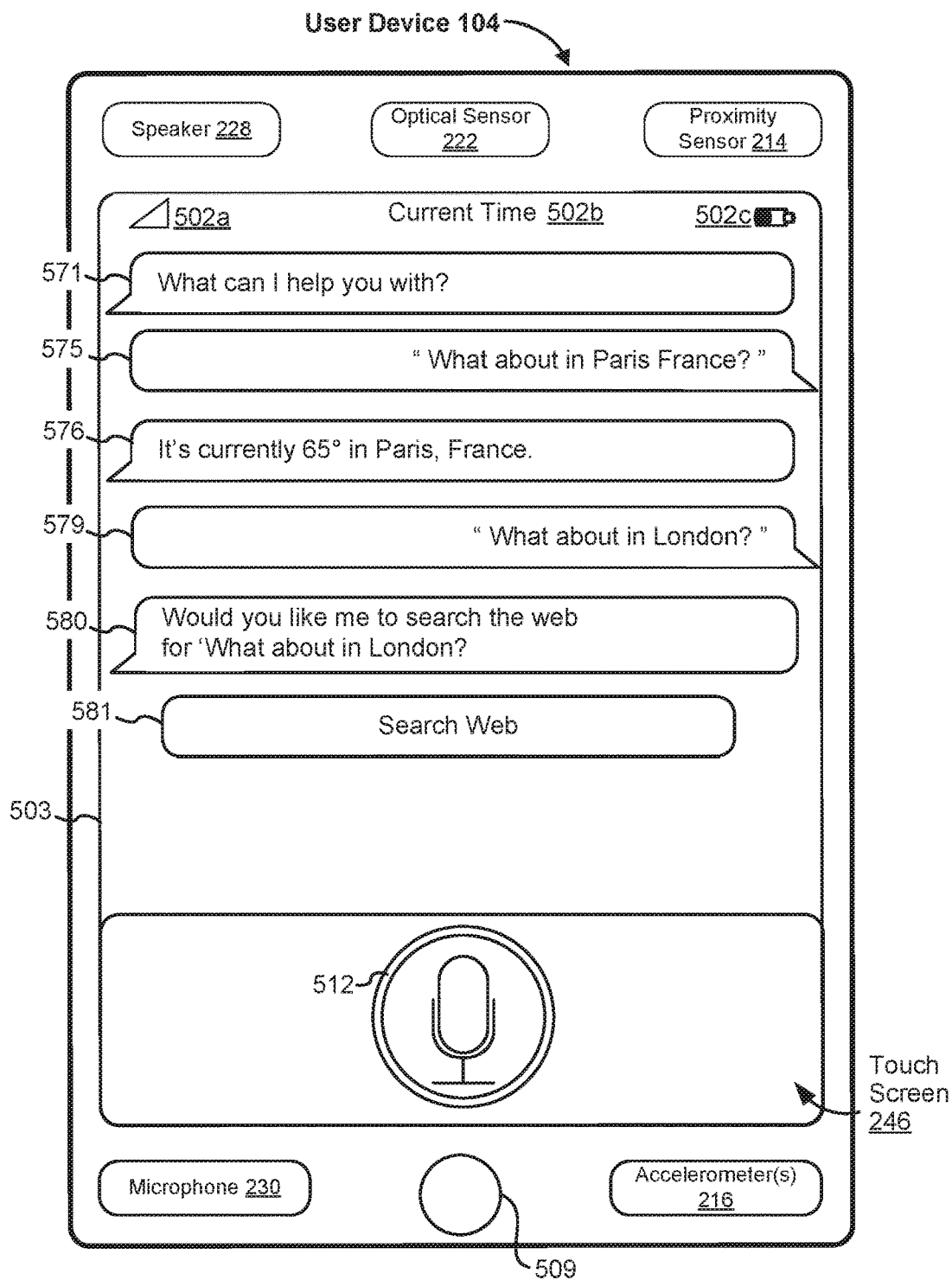
Figure 5M:
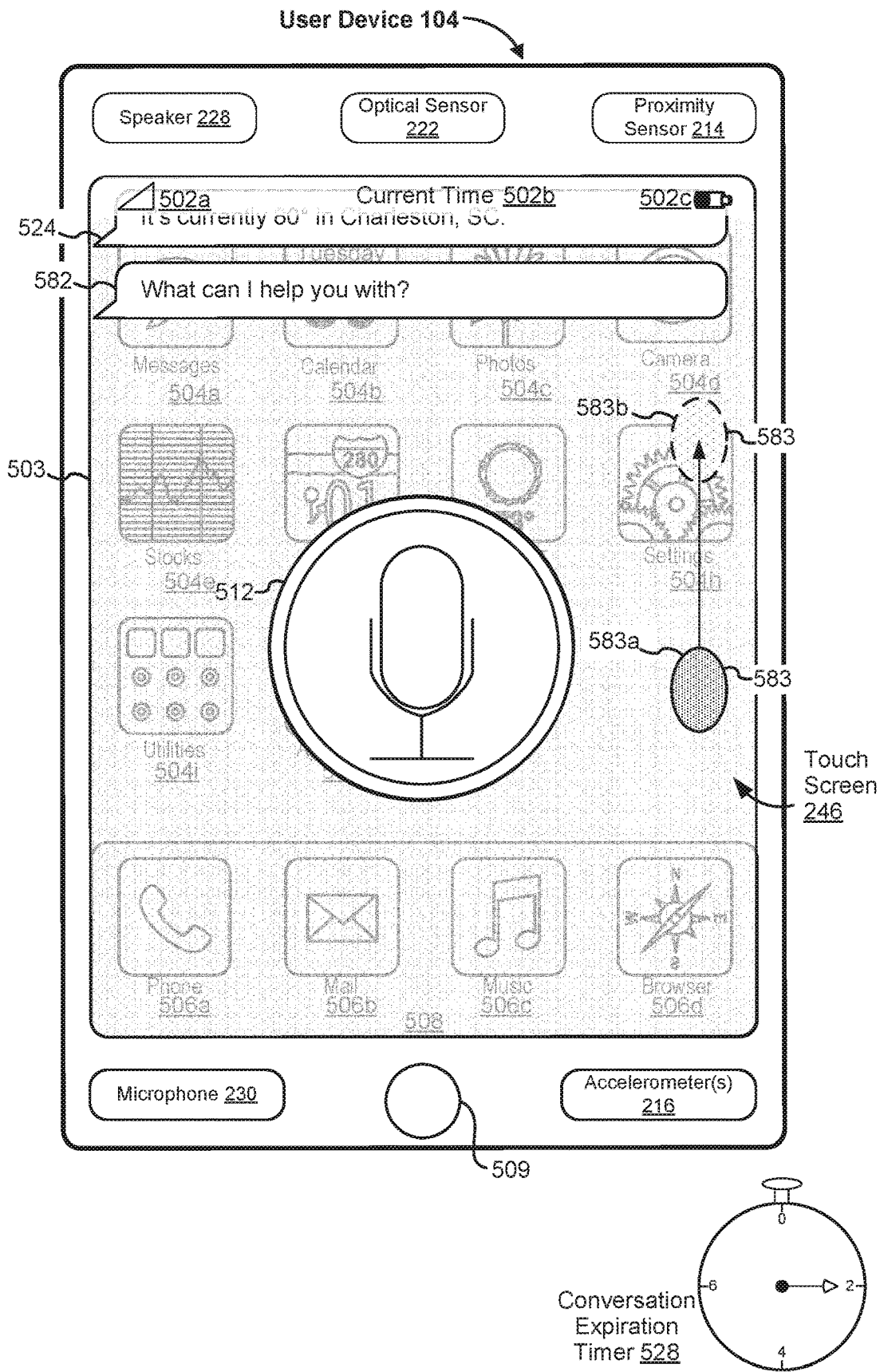
Figure 5N:
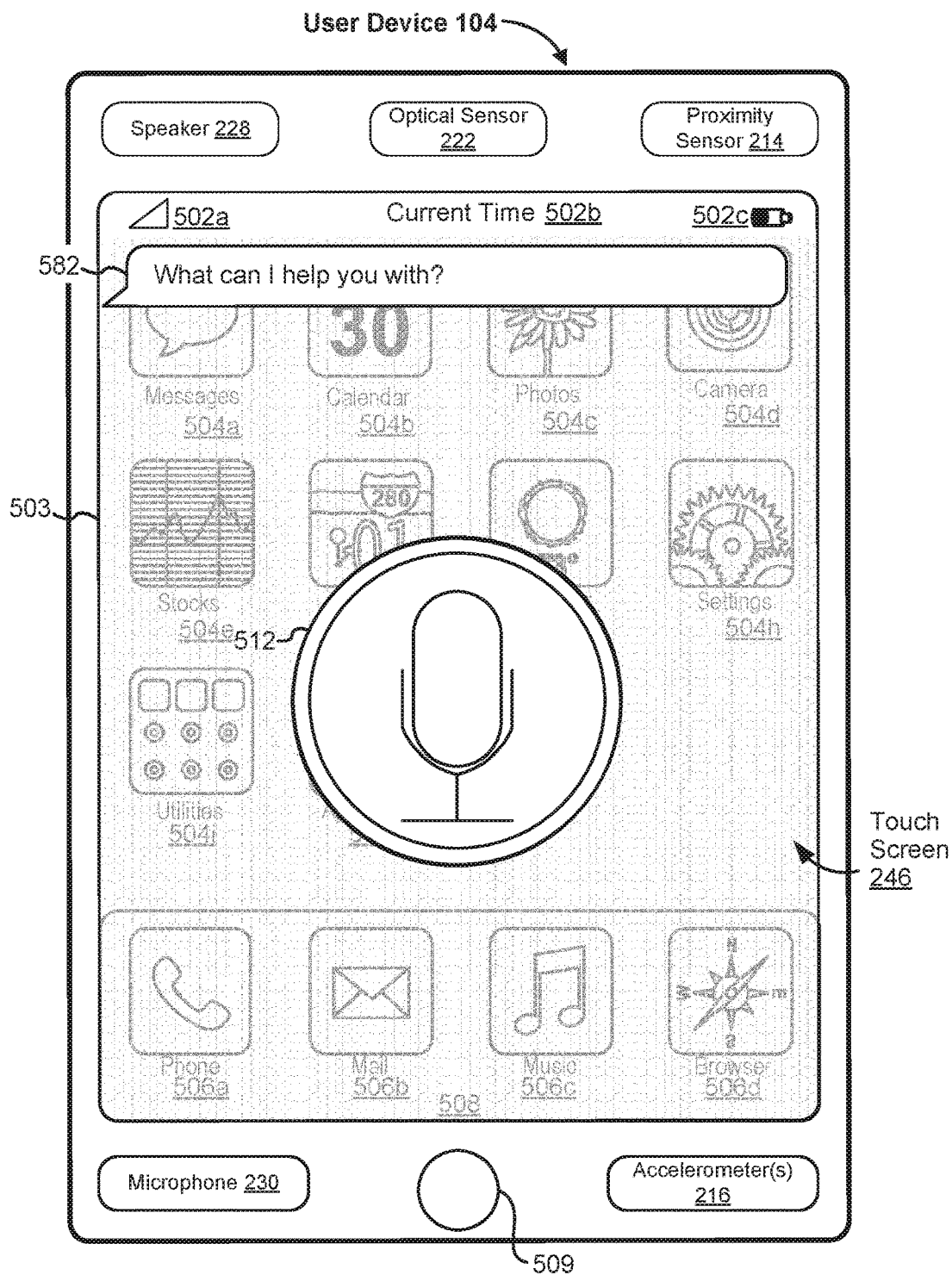
Figure 5O:
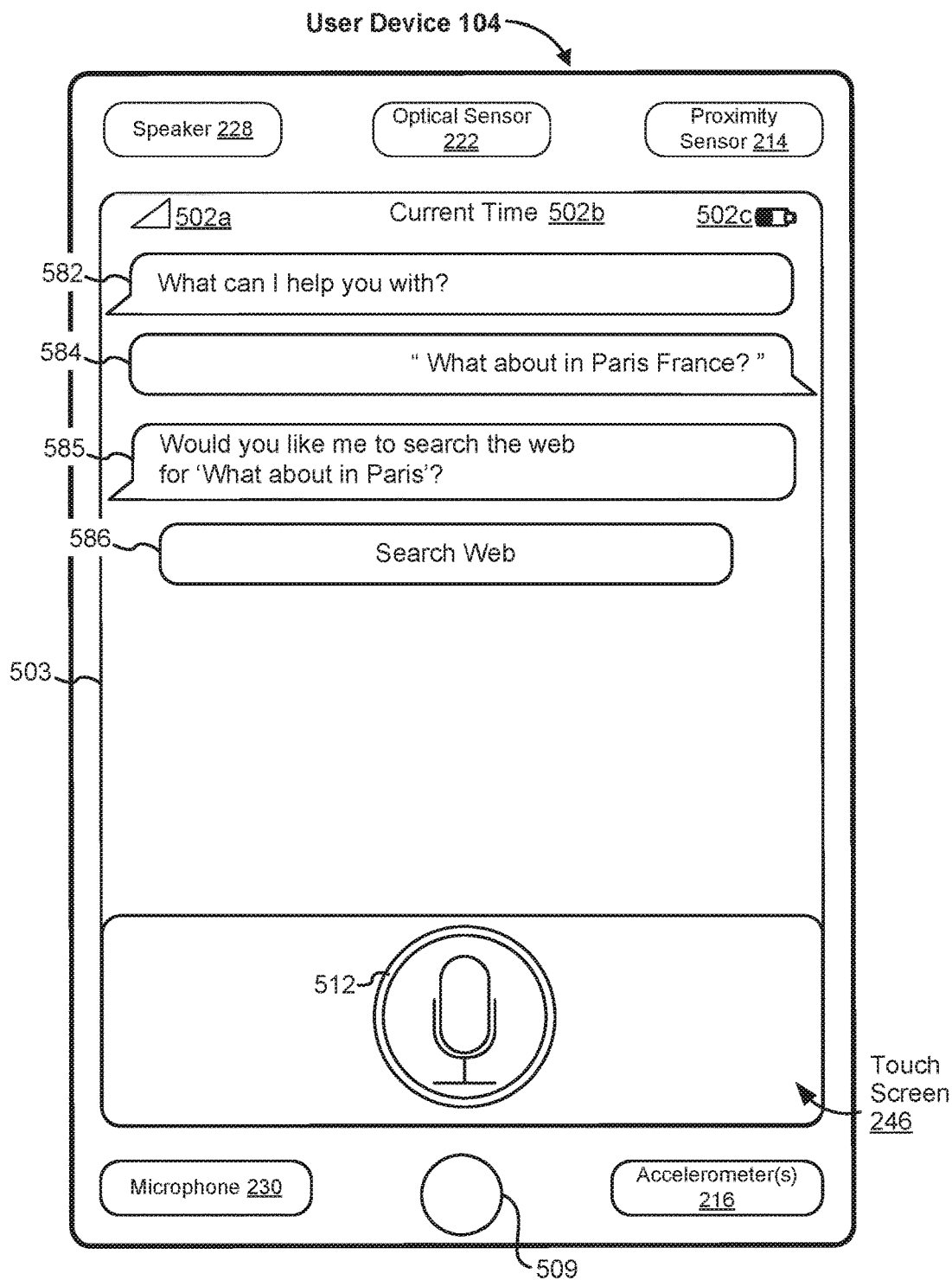
Figure 6A:
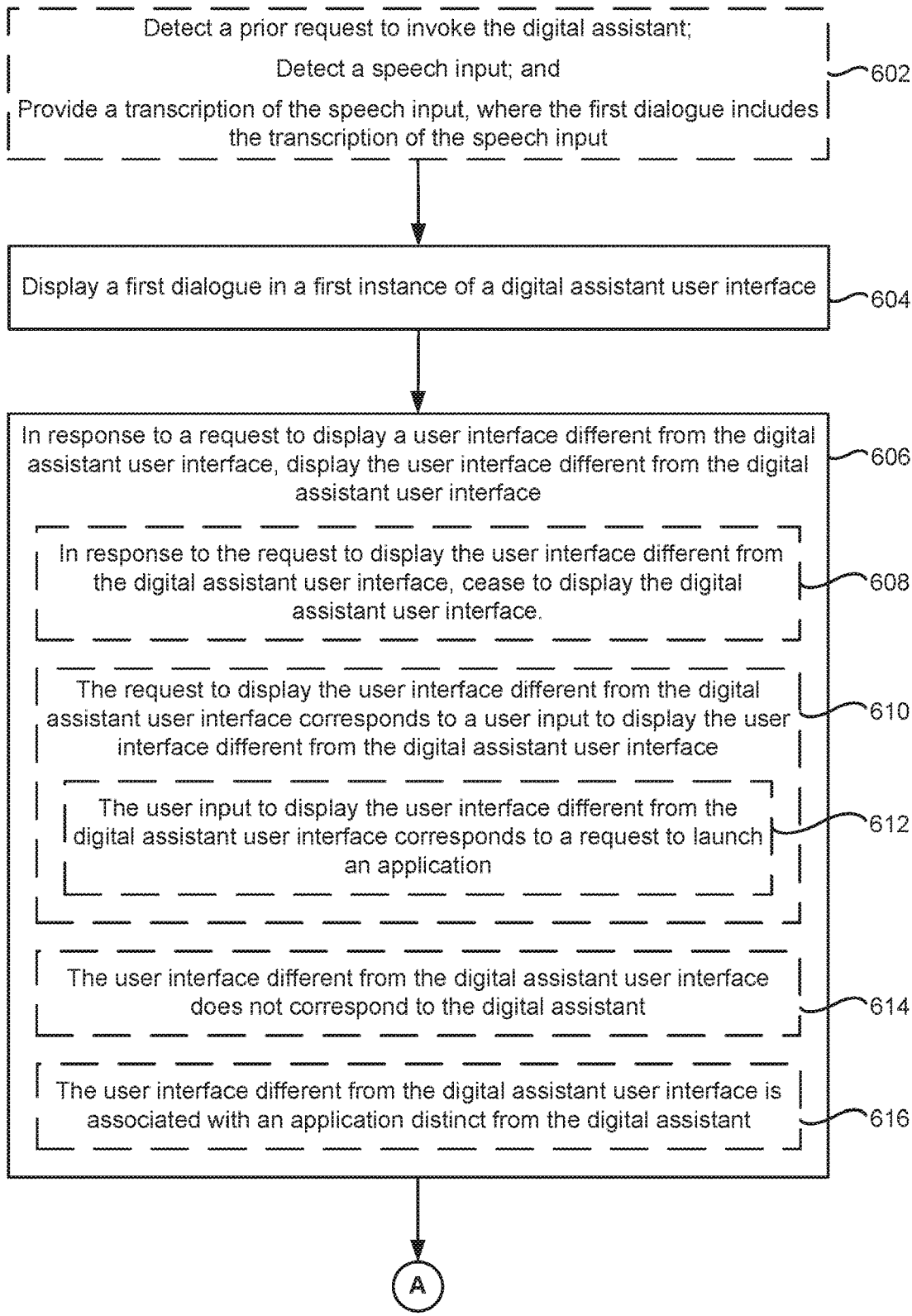
FIGS. 6A-D illustrate a flow diagram for an exemplary process of enabling context and/or conversation persistence in accordance with some embodiments.
Figure 6B:
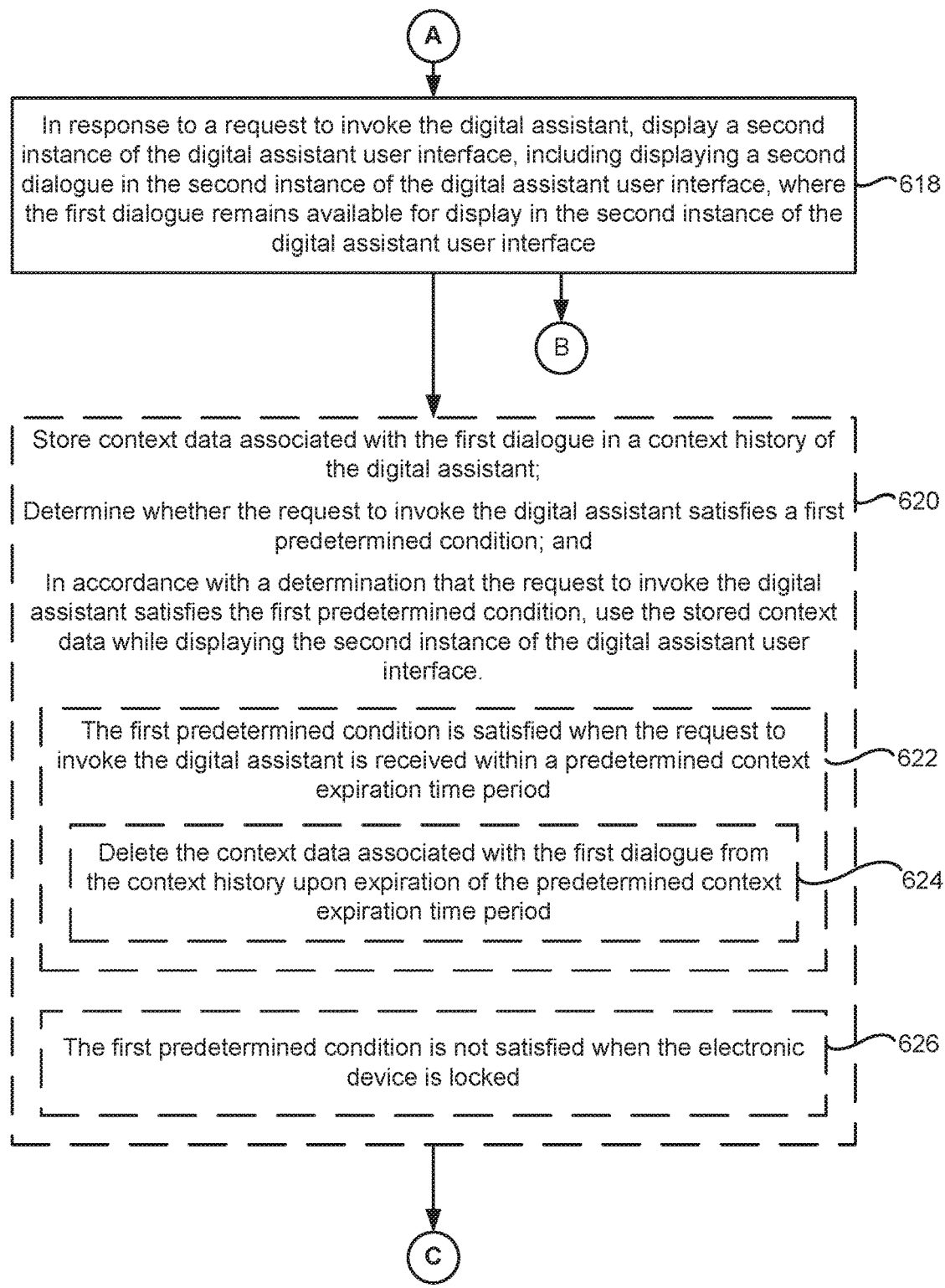
Figure 6C:
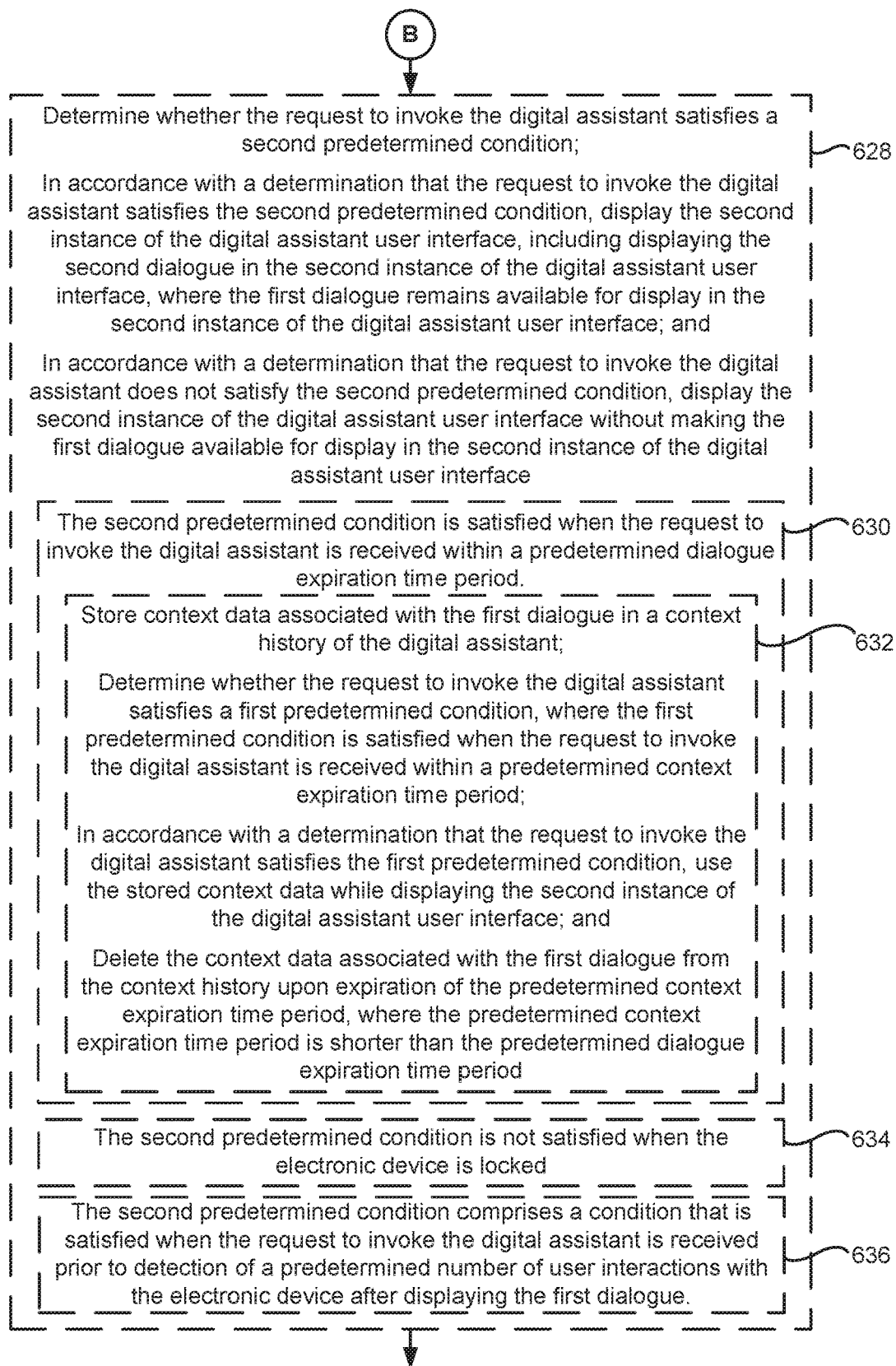
Figure 6D:
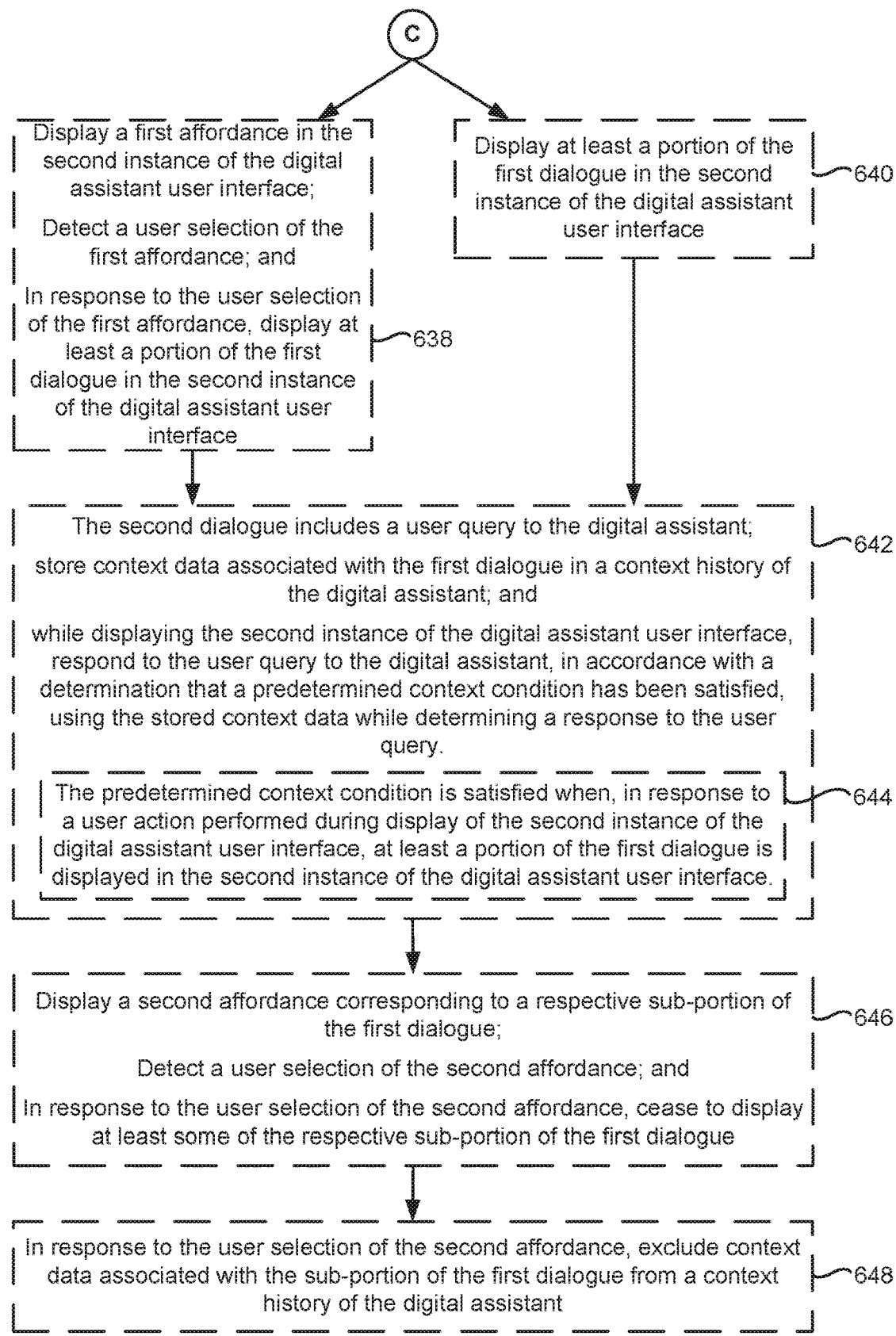

FIG. 5Z illustrates displaying a user interface (e.g., a lock screen) different from the DA user interface in response to detecting the user touch input 557 over home button 509 in FIG. 5Y. FIG. 5Z further illustrates detecting a horizontal dragging gesture of user touch input 558 from position 558*a* to 558*b* so as to unlock user device 104.

FIG. 5AA illustrates displaying a user interface (e.g., an unlocked home screen) different from the DA user interface in response to detecting the horizontal dragging gesture in FIG. 5Z. FIG. 5AA further illustrates detecting a user touch input 559 over home button 509.

FIG. 5BB illustrates invoking a second instance of a digital assistant (DA) in response to detecting the long press with user touch input 559 over home button 509 in FIG. 5AA. FIG. 5BB further illustrates that the invocation of the second instance of a digital assistant (DA) occurs approximately fifty seconds (e.g., context expiration timer 527 is at approximately the fifty seconds marker) after exiting the first instance of the DA user interface in response to user touch input 525 over home button 509 in FIG. 5I. Therefore, neither context expiration timer 527 nor conversation expiration timer 528 has expired, and both context and conversation information from the first instance of the DA user interface persists in the second instance of the DA user interface. In response to invoking the second instance of the DA, the DA audibly prompts the user by asking, "What can I help you with?" For example, in response to the prompt, the user asks the DA, "What about in Budapest?"

FIG. 5CC illustrates the second instance of the DA user interface in an embodiment including a scrollable transcript where at least a portion of the dialogue (or conversation) from the first instance of the DA user interface is available for display. FIG. 5CC also illustrates the response to the user's question, which is transcribed in box 561, within the second instance of the DA user interface. As transcribed in box 562, the DA responds to the user's question by stating, "It's currently 70° in Budapest." The DA responds to the user's question with the aid of contextual information from the first instance of the DA user interface (e.g., weather context). FIG. 5CC further illustrates partially displaying a portion of the transcription of the dialogue (or conversation) between the user and the DA from the first instance of the DA user interface in box 524.

FIG. 5DD illustrates invoking a second instance of a digital assistant (DA) in response detecting to the long press with user touch input 526 over home button 509 in FIG. 5J. FIG. 5DD further illustrates a conversation expiration timer 528. In some embodiments, conversation expiration timer 528 is a predetermined time period (e.g., 2, 4, 6, 8, 10 minutes, etc.) or a user defined time period. In one implementation, conversation expiration timer 528 is an eight minute timer that starts upon the user exiting the DA user interface. If the user invokes a subsequent instance of the DA within eight minutes second of exiting the DA user interface (or, more generally, before conversation expiration timer 528 expires), a portion of the transcript of the dialogue (or conversation) between the user and the DA from the previous instance of the DA is available for display in the subsequent instance of the DA user interface. If the user does not invoke a subsequent instance of the DA before conversation expiration timer 528 expires (e.g., within eight minutes second of exiting the DA user interface), the aforementioned portion of the transcript of the dialogue (or conversation) between the user and the DA from the previous instance of the DA is not available for display in the subsequent instance of the DA user interface. In addition, if the user does not invoke a subsequent instance of the DA before conversation expiration timer 528 expires, user device 104 deletes stored contextual information corresponding to the dialogue (or conversation) between the user and the DA from the previous instance of the DA from context history.

FIG. 5DD illustrates a prophetic example in which the invocation of the second instance of a digital assistant (DA) occurs, in this example, approximately two minutes after exiting the first instance of the DA user interface in response to user touch input 525 over home button 509 in FIG. 5I. Therefore, conversation expiration timer 528 has not expired, and conversation information from the first instance of the DA user interface persists in the second instance of the DA user interface. Furthermore, FIG. 5DD illustrates partially displaying a portion of the transcription of the dialogue (or conversation) between the user and the DA from the first instance of the DA user interface in box 524, and a transcription of the DA's prompt is displayed in box 563 (e.g., "What can I help you with?"). In response to invoking the second instance of the DA, the DA audibly prompts the user by asking, "What can I help you with?" For example, in response to the prompt, the user asks the DA, "What about in Paris France?" In some embodiments, portions of the home screen that are visible when the DA user interface is displayed in user interface 503 are blurred, shaded, or otherwise made visually less distinct. For example, in FIG. 5DD, a portion of the home screen (e.g., including application icons 504a, 504b, 504c, 504d, 504e, 504f, 504g, 504h, 504i, 504j and tray icons 506a, 506b, 506c, 506d) is partially displayed or blurred beneath the second instance of the DA user interface in user interface 503.

FIG. 5EE illustrates the second instance of the DA user interface in an embodiment where a transcript of the dialogue (or conversation) between the user and the DA from the first instance of the DA user interface is available for display. As transcribed in box 565 of FIG. 5EE, the DA responds to the user's question by stating, "Would you like me to search the web for 'What about in Paris France'?" The second instance of the DA user interface also displays a "search the web" button 545 which is configured to execute a web search for 'What about in Paris France.'

In some embodiments, contextual information from the first instance of the digital user interface is invoked when at least a portion of the first dialogue between the DA and the user from the first instance of the DA user interface is displayed in user interface 503 on touch screen 112 in response to a user action (e.g., a tap or swipe gesture on touch screen 112). In FIG. 5EE, the DA does not infer that the user's query, transcribed in box 564, refers to weather when responding to the user's query because contextual information from the first instance of the DA user interface has not been invoked at or before receiving user query 564. The DA does not invoke contextual information from the first instance of the DA user interface when responding to user query 564 because user device 104 has not detected a user action (e.g., a tap or swipe gesture on touch screen 112) to display at least a portion of the first dialogue between the DA and the user from the first instance of the DA user interface at or before receiving user query 564. FIG. 5EE further illustrates detecting a downward dragging gesture (sometimes also called a "swipe gesture") of user touch input 567 from position 567a to 567b on touch screen 112.

FIG. 5FF illustrates scrolling down a transcription (e.g., a speech to text transcription) of the dialogue (or conversation) between the user and the DA within the second instance of the DA user interface in response to detecting the downward dragging gesture detected in FIG. 5EE. The transcription displayed in FIG. 5FF includes dialogue from the current (second) instance of the DA user interface and dialogue from the previous (first) instance of the DA user interface. The transcription displayed in FIG. 5FF includes the dialogue from the second instance of the DA user interface (e.g., the DA's prompt 563, user query 564, and the DA's response 565, 566). In box 523, the transcription displayed in FIG. 5FF includes the user's question from the first instance of the DA user interface, "What's the temperature in Charleston S.C.?" In box 524, the transcription displayed in FIG. 5FF also includes the DA's response, "It's currently 80° in Charleston, S.C.," to the user's question in the first instance of the DA user interface.

FIG. 5FF further illustrates detecting a user touch input 568 over DA button 512 on touch screen 112. In response to user touch input 568 over DA button 512, the DA is activated (e.g., microphone 230 is turned on) and enabled to receive an additional question (also sometimes herein called a "query") or request from the user. For example, after user device 104 detects user touch input 568, the user asks the DA, "What about in Paris?"

FIG. 5GG illustrates the DA's response to the user's query within the DA user interface. In FIG. 5GG, the DA responds to the user's question by stating, "It's currently 65° in Paris France," which is transcribed in box 670. In FIG. 5GG, the DA infers that the user's query, transcribed in box 569, refers to weather when responding to the user's query because the contextual information from the first instance of the DA user interface has been invoked at or before receiving user query 569. The DA invokes contextual information from the first instance of the DA user interface when responding to user query 569 because user device 104 has detected a user action (e.g., the dragging gesture detected in FIG. 5EE) to display at least a portion of the first dialogue between the DA and the user from the first instance of the DA user interface (e.g., user query 523 and the DA's response 524 to the user query 523) at or before receiving user query 569.

FIG. 5HH illustrates invoking a second instance of a digital assistant (DA) in response to detecting the long press with user touch input 526 over home button 509 in FIG. 5J. FIG. 5HH also illustrates a conversation expiration timer 528. In some implementations, conversation expiration timer 528 is an eight minute timer that starts upon the user exiting the DA user interface. FIG. 5HH further illustrates that the invocation of the second instance of a digital assistant (DA) occurs, in this example, approximately two minutes after exiting the first instance of the DA user interface in response to user touch input 525 over home button 509 in FIG. 5I. Therefore, conversation expiration timer 528 has not expired, and conversation information from the first instance of the DA user interface persists in the second instance of the DA user interface.

FIG. 5HH also illustrates displaying "see older" button 572 within the DA user interface. "See older" button 572 is configured to display at least a portion of the transcript of the dialogue from the first instance of the DA user interface. FIG. 5HH also illustrates detecting user touch input 573 over "see older" button 572 on touch screen 112. Furthermore, in FIG. 5HH, a portion of the home screen (e.g., including application icons 504a, 504b, 504c, 504d, 504e, 504f, 504g, 504h, 504i, 504j and tray icons 506a, 506b, 506c, 506d) is partially displayed or blurred beneath the second instance of the DA user interface in user interface 503.

FIG. 5II illustrates displaying, in the second instance of the DA user interface, at least a portion of the transcript of the dialogue from the first instance of the DA user interface in response to detecting user touch input 573 over "see older" button 572 in FIG. 5HH. The transcription displayed in FIG. 5II includes dialogue from the current (second) instance of the DA user interface and dialogue from the previous (first) instance of the DA user interface. The transcription displayed in FIG. 5II includes the dialogue from the second instance of the DA user interface displayed (e.g., the DA's prompt "What can I help you with" transcribed in box 571). The transcription displayed in FIG. 5II also includes the user's query (transcribed in box 523) and the DA's response (transcribed in box 524) to user query 523 from the first instance of the DA user interface.

FIG. 5II further illustrates detecting user touch input 574 over DA button 512. In response to user touch input 574 over DA button 512, the DA is activated (e.g., microphone 230 is turned on) and enabled to receive an additional query or request from the user. For example, after user device 104 detects user touch input 574, the user asks the DA, "What about in Paris?"

FIG. 5JJ illustrates the DA's response to the user's query within the DA user interface. In FIG. 5JJ, the DA responds to the user's question by stating, "It's currently 65° in Paris France," which is transcribed in box 576. In FIG. 5JJ, the DA infers that the user's query, transcribed in box 576, refers to weather when responding to the user's query because contextual information from the first instance of the DA user interface has been invoked at or before receiving user query 576. The DA invokes contextual information from the first instance of the DA user interface when responding to user query 576 because user device 104 has detected a user action (e.g., user touch input 573 detected over "see older" button 572 in FIG. 5HH) to display at least a portion of the first dialogue between the DA and the user from the first instance of the DA user interface (e.g., user query 523 and DA response 524) at or before receiving user query 576. FIG. 5JJ further illustrates detecting an upward dragging gesture (sometimes also called a "swipe gesture") of user touch input 577 from position 577a to 577b on touch screen 112.

FIG. 5KK illustrates ceasing to display the portion of the transcription (e.g., boxes 523 and 524) of the dialogue (or conversation) between the user and the DA from the first instance of the DA user interface in the second instance of a digital assistant (DA) in response to detecting the upward dragging gesture in FIG. 5JJ. In some embodiments, conversation information (or the transcription of the dialogue) from the first instance of the DA user interface is deleted (or excluded) from conversation history 354 in response to detecting an upward dragging gesture that scrolls displayed portions of the transcription of the dialogue (or conversation) between the user and the DA from the first instance of the DA user interface off of user interface 503. Furthermore, in some embodiments, context information from the first instance of the DA user interface is deleted (or excluded) from context history 352 in response to detecting an upward dragging gesture that scrolls displayed portions of the transcription of the dialogue (or conversation) between the user and the DA from the first instance of the DA user interface off of user interface 503.

FIG. 5KK further illustrates detecting a user touch input 578 over DA button 512 on touch screen 112. In response to user touch input 578 over DA button 512, the DA is activated (e.g., microphone 230 is turned on) and enabled to receive an additional question (also sometimes herein called a "query") or request from the user. For example, after user device 104 detects user touch input 578, the user asks the DA, "What about in London?"

FIG. 5LL illustrates the second instance of the DA user interface in an embodiment where conversation and context information from the first instance of the DA has been deleted or excluded from conversation history 354 and context history 352, respectively. As transcribed in box 580 of FIG. 5LL, the DA responds to the user's question by stating, "Would you like me to search the web for 'What about in London?'" The second instance of the DA user interface also displays a "search the web" button 581 which is configured to execute a web search for 'What about in London.'

In FIG. 5LL, the DA does not infer that the user's query, transcribed in box 579, refers to weather when responding to the user's query because contextual information from the first instance of the DA user interface has been deleted (or excluded) from context history 352 at or before receiving user query 579. The DA does not invoke contextual information from the first instance of the DA user interface when responding to user query 579 because user device 104 detected a user action in FIG. 5JJ (e.g., the upward swipe gesture with user touch input 577) to cease to display the first dialogue (e.g., boxes 523 and 524) between the DA and the user from the first instance of the DA user interface at or before receiving user query 579.

FIG. 5MM illustrates invoking a second instance of a digital assistant (DA) in response to detecting the long press with user touch input 526 over home button 509 in FIG. 5J. FIG. 5MM also illustrates a conversation expiration timer 528. In some implementations, conversation expiration timer 528 is an eight minute timer that starts upon the user exiting the DA user interface. FIG. 5MM further illustrates that the invocation of the second instance of a digital assistant (DA) occurs, in this example, approximately two minutes after exiting the first instance of the DA user interface in response to user touch input 525 over home button 509 in FIG. 5I. Therefore, conversation expiration timer 528 has not expired, and conversation information from the first instance of the DA user interface persists in the second instance of the DA user interface. Furthermore, FIG. 5MM illustrates partially displaying a portion of the transcription of the dialogue (or conversation) between the user and the DA from the first instance of the DA user interface in box 524, and a transcription of the DA's prompt is displayed in box 582 (e.g., "What can I help you with?").

FIG. 5MM further illustrates detecting an upward dragging gesture (sometimes also called a "swipe gesture") of user touch input 583 from position 583a to 583b on touch screen 112. Furthermore, in FIG. 5MM, a portion of the home screen (e.g., including application icons 504a, 504b, 504c, 504d, 504e, 504f, 504g, 504h, 504i, 504j and tray icons 506a, 506b, 506c, 506d) is partially displayed or blurred beneath the second instance of the DA user interface in user interface 503.

FIG. 5NN illustrates ceasing to display any portion of the transcription (e.g., box 524) of the dialogue (or conversation) between the user and the DA from the first instance of the DA user interface in the second instance of a digital assistant (DA) in response to detecting the upward dragging gesture in FIG. 5MM. In some embodiments, conversation information (or the transcription of the dialogue) from the first instance of the DA user interface is deleted (or excluded) from conversation history 354 in response to detecting an upward dragging gesture that scrolls displayed portions of the transcription of the dialogue (or conversation) between the user and the DA from the first instance of the DA user interface off of user interface 503. Furthermore, in some embodiments, context information from the first instance of the DA user interface is deleted (or excluded) from context history 352 in response to detecting an upward dragging gesture that scrolls displayed portions of the transcription of the dialogue (or conversation) between the user and the DA from the first instance of the DA user interface off of user interface 503. For example, in response to the prompt transcribed in box 582, the user asks the DA, "What about in Paris France?"

FIG. 5OO illustrates the second instance of the DA user interface in an embodiment where the transcript of the dialogue (or conversation) between the user and the DA from the first instance of the DA has been deleted or excluded from conversation history 354 and has ceased to be displayed. As transcribed in box 585 of FIG. 5OO, the DA responds to the user's question by stating, "Would you like me to search the web for 'What about in Paris France'?" The second instance of the DA user interface also displays a "search the web" button 586 which is configured to execute a web search for 'What about in Paris France.'

In FIG. 5OO, the DA does not infer that the user's query, transcribed in box 584, refers to weather when responding to the user's query because contextual information from the first instance of the DA user interface has been deleted (or excluded) from context history 352 at or before receiving user query 584. The DA does not invoke contextual information from the first instance of the DA user interface when responding to user query 584 because user device 104 has not detected a user action (e.g., a tap or swipe gesture on touch screen 112) to display at least a portion of the first dialogue between the DA and the user from the first instance of the DA user interface at or before receiving user query 584. Instead, user device 104 detected a user action in FIG. 5MM (e.g., the upward swipe gesture with user touch input 583) to cease to display the first dialogue (e.g., box 524) between the DA and the user from the first instance of the DA user interface at or before receiving user query 584.

FIGS. 6A-D illustrate a flow diagram of a method 600 of operating a digital assistant in accordance with some embodiments. In some embodiments, method 600 is performed at an electronic device (e.g., user device 104) including a display, one or more processors and memory (e.g., a respective DA-client 102 or DA-server 106). In some embodiments, portions of method are performed at the electronic device (e.g., a respective DA-client 102), while other portions are performed at a server (e.g., DA-server 106). In some embodiments, method 600 is performed at the digital assistant 326 illustrated in FIGS. 3A-B and 4. In some embodiments, method 600 is governed by a set of instructions stored in memory (e.g., a non-transitory computer readable storage media) that are executed by the one or more processors of the electronic device.

In some embodiments, prior to displaying the first instance of the digital assistant user interface, the electronic device: detects (602) a prior request to invoke the digital assistant; detects a speech input; and provides a transcription of the speech input, where the first dialogue includes the transcription of the speech input. FIGS. 5A-B, for example, show a user invoking a first instance of a digital assistant (DA) in response to a long press with user touch input 510 over home button 509 of user device 104. FIGS. 5B-D, for example, show user device 104 detecting a speech input from a user asking "What's the temperature in Palo Alto?" and converting said speech input to text for display in box 514 of FIG. 5D. FIG. 5E, for example, shows user device 104 displaying a transcription of a dialogue (or conversation) between the user and the DA in boxes 515, 514, and 513a.

The electronic device displays (604) a first dialogue (e.g., a transcription of interactions between the user of user device 104 and the DA) in a first instance of a digital assistant user interface. In some embodiments, a user interface is an application environment. In some embodiments, the DA user interface occupies the entirety of touch screen 246 of user device 104. FIG. 5E, for example, shows user device 104 displaying a transcription of a dialogue between the user and the DA in boxes 515, 514, and 513a displayed in a first instance of a digital assistant user interface.

In response to a request to display a user interface different from the digital assistant user interface, the electronic device displays (606) the user interface different from the digital assistant user interface. FIG. 5J, for example, shows user device 104 displaying a user interface (e.g., a home screen) different from the DA user interface in response to user touch input 525 over home button 509 in FIG. 5I. In some embodiments, the user interface different from DA user interface occupies the entirety of touch screen 246 of user device 104.

In some embodiments, in response to the request to display the user interface different from the digital assistant user interface, the electronic device ceases (608) to display the digital assistant user interface (e.g., all vestiges of the DA user interface are removed from touch screen 246). FIG. 5J, for example, shows user device 104 displaying a user interface (e.g., a home screen) different from the DA user interface where no portion of the first instance of the DA user interface from FIGS. 5C-I remains on touch screen 246.

In some embodiments, the request to display the user interface different from the digital assistant user interface corresponds (610) to a user input to display the user interface different from the digital assistant user interface (e.g., the user touches or clicks the home button). FIG. 5J, for example, shows user device 104 displaying a user interface (e.g., a home screen) different from the DA user interface in response to user touch input 525 over home button 509 in FIG. 5I.

In some embodiments, the user input to display the user interface different from the digital assistant user interface corresponds (612) to a request to launch an application.

In some embodiments, the user interface different from the digital assistant user interface does not correspond (614) to the digital assistant (e.g., the user interface different from the DA user interface is not suggested or linked by the DA). In FIG. 5J, for example, the home screen does not correspond to the digital assistant. In contrast, in FIG. 5G, the break out of detailed information 519 related to Restaurant 1, for example, corresponds to the DA because Restaurant 1 was suggested by the DA in FIG. 5F. Furthermore, the break out of detailed information 519 is displayed in response to user input 518 over information container 517a in FIG. 5F.

In some embodiments, the user interface different from the digital assistant user interface is associated with (616) an application distinct from the digital assistant (e.g., a programmatic boundary is crossed). For example, in response to user input 525 over home button 509 in FIG. 5I, user device 104 ceases to display the DA user interface and displays the home screen in user interface 503 in FIG. 5J.

In response to a request to invoke the digital assistant, the electronic device displays (618) a second instance of the digital assistant user interface, including displaying a second dialogue in the second instance of the digital assistant user interface, where the first dialogue remains available for display in the second instance of the digital assistant user interface. In some embodiments, the second instance of the DA user interface is displayed at a time following (or later than) exiting the first instance of the DA user interface. For example, in response to the long press with user touch input 526 over home button 509 in FIG. 5J, user device 104 displays (as shown in FIG. 5L) a second instance of the DA user interface with scrollable a transcript where at least a portion of the dialogue (or conversation) from the first instance of the DA user interface is available for display. In FIG. 5L, a portion of the transcription of the dialogue (or conversation) between the user and the DA from the first instance of the DA user interface is partially displayed in box 524. For example, in FIG. 5M, a further portion of the transcript of the dialogue from the first instance of the DA user interface is displayed in response to the dragging gesture illustrated in FIG. 5L.

In some embodiments, the electronic device (620): stores context data (sometimes herein called "contextual information" or "context information") associated with the first dialogue in a context history of the digital assistant; determines whether the request to invoke the digital assistant satisfies a first predetermined condition; and in accordance with a determination that the request to invoke the digital assistant satisfies the first predetermined condition, uses the stored context data while displaying the second instance of the digital assistant user interface. For example, while in the first instance of the DA user interface, a user asks the DA, "What's the weather in New York City," receives a response, and exits the first instance of the DA user interface. Thereafter, the user invokes a second instance of the DA and asks the DA, "How about in San Francisco." In this example, the DA stores the weather topic (or context) from the first instance of the DA user interface in the DA's context history for the user and utilizes the weather context in the context history when responding to the user's question in the second instance of the DA user interface as long as the request to invoke the second instance of the DA satisfies a first predetermined condition.

In another example, while in the first instance of the DA user interface, a user asks the DA, "What is the weather in New York City," receives a response, and exits the first instance of the DA user interface. Thereafter, the user invokes a second instance of the DA and asks the DA, "Show me pizzerias." In this example, the DA stores the geographic (e.g., New York City) context from the first instance of the DA user interface in the DA's context history for the user and utilizes the geographic context in the context history when responding to the user's question in the second instance of the DA user interface as long as the request to invoke the second instance of the DA satisfies a first predetermined condition.

In some embodiments, the first predetermined condition is satisfied (622) when the request to invoke the digital assistant is received within a predetermined context expiration time period. For example, while in the first instance of the DA user interface, user device 104 stores contextual information corresponding to the dialogue related to the weather context displayed in FIG. 5I. Then, in response to a request to invoke a second instance of the DA (e.g., a long press over home button 509 with user touch input 526 in FIG. 5J), user device 104 displays a second instance of the DA user interface in FIG. 5K. FIG. 5K, for example, shows the device determining whether the request to invoke the second instance of the DA satisfies a predetermined context expiration time period. In some embodiments, the predetermined context expiration time period is satisfied when the request to invoke the second instance of the DA occurs within sixty seconds of exiting the first instance of the DA. For example, in FIG. 5K, context expiration timer 527 shows that the request to invoke the second instance of the DA occurred approximately thirty seconds after exiting the first instance of the DA user interface.

In the second instance of the DA user interface, for example, the user asks the DA, "What about in Paris France?" FIG. 5L, for example, shows the DA's response to the user's question stating, "It's currently 65° in Paris France." The DA responds to the user's question with the aid of contextual information from the first instance of the DA user interface (e.g., weather topic or context).

In some embodiments, the electronic device deletes (624) the context data associated with the first dialogue from the context history upon expiration of the predetermined context expiration time period. In some embodiments, the predetermined context expiration time period expires about sixty seconds after the user device exits the first instance of the DA. For example, in FIG. 5Q, context expiration timer 527 indicates that the request to invoke the second instance of the DA occurred more than sixty seconds after exiting the first instance of the DA user interface.

In the second instance of the DA user interface, for example, the user asks the DA, "What about in Paris France?" FIG. 5R, for example, shows the DA responding to the user's question by stating, "Would you like me to search the web for 'What about in Paris France'?" and displaying "search the web" button 545 which is configured to execute a web search for 'What about in Paris France.' In FIG. 5R, the DA does not infer that the user's question "What about in Paris France?" refers to weather because contextual information from the first instance of the DA user interface has been deleted from the context history due to the context expiration timer expiring prior to the invocation of the second instance of the DA.

In some embodiments, the first predetermined condition is not satisfied (626) when the electronic device is locked. In some embodiments, contextual information from a previous instance of a DA user interface does not persist when the device is locked. Even though the DA can be accessed while the device is locked, context and conversation information does not persist from a previous instance of the DA user interface. Typically, this is for security or privacy reasons because a user of user device 104 may not want context or conversation information from a previous instance of the DA user interface to be available to a third party who cannot unlock user device 104.

FIG. 5W, for example, shows a user invoking the DA while user device 104 is in a locked mode. Then, in response to a request to invoke a second instance of the DA (e.g., a long press over home button 509 with user touch input 552 in FIG. 5W), user device 104 displays a second instance of the DA user interface in FIG. 5X. FIG. 5X, for example, shows the device determining whether the request to invoke the second instance of the DA satisfies a first predetermined condition. For example, in FIG. 5X, context expiration timer 527 shows that the request to invoke the second instance of the DA occurred approximately thirty seconds after exiting the first instance of the DA user interface. In the second instance of the DA user interface, for example, the user asks the DA "What about in Budapest?" FIG. 5Y, for example, shows the DA responding to the user's question by stating, "Would you like me to search the web for 'What about in Budapest'?" and displaying "search the web" button 556, which is configured to execute a web search for 'What about in Budapest.' In FIG. 5Y, the DA does not infer that the user's question "What about in Budapest?" refers to weather because contextual information from the first instance of the DA user interface has been excluded from the context history because the second instance of the DA was invoked while user device 104 was in the locked mode.

In some embodiments, the electronic device (628): determines whether the request to invoke the digital assistant satisfies a second predetermined condition; in accordance with a determination that the request to invoke the digital assistant satisfies the second predetermined condition, displays the second instance of the digital assistant user interface, including displaying the second dialogue in the second instance of the digital assistant user interface, where the first dialogue remains available for display in the second instance of the digital assistant user interface; and in accordance with a determination that the request to invoke the digital assistant does not satisfy the second predetermined condition, displays the second instance of the digital assistant user interface without making the first dialogue available for display in the second instance of the digital assistant user interface. In a first example, in response to a request to invoke a second instance of the DA (e.g., a long press over home button 509 with user touch input 526 in FIG. 5J), user device 104 displays a second instance of the DA user interface in FIG. 5Q. FIG. 5Q, for example, shows the user device 104 determining whether the request to invoke the second instance of the DA satisfies a second predetermined condition. In some embodiments, the second predetermined condition is satisfied when the request to invoke the second instance of the DA occurs within eight minutes of exiting the first instance of the DA. In FIG. 5Q, conversation expiration timer 528 indicates that the request to invoke the second instance of the DA occurred approximately two minutes after exiting the first instance of the DA user interface. FIG. 5R, for example, shows user device 104 displaying the second instance of the DA user interface including "see older" button 541 configured to display at least a portion of the transcript of the dialogue from the first instance of the DA user interface in accordance with the determination that the second predetermined condition is satisfied.

In a second example, in response to a request to invoke a second instance of the DA (e.g., a long press over home button 509 with user touch input 526 in FIG. 5J), user device 104 displays a second instance of the DA user interface in FIG. 5T. FIG. 5T, for example, shows the user device 104 determining whether the request to invoke the second instance of the DA satisfies a second predetermined condition (e.g., an eight minute time period). In FIG. 5T, conversation expiration timer 528 indicates that the request to invoke the second instance of the DA occurred more than eight minutes after exiting the first instance of the DA user interface. FIG. 5T, for example, shows user device 104 displaying the second instance of the DA user interface where a transcript of the dialogue (or conversation) between the user and the DA from the first instance of the DA user interface is not available for display.

In some embodiments, the second predetermined condition is satisfied (630) when the request to invoke the digital assistant is received within a predetermined conversation expiration time period. In some embodiments, the conversation expiration time period begins once the user exits the first instance of the DA user interface. In some embodiments, the conversation expiration time period is a predetermined amount of time (e.g., 3, 5, 8, 10, 15, or 30 minutes). Typically, the conversation expiration time period is 8 minutes. In some other embodiments, the conversation expiration time period is a user defined time period.

In some embodiments, the electronic device (632): stores context data associated with the first dialogue in a context history of the digital assistant; determines whether the request to invoke the digital assistant satisfies a first predetermined condition, where the first predetermined condition is satisfied if the request to invoke the digital assistant is received within a predetermined context expiration time period; in accordance with a determination that the request to invoke the digital assistant satisfies the first predetermined condition, uses the stored context data while displaying the second instance of the digital assistant user interface; and deletes the context data associated with the first dialogue from the context history upon expiration of the predetermined context expiration time period, where the predetermined context expiration time period is shorter than the predetermined dialogue expiration time period. In some embodiments, the displayed dialogue is not tied to the context data stored in a context history (e.g., stored on a remote server). Typically, the context expiration time period is sixty seconds and the conversation expiration time period is eight minutes.

In one example, in response to a request to invoke a second instance of the DA (e.g., a long press over home button 509 with user touch input 526 in FIG. 5J), user device 104 displays a second instance of the DA user interface in FIG. 5Q. FIG. 5Q, for example, shows the user device 104 determining whether the request to invoke the second instance of the DA satisfies a predetermined context expiration time period and a predetermined conversation expiration time period. For example, the predetermined context expiration time period is satisfied when the request to invoke the second instance of the DA occurs within sixty seconds of exiting the first instance of the DA user interface, and the predetermined conversation expiration time period is satisfied when the request to invoke the second instance of the DA occurs within eight minutes of exiting the first instance of the DA user interface. In FIG. 5Q, context expiration timer 527 indicates that the request to invoke the second instance of the DA occurred more than sixty seconds after exiting the first instance of the DA user interface, and conversation expiration timer 528 indicates that the request to invoke the second instance of the DA occurred approximately two minutes after exiting the first instance of the DA user interface.

In the second instance of the DA user interface, for example, the user asks the DA "What about in Paris France?" FIG. 5R, for example, shows the DA responding to the user's question by stating "Would you like me to search the web for 'What about in Paris France'?" and displaying "search the web" button 545 which is configured to execute a web search for 'What about in Paris France.' In FIG. 5R, the DA does not infer that the user's question refers to weather because contextual information from the first instance of the DA user interface has been deleted from the context history in accordance with a determination that the context expiration timer expired before the second instance of the DA was invoked. On the other hand, FIG. 5R, for example, shows user device 104 displaying the second instance of the DA user interface including "see older" button 541 configured to display at least a portion of the transcript of the dialogue from the first instance of the DA user interface in accordance with the determination that the conversation expiration timer has not expired.

In some embodiments, the second predetermined condition is not satisfied (634) when the electronic device is locked. In some embodiments, conversation information (or a portion of the dialogue) from a previous instance of a DA user interface does not persist when the device is locked (e.g., for security reasons). Even though the DA can be accessed while the device is locked, context and conversation information does not persist from a previous instance of the DA user interface. However, if the user device enters a locked state, the user subsequently unlocks the user device, and the user invokes a second instance the DA within conversation expiration time period, then context and conversation information persist in the second instance of the DA.

For example, after user device 104 displays a first instance of the DA user interface in FIG. 5I, user device enters a locked state as shown in FIG. 5W. As shown in FIGS. 5X-Y, context and conversation information do not persist while the device is locked even though an instance of the DA is invoked before both context expiration timer 527 and conversation expiration timer 528 have expired. After exiting the DA user interface in response to user touch input 557 over home button 509 in FIG. 5Y, FIG. 5Z shows the user unlocking user device 104 via a dragging gesture, and FIG. 5BB shows user device 104 invoking a second instance of a digital assistant in response to the long press with user touch input 559 over home button 509 in FIG. 5AA. In this example, FIG. 5BB further shows that the invocation of the second instance of a digital assistant occurs approximately fifty seconds after exiting the first instance of the DA user interface in response to user touch input 525 over home button 509 in FIG. 5I. Therefore, neither context expiration timer 527 nor conversation expiration timer 528 has expired, and both context and conversation information from the first instance of the DA user interface persists in the second instance of the DA user interface as shown in FIG. 5CC.

In some embodiments, the second predetermined condition comprises a condition that is satisfied (636) when the request to invoke the digital assistant is received prior to detection of a predetermined number of user interactions (e.g., touch events or user-requested application changes) with the electronic device after displaying the first dialogue. In some embodiments, the conversation expiration timer (e.g., conversation time-out), discussed above, and a predetermined number of touch events (e.g., conversation touch-out) are alternative sufficient conditions for not displaying a portion of the conversation (or dialogue) from the first instance of the DA user interface in the second instance of the DA user interface.

In some embodiments, the electronic device (638): displays a first affordance (affordances are sometimes herein called user interface objects or buttons) in the second instance of the digital assistant user interface (e.g., a "see more" button or an "older" button); detects a user selection of the first affordance; and in response to the user selection of the first affordance, displays at least a portion of the first dialogue in the second instance of the digital assistant user interface. FIG. 5R, for example, shows a "see older" button 541 displayed in the second instance of the DA user interface. FIG. 5R, for example, also shows user device 104 detecting a user touch input 546 over "see older" button 541. FIG. 5S, for example, shows user device 104 displaying, in the second instance of the DA user interface, at least a portion of the transcript of the dialogue from the first instance of the DA user interface in response to user touch input 546 over "see older" button 541 in FIG. 5R.

In some embodiments, the electronic device displays (640) at least a portion of the first dialogue in the second instance of the digital assistant user interface. In some embodiments, the last line or a fraction of the first dialogue (e.g., a peek through) is displayed at the top of the screen or underneath a semi-transparent top banner (e.g., the top banner includes a carrier, signal strength, battery life and time). For example, in FIG. 5L, a portion of the transcription of the dialogue (or conversation) between the user and the DA from the first instance of the DA user interface is partially displayed in box 524.

In some embodiments, the second dialogue includes (642) a user query to the digital assistant, and the electronic device: stores context data associated with the first dialogue in a context history of the digital assistant; and while displaying the second instance of the digital assistant user interface, and in accordance with a determination that a predetermined context condition has been satisfied, responds to the user query to the digital assistant, in accordance with a determination that a predetermined context condition has been satisfied, using the stored context data while determining a response to the user query. In a first instance of a DA user interface, FIG. 5I, for example, shows the user asking the DA, "What's the temperature in Charleston S.C.," transcribed in box 523. In response to user query 523, the DA responds stating, "It's currently 80° in Charleston, S.C.," as transcribed in box 524 in FIG. 5I. For example, user device 104 stores contextual information corresponding to a weather topic or context for user request 523 and the DA's response 524 in FIG. 5I.

FIG. 5J, for example, shows user device 104 displaying a home screen in user interface 503 (e.g., including application icons 504a, 504b, 504c, 504d, 504e, 504f, 504g, 504h, 504i, 504j and tray icons 506a, 506b, 506c, 506d) in response to detecting user touch input 525 over home button 509 in FIG. 5I. FIG. 5DD, for example, shows user device 104 displaying a second instance of a digital assistant (DA) in user interface 503 in response to a long press with user touch input 526 over home button 509 in FIG. 5J. FIG. 5GG, for example, shows the second instance of the DA user interface including a user query (e.g., "What about in Paris France" transcribed in box 569).

FIG. 5GG, for example, shows the DA using the stored contextual information corresponding to the weather topic from the first instance of the DA user interface when responding to user query 569 by stating, "It's currently 65° in Paris France," transcribed in box 570. In FIG. 5GG, the DA uses contextual information from the first instance of the DA user interface when responding to user query 569 in accordance with a determination that a predetermined context condition has been satisfied.

In some embodiments, the predetermined context condition is satisfied (644) when, in response to a user action performed during display of the second instance of the digital assistant user interface, at least a portion of the first dialogue is displayed in the second instance of the digital assistant user interface. In one example, FIG. 5FF shows user device 104 displaying boxes 523 and 524 (e.g., a user query and the DA's response to the user query, respectively)

corresponding to a portion of a first dialogue from the first instance of the DA user interface in user interface 503 in response to detecting the dragging gesture in FIG. 5EE. FIG. 5GG, for example, further shows the DA invoking contextual information from the first instance of the DA user interface (e.g., the weather topic or context) when responding to user query 569 in accordance with a determination that at least a portion (e.g., boxes 523 and 524) of the first dialogue is displayed in the second instance of the digital assistant user interface (e.g., boxes 523 and 524) in response to a user action (e.g., the dragging gesture detected in FIG. 5EE). For example, the DA responds to the user's query "What about in Paris France?" by using the weather topic from the first instance of the DA user interface and stating "It's currently 65° in Paris France."

In another example, FIG. 5II shows user device 104 displaying boxes 523 and 524 (e.g., a user query and the DA's response to the user query, respectively) corresponding to a portion of a first dialogue from the first instance of the DA user interface in user interface 503 in response to detecting user touch input 573 over "see older" button 572 on touch screen 112 in FIG. 5HH. FIG. 5JJ, for example, further shows the DA invoking contextual information from the first instance of the DA user interface (e.g., the weather topic or context) when responding to user query 575 in accordance with a determination that at least a portion of the first dialogue is displayed in the second instance of the digital assistant user interface (e.g., boxes 523 and 524) in response to a user action (e.g., user touch input 573 detected in FIG. 5HH). For example, the DA responds to the user's query "What about in Paris France?" by using the weather topic from the first instance of the DA user interface and stating "It's currently 65° in Paris France."

In a further example, FIG. 5EE shows user device 104 displaying a transcription of the second dialogue in the second instance of the DA user interface (e.g., the DA's prompt 563, user query 564, and the DA's response 565, 566 to user query 564) and a portion of the transcription of the first dialogue (or conversation) between the user and the DA from the first instance of the DA user interface in box 524. However, FIG. 5EE, for example, shows the that the DA does not invoke contextual information from the first instance of the DA user interface (e.g., the weather topic or context) when responding to user query 564 because user device 104 has not detected a user action (e.g., a tap or swipe gesture on touch screen 112) to display at least a portion of the first dialogue between the DA and the user from the first instance of the DA user interface at or before receiving user query 564. Instead, in FIG. 5EE, the DA responds to user query 564 by stating, "Would you like me to search the web for 'What about in Paris France'?" because the DA does not infer that user request 564 is related to weather. The second instance of the DA user interface also displays a "search the web" button 545 which is configured to execute a web search for 'What about in Paris France.'

In some embodiments, the electronic device (646): displays a second affordance corresponding to a respective sub-portion of the first dialogue (e.g., a sub-portion is an idea/topic, sentence, phrase, or word); detects a user selection of the second affordance; and in response to the user selection of the second affordance, ceases to display at least some of the respective sub-portion of the first dialogue. In some embodiments, a collapsible directory-like structure is provided in the second instance of the DA user interface whereby a user is enabled to minimize portions of the displayed dialogue. However, after minimization of a respective sub-portion, a title/topic name for the respective sub-portion remains displayed. FIG. 5N, for example, shows user device 104 displaying the transcription of the dialogue from the first and second instances of the DA user interface divided into a dining topic 532 and a weather topic 533. Button 535 is configured to minimize weather topic 533 to cease to display the portion of the dialogue from the first and second instances of the DA user interface related to weather. FIG. 5O, for example, shows user device 104 minimizing weather topic 533 in response to user touch input 536 over button 535 in FIG. 5N. FIG. 5O, for example, shows user device 104 ceasing to display at least some of weather topic 533.

In some embodiments, in response to the user selection of the second affordance, the electronic device excludes (648) context data associated with the sub-portion of the first dialogue from a context history of the digital assistant. In some embodiments, when a user minimizes a sub-portion of the first dialogue, contextual information corresponding to that sub-portion is not utilized when the DA infers user intent for a subsequent request. After the user minimizes weather topic 533 in FIG. 5N, FIG. 5P, for example, shows the DA responding to the user's question, "What about in Munich?" The DA responds to the user's question by stating, "Would you like me to search the web for 'What about in Munich'?" Furthermore, a "search the web" button 540, which is configured to execute a web search for 'What about in Munich' is also displayed. In FIG. 5P, for example, the DA fails to infer that the user's question refers to weather even though the user's previous questions concerned weather. The DA does not infer the "weather" topic because contextual information related to weather topic 533 has been excluded from context history in response to user touch input 536 minimizing (or collapsing) weather topic 533 in FIG. 5N.

It should be understood that the particular order in which the operations in FIGS. 6A-D have been described is merely exemplary and is not intended to indicate that the described order is the only order in which the operations could be performed. One of ordinary skill in the art would recognize various ways to reorder the operations described herein.

Figure 7:
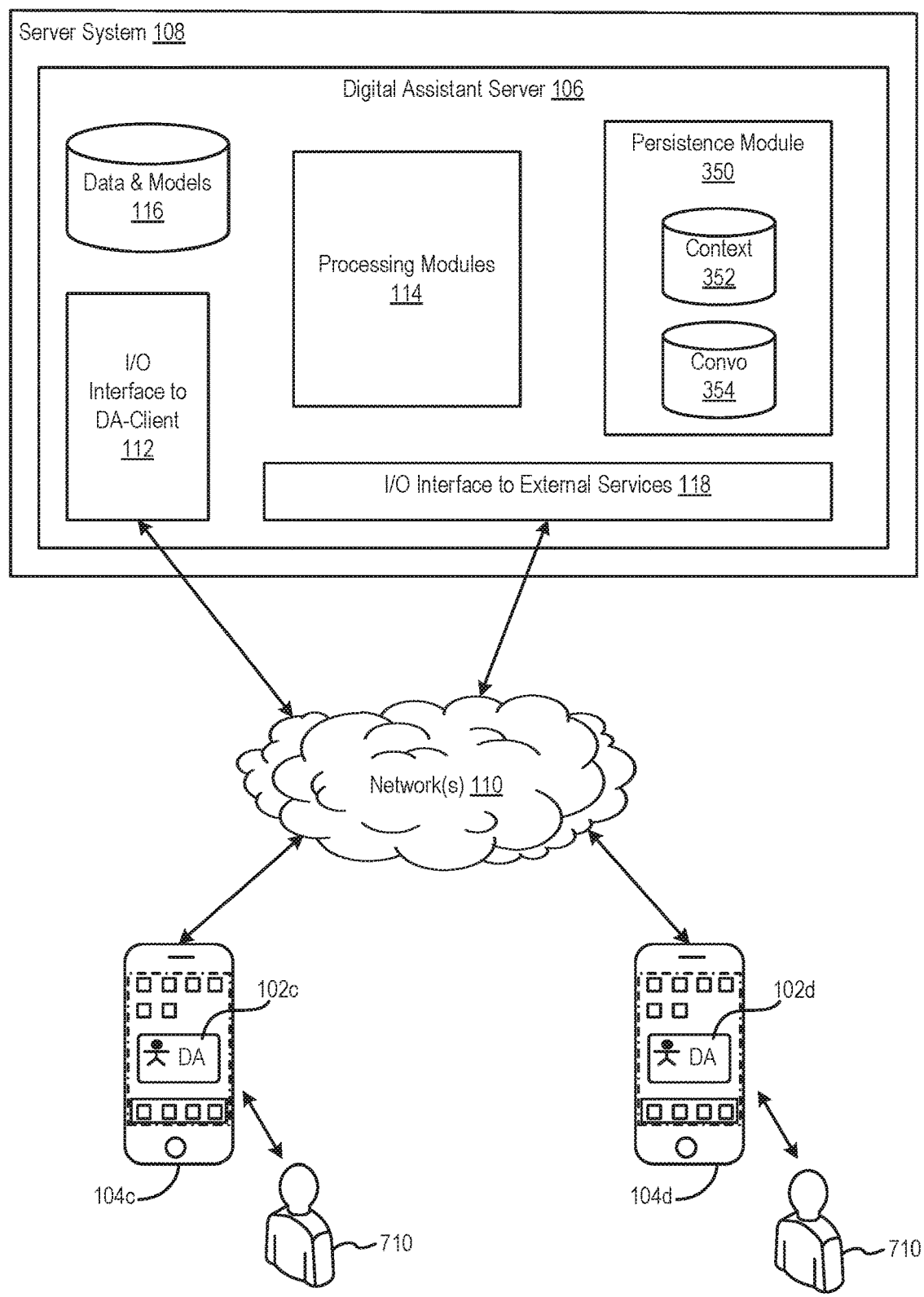
FIG. 7 illustrates a block diagram of a system including two or more electronic devices for enabling context and/or conversation persistence in accordance with some embodiments.

FIG. 7 illustrates a block diagram of a system including two or more electronic devices for enabling context and/or conversation persistence in accordance with some embodiments. In some embodiments, the multi-device system illustrated in FIG. 7 is configured to execute the functions described in FIGS. 6A-D with reference to a single device. Devices 104c and 104d are distinct devices that are both associated with user 710. In some embodiments, a first instance of a DA includes a dialogue between user 710 and DA-client 102c on device 104c. During the first instance of the DA user interface, context and conversation information related to the dialogue between user 710 and DA-client 102c is stored in context history 352 and conversation history 354, respectively, of persistence module 350. In some embodiments, persistence module 350 is a component of server system 108. Furthermore, in some implementations, DA 326 stores context history 352 and conversation history 354 on a per-user basis, and thus the same context history 352 and conversation history 354 of a respective user 710 is available to DA 326 for use when providing services to user 710, regardless of which device 104 (of the devices associated with the user 710) user 710 is currently using.

In some embodiments, after user 710 exits the first instance of the DA on device 104c, user 710 invokes a second instance of the DA on device 104d. The second instance of the DA includes a dialogue between user 710 and DA-client 102d. In some embodiments, during the second instance of the DA, DA-client 102d is enabled to access context and conversation information from the first instance of the DA that is stored in server system 108. In some embodiments, DA-client 102d is enabled to utilize the stored context information for intent inference and the stored conversation information for display in the second instance of the DA.

Although FIG. 7 does not explicitly show the communication interfaces between all components of the DA-server 106, it is to be understood that the components shown in FIG. 7 are capable of communicating with other components of the DA-server 106 either directly or through one or more other interfaces, such as application programming interfaces (APIs), database query interfaces, and/or other interfaces, protocols, and/or communication channels.

Figure 8:
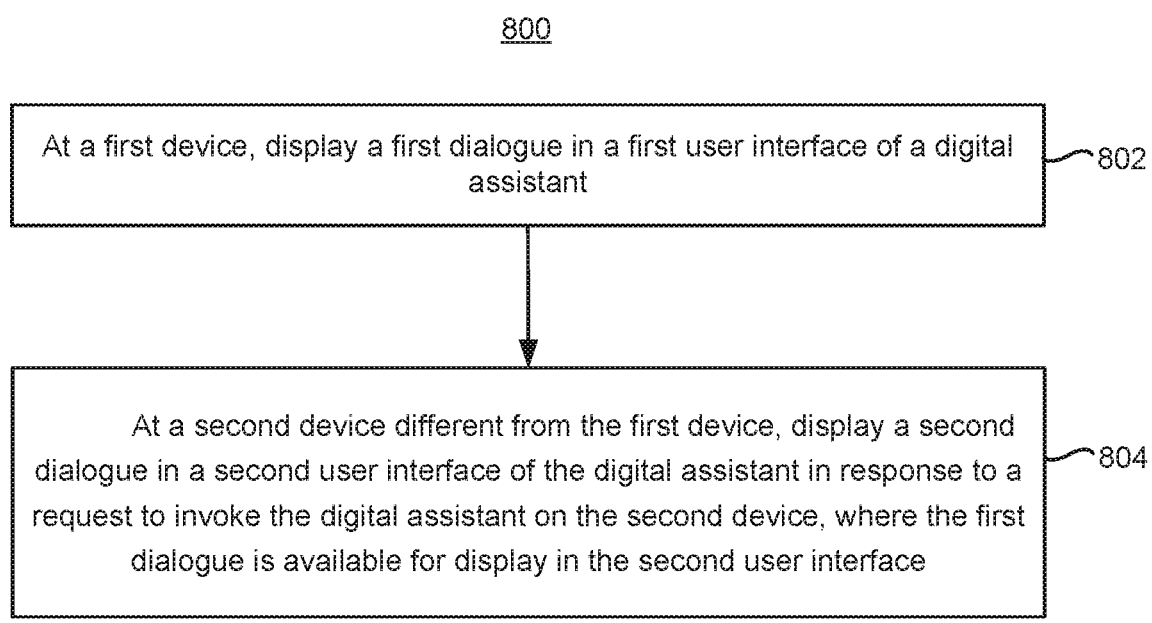
FIG. 8 illustrates a flow diagram for an exemplary process of enabling context and/or conversation persistence between two or more electronic devices in accordance with some embodiments.

FIG. 8 illustrates a flow diagram of a method 800 of operating a digital assistant in accordance with some embodiments. In some embodiments, method 800 is performed at two or more electronic devices each including a display, one or more processors and memory (e.g., a respective DA-client 102 or DA-server 106). In some embodiments, method 800 is performed at the digital assistant 326 illustrated in FIGS. 3A-B and 4. In some embodiments, method 800 is governed by a set of instructions stored in memory (e.g., a non-transitory computer readable storage medium) that are executed by the one or more processors of an electronic device.

At a first device, the first device displays (802) a first dialogue in a first user interface of a digital assistant. For example, device 104c, shown in FIG. 7, is configured to display a first dialogue between user 710 and DA-client 102c in a first user interface of the DA.

At a second device different from the first device, in response to a request to invoke the digital assistant on the second device, the second device displays (804) a second dialogue in a second user interface of the digital assistant, where the first dialogue is available for display in the second user interface. For example, in response to a request from user 710 to invoke the DA on device 104d, device 104d, shown in FIG. 7, is configured to display a second dialogue between user 710 and DA-client 102d. In some embodiments, the second dialogue between user 710 and DA-client 102d is displayed on device 104d at the same time or a later time as the first dialogue between user 710 and DA-client 102c is displayed on device 104c. DA-client 702d is configured to have access to conversation information from the first dialogue between the same user 710 and DA-client 102c stored in conversation history 354 of server system 108 so as to display at least a portion the first dialogue. DA-client 702d is further configured to have access to contextual information from the first dialogue between user 710 and DA-client 102c stored in conversation history 352 of server system 108 for use in intent inference.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein.

Figure 9:
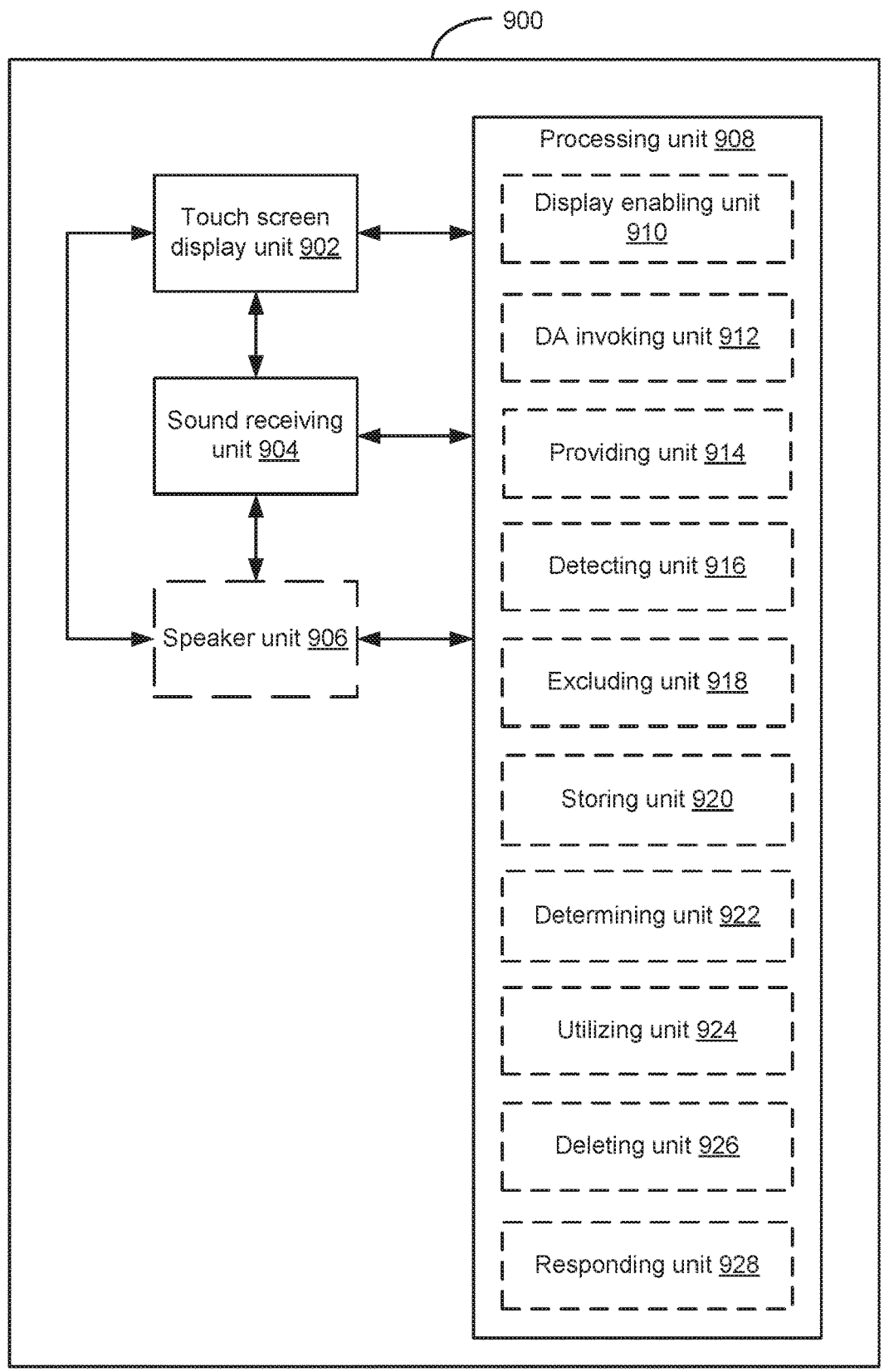
FIG. 9 is a functional block diagram of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a touch screen display unit 902 configured to display a user interface and to receive touch input, and a sound receiving unit 904 configured to receive sound input. In some embodiments, electronic device 900, optionally, includes a speaker unit 906 configured to generate sound. Electronic device 900 also includes a processing unit 908 coupled to touch screen display unit 902 and sound receiving unit 904 (and, optionally, coupled to speaker unit 906). In some embodiments, processing unit 908 includes a display enabling unit 910, a digital assistant (DA) invoking unit 912, a providing unit 914, a detecting unit 916, an excluding unit 918, a storing unit 920, a determining unit 922, a utilizing unit 924, a deleting unit 926, and a responding unit 928.

Processing unit 908 is configured to enable display of (e.g., with display enabling unit 910) a first dialogue in a first instance of a digital assistant user interface on touch screen display unit 902. In response to a request to enable display of a user interface different from the digital assistant user interface, processing unit 908 is configured to enable display of (e.g., with display enabling unit 910) the user interface different from the digital assistant user interface on touch screen display unit 902. In response to a request to invoke the digital assistant, processing unit 908 is further configured to enable display of (e.g., with display enabling unit 910) a second instance of the digital assistant user interface on touch screen display unit 902, including enabling display of a second dialogue in the second instance of the digital assistant user interface, where the first dialogue remains available for display in the second instance of the digital assistant user interface.

In some embodiments, prior to enabling display of the first instance of the digital assistant user interface, processing unit 908 is further configured to detect (e.g., with DA invoking unit 912) a prior request to invoke the digital assistant. Prior to enabling display of the first instance of the digital assistant user interface, sound receiving unit 904 is configured to detect a speech input. Prior to enabling display of the first instance of the digital assistant user interface, processing unit 908 is further configured to provide (e.g., with providing unit 914) a transcription of the speech input, where the first dialogue includes the transcription of the speech input.

In some embodiments, in response to the request to enable display of the user interface different from the digital assistant user interface, processing unit 908 is configured to cease display (e.g., with display enabling unit 910) of the digital assistant user interface on touch screen display unit 902.

In some embodiments, processing unit 908 is configured to: enable display (e.g., with display enabling unit 910) of a first affordance in the second instance of the digital assistant user interface on touch screen display unit 902; detect (e.g., with detecting unit 916) a user selection of the first affordance on the touch screen display unit 902; and in response to the user selection of the first affordance, processing unit 908 is configured to enable display (e.g., with display enabling unit 910) of at least a portion of the first dialogue in the second instance of the digital assistant user interface on touch screen display unit 902.

In some embodiments, processing unit 908 is configured to enable display (e.g., with display enabling unit 910) of at least a portion of the first dialogue in the second instance of the digital assistant user interface on touch screen display unit 902.

In some embodiments, processing unit 908 is configured to enable display (e.g., with display enabling unit 910) of a second affordance corresponding to a respective sub-portion of the first dialogue on touch screen display unit 902; detect (e.g., with detecting unit 916) a user selection of the second affordance on touch screen display unit 902; and in response to the user selection of the second affordance, cease display (e.g., with display enabling unit 910) of at least some of the respective sub-portion of the first dialogue on touch screen display unit 902.

In some embodiments, in response to the user selection of the second affordance, processing unit 908 is configured to exclude (e.g., with excluding unit 918) context data associated with the sub-portion of the first dialogue from a context history of the digital assistant.

In some embodiments, processing unit 908 is configured to: store (e.g., with storing unit 920) context data associated with the first dialogue in a context history of the digital assistant; determine (e.g., with determining unit 922) whether the request to invoke the digital assistant satisfies a first predetermined condition; and in accordance with a determination that the request to invoke the digital assistant satisfies the first predetermined condition, use (e.g., with utilizing unit 924) the stored context data while enabling display of the second instance of the digital assistant user interface.

In some embodiments, the first predetermined condition is satisfied when the request to invoke the digital assistant is received within a predetermined context expiration time period.

In some embodiments, processing unit 908 is configured to delete (e.g., with deleting unit 926) the context data associated with the first dialogue from the context history upon expiration of the predetermined context expiration time period.

In some embodiments, the first predetermined condition is not satisfied when the electronic device is locked.

In some embodiments, the second dialogue includes a user query to the digital assistant, and processing unit 908 is configured to: store (e.g., with storing unit 920) context data associated with the first dialogue in a context history of the digital assistant; and while displaying the second instance of the digital assistant user interface, respond (e.g., with responding unit 928) to the user query to the digital assistant, in accordance with a determination that a predetermined context condition has been satisfied, using the stored context data while determining a response to the user query.

In some embodiments, the predetermined context condition is satisfied when, in response to a user action performed during display of the second instance of the digital assistant user interface, at least a portion of the first dialogue is displayed in the second instance of the digital assistant user interface.

In some embodiments, processing unit 908 is configured to: determine (e.g., with determining unit 922) whether the request to invoke the digital assistant satisfies a second predetermined condition; in accordance with a determination that the request to invoke the digital assistant satisfies the second predetermined condition, enable display (e.g., with display enabling unit 910) of the second instance of the digital assistant user interface on touch screen display unit 902, including enabling display of the second dialogue in the second instance of the digital assistant user interface, where the first dialogue remains available for display in the second instance of the digital assistant user interface; and in accordance with a determination that the request to invoke the digital assistant does not satisfy the second predetermined condition, enable display (e.g., with display enabling unit 910) of the second instance of the digital assistant user interface without making the first dialogue available for display on touch screen display unit 902.

In some embodiments, the second predetermined condition is satisfied when the request to invoke the digital assistant is received within a predetermined conversation expiration time period.

In some embodiments, processing unit 908 is configured to: store (e.g., with storing unit 920) context data associated with the first dialogue in a context history of the digital assistant; determine (e.g., with determining unit 922) whether the request to invoke the digital assistant satisfies a first predetermined condition, where the first predetermined condition is satisfied when the request to invoke the digital assistant is received within a predetermined context expiration time period; in accordance with a determination that the request to invoke the digital assistant satisfies the first predetermined condition, use (e.g., with utilizing unit 924) the stored context data while displaying the second instance of the digital assistant user interface; and delete (e.g., with deleting unit 926) the context data associated with the first dialogue from the context history upon expiration of the predetermined context expiration time period, where the predetermined context expiration time period is shorter than the predetermined conversation expiration time period.

In some embodiments, the second predetermined condition is not satisfied when electronic device 900 is locked.

In some embodiments, the second predetermined condition comprises a condition that is satisfied when the request to invoke the digital assistant is received prior to detection of a predetermined number of user interactions with the electronic device after displaying the first dialogue.

In some embodiments, the request to display the user interface different from the digital assistant user interface corresponds to a user input to display the user interface different from the digital assistant user interface.

In some embodiments, the user input to display the user interface different from the digital assistant user interface corresponds to a request to launch an application.

In some embodiments, the user interface different from the digital assistant user interface does not correspond to the digital assistant.

In some embodiments, the user interface different from the digital assistant user interface is associated with an application distinct from the digital assistant.

Figure 10:
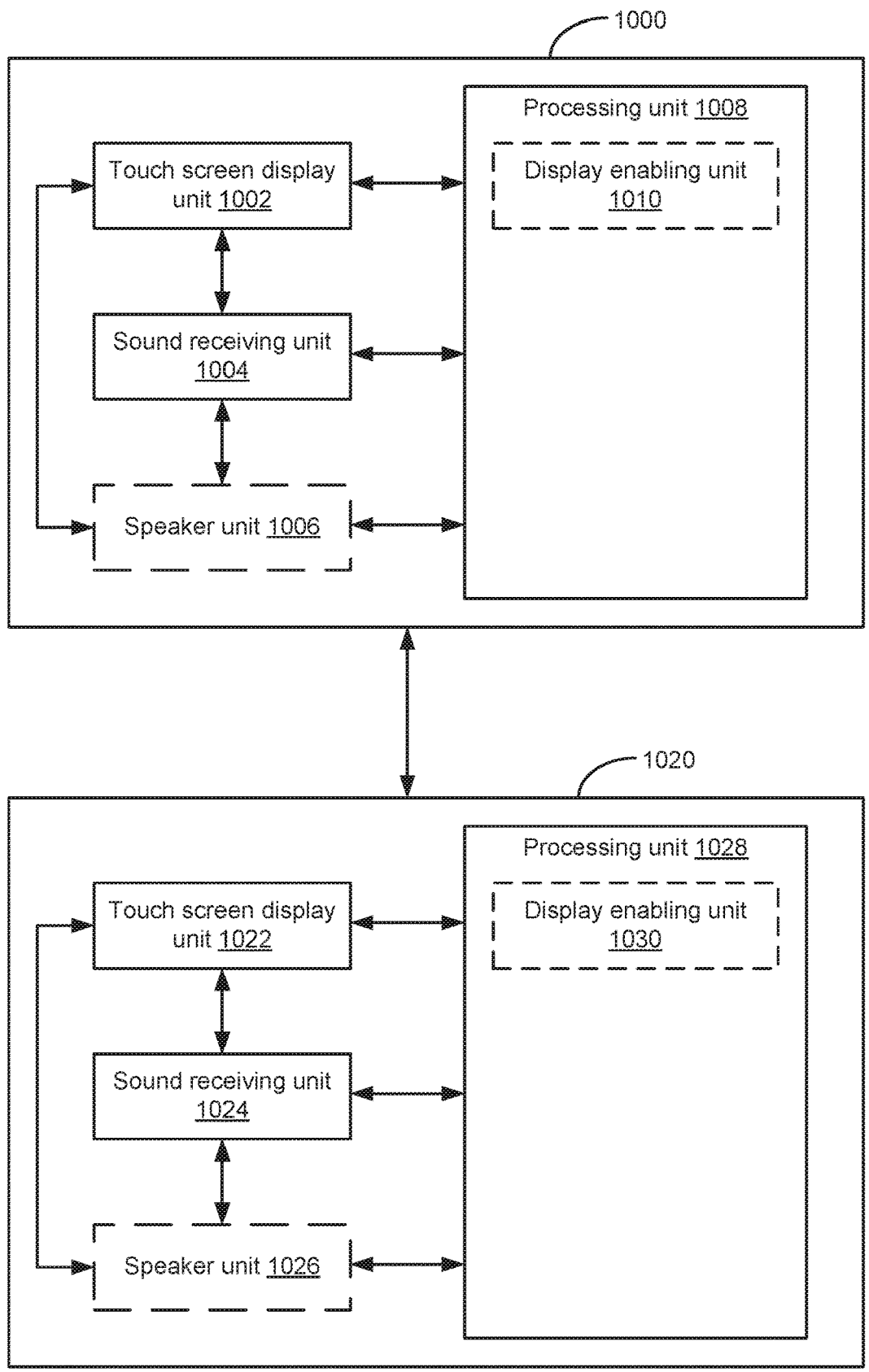
FIG. 10 is a functional block diagram of an electronic device in accordance with some embodiments.

In accordance with some embodiments, FIG. 10 shows a functional block diagram of a first electronic device 1000 and a second electronic device 1020 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, a first electronic device 1000 includes a touch screen display unit 1002 configured to display a user interface and to receive touch input, and a sound receiving unit 1004 configured to receive sound input.

In some embodiments, first electronic device 1000, optionally, includes a speaker unit 1006 configured to generate sound. First electronic device 1000 also includes a processing unit 1008 coupled to touch screen display unit 1002 and sound receiving unit 1004 (and, optionally, coupled to speaker unit 1006). In some embodiments, processing unit 1008 includes a display enabling unit 1010.

A second electronic device 1020 includes a touch screen display unit 1022 configured to display a user interface and to receive touch input, and a sound receiving unit 1024 configured to receive sound input. In some embodiments, second electronic device 1020, optionally, includes a speaker unit 1026 configured to generate sound. Second electronic device 1020 also includes a processing unit 1028 coupled to touch screen display unit 1022 and sound receiving unit 1024 (and, optionally, coupled to speaker unit 1026). In some embodiments, processing unit 1028 includes a display enabling unit 1030.

Processing unit 1008 of first electronic device 1000 is configured to enable display (e.g., with display enabling unit 1010) of a first dialogue in a first user interface of a digital assistant on touch screen display unit 1002. In response to a request to invoke the digital assistant on second electronic device 1020, processing unit 1028 of second electronic device 1020 is configured to enable display of (e.g., with display enabling unit 1030) a second dialogue in a second user interface of the digital assistant on touch screen display unit 1022, where the first dialogue is available for display in the second user interface.

The foregoing description, for purpose of explanation, has been described with reference to specific implementations. However, the illustrative discussions above are not intended to be exhaustive or to limit the disclosed implementations to the precise forms disclosed. Many modifications and variations are possible in view of the above teachings. The implementations were chosen and described in order to best explain the principles and practical applications of the disclosed ideas, to thereby enable others skilled in the art to best utilize them with various modifications as are suited to the particular use contemplated.

Although the terms "first," "second," etc. may be used herein to describe various elements, these elements should not be limited by these terms. These terms are only used to distinguish one element from another. For example, a first speech input could be termed a second speech input, and, similarly, a second speech input could be termed a first speech input, without changing the meaning of the description, so long as all occurrences of the "first speech input" are renamed consistently and all occurrences of the "second speech input" are renamed consistently. The first speech input and the second speech input are both speech inputs, but they are not the same speech input.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of operating a digital assistant, performed at an electronic device having one or more processors and memory storing one or more programs for execution by the one or more processors, the method comprising:
    while displaying a first user interface other than a digital assistant user interface, receiving a user request to invoke the digital assistant;
    in response to receiving the user request to invoke the digital assistant, initiating a current interactive session with the digital assistant, including:
        displaying the digital assistant user interface; and
        obtaining audio data containing a spoken query;
    determining whether the user request to invoke the digital assistant satisfies a first predetermined condition, wherein the user request to invoke the digital assistant does not satisfy the first predetermined condition if the electronic device is in a locked state while receiving the user request to invoke the digital assistant; and
    in accordance with a determination that the user request to invoke the digital assistant satisfies the first predetermined condition:
        using context data from a previous interactive session with the digital assistant to determine a response to the spoken query, wherein the previous interactive session was initiated on the electronic device prior to displaying the first user interface; and
        displaying dialogue in the displayed digital assistant user interface, wherein the displayed dialogue includes first text corresponding to the spoken query and second text corresponding to the response to the spoken query.

2. The method of claim 1, wherein satisfying the first predetermined condition requires that the user request to invoke the digital assistant is received within a predetermined time period after the previous interactive session with the digital assistant ends.

3. The method of claim 2, wherein the previous interactive session with the digital assistant ends upon detecting, prior to displaying the first user interface, a user request to end the previous interactive session with the digital assistant.

4. The method of claim 3, wherein initiating the previous interactive session includes displaying the digital assistant user interface, and wherein detecting the user request to end the previous interactive session with the digital assistant causes the electronic device to:
    cease display of the digital assistant user interface; and
    display the first user interface.

5. The method of claim 1, further comprising:
    in accordance with a determination that the user request to invoke the digital assistant does not satisfy the first predetermined condition:

determining a second response to the spoken query without using the context data; and displaying a second dialogue in the displayed digital assistant user interface, wherein the second dialogue includes first text corresponding to the spoken query and second text corresponding to the second response to the spoken query.

6. The method of claim 1, wherein prior to displaying the first user interface, the electronic device causes the context data to be stored in a context history of the digital assistant, and wherein the method further comprises:

in accordance with a determination that the user request to invoke the digital assistant does not satisfy the first predetermined condition, causing the stored context data to be removed from the context history.

7. The method of claim 1, further comprising:

determining whether the user request to invoke the digital assistant satisfies a second predetermined condition;

in accordance with a determination that the user request to invoke the digital assistant satisfies the second predetermined condition and does not satisfy the first predetermined condition:

enabling the displayed digital assistant user interface to display previous dialogue from the previous interactive session; and displaying a second dialogue in the displayed digital assistant user interface without displaying the previous dialogue, wherein the second dialogue includes first text corresponding to the spoken query and second text corresponding to a second response to the spoken query, and wherein the second response to the spoken query is determined without using the context data.

8. The method of claim 7, further comprising:

detecting user input via the displayed digital assistant user interface;

in accordance with detecting the user input and in accordance with the determination that the user request to invoke the digital assistant satisfies the second predetermined condition, displaying the previous dialogue in the displayed digital assistant user interface;

while displaying the previous dialogue, receiving a user request to activate a microphone of the electronic device;

in accordance with receiving the user request to activate the microphone, obtaining second audio data containing a second spoken query;

in accordance with detecting the user input and in accordance with the determination that the user request to invoke the digital assistant does not satisfy the first predetermined condition:

using the context data from the previous interactive session to determine a response to the second spoken query; and displaying a third dialogue in the displayed digital assistant user interface, wherein the third dialogue includes first text corresponding to the second spoken query and second text corresponding to the response to the second spoken query.

9. A non-transitory computer-readable storage medium storing instructions for operating a digital assistant, the instructions, when executed by one or more processors of an electronic device, cause the device to perform operations comprising:

while displaying a first user interface other than a digital assistant user interface, receiving a user request to invoke the digital assistant;

in response to receiving the user request to invoke the digital assistant, initiating a current interactive session with the digital assistant, including:

displaying the digital assistant user interface; and obtaining audio data containing a spoken query;

determining whether the user request to invoke the digital assistant satisfies a first predetermined condition, wherein the user request to invoke the digital assistant does not satisfy the first predetermined condition if the device is in a locked state while receiving the user request to invoke the digital assistant; and in accordance with a determination that the user request to invoke the digital assistant satisfies the first predetermined condition:

using context data from a previous interactive session with the digital assistant to determine a response to the spoken query, wherein the previous interactive session was initiated on the electronic device prior to displaying the first user interface; and displaying dialogue in the displayed digital assistant user interface, wherein the displayed dialogue includes first text corresponding to the spoken query and second text corresponding to the response to the spoken query.

10. The computer-readable storage medium of claim 9, wherein satisfying the first predetermined condition requires that the user request to invoke the digital assistant is received within a predetermined time period after the previous interactive session with the digital assistant ends.

11. The computer-readable storage medium of claim 10, wherein the previous interactive session with the digital assistant ends upon detecting, prior to displaying the first user interface, a user request to end the previous interactive session with the digital assistant.

12. The computer-readable storage medium of claim 11, wherein initiating the previous interactive session includes displaying the digital assistant user interface, and wherein detecting the user request to end the previous interactive session with the digital assistant causes the electronic device to:

cease display of the digital assistant user interface; and display the first user interface.

13. The computer-readable storage medium of claim 9, wherein the instructions further cause the device to perform operations comprising:

in accordance with a determination that the user request to invoke the digital assistant does not satisfy the first predetermined condition:

determining a second response to the spoken query without using the context data; and displaying a second dialogue in the displayed digital assistant user interface, wherein the second dialogue includes first text corresponding to the spoken query and second text corresponding to the second response to the spoken query.

14. The computer-readable storage medium of claim 9, wherein prior to displaying the first user interface, the device causes the context data to be stored in a context history of the digital assistant, and wherein the instructions further cause the device to perform operations comprising:

in accordance with a determination that the user request to invoke the digital assistant does not satisfy the first predetermined condition, causing the stored context data to be removed from the context history.

15. The computer-readable storage medium of claim 9, wherein the instructions further cause the device to perform operations comprising:

determining whether the user request to invoke the digital assistant satisfies a second predetermined condition;

in accordance with a determination that the user request to invoke the digital assistant satisfies the second predetermined condition and does not satisfy the first predetermined condition:

enabling the displayed digital assistant user interface to display previous dialogue from the previous interactive session; and displaying a second dialogue in the displayed digital assistant user interface without displaying the previous dialogue, wherein the second dialogue includes first text corresponding to the spoken query and second text corresponding to a second response to the spoken query, and wherein the second response to the spoken query is determined without using the context data.

16. The computer-readable storage medium of claim 15, wherein the instructions further cause the device to perform operations comprising:

detecting user input via the displayed digital assistant user interface;

in accordance with detecting the user input and in accordance with the determination that the user request to invoke the digital assistant satisfies the second predetermined condition, displaying the previous dialogue in the displayed digital assistant user interface;

while displaying the previous dialogue, receiving a user request to activate a microphone of the electronic device;

in accordance with receiving the user request to activate the microphone, obtaining second audio data containing a second spoken query;

in accordance with detecting the user input and in accordance with the determination that the user request to invoke the digital assistant does not satisfy the first predetermined condition:

using the context data from the previous interactive session to determine a response to the second spoken query; and displaying a third dialogue in the displayed digital assistant user interface, wherein the third dialogue includes first text corresponding to the second spoken query and second text corresponding to the response to the second spoken query.

17. An electronic device comprising:
one or more processors; and
memory storing instructions for operating a digital assistant, the instructions, when executed by the one or more processors, cause the one or more processors to perform operations comprising:

while displaying a first user interface other than a digital assistant user interface, receiving a user request to invoke the digital assistant;

in response to receiving the user request to invoke the digital assistant, initiating a current interactive session with the digital assistant, including:
displaying the digital assistant user interface; and
obtaining audio data containing a spoken query;

determining whether the user request to invoke the digital assistant satisfies a first predetermined condition, wherein the user request to invoke the digital assistant does not satisfy the first predetermined condition if the electronic device is in a locked state while receiving the user request to invoke the digital assistant; and in accordance with a determination that the user request to invoke the digital assistant satisfies the first predetermined condition:

using context data from a previous interactive session with the digital assistant to determine a response to the spoken query, wherein the previous interactive session was initiated on the electronic device prior to displaying the first user interface; and displaying dialogue in the displayed digital assistant user interface, wherein the displayed dialogue includes first text corresponding to the spoken query and second text corresponding to the response to the spoken query.

18. The device of claim 17, wherein satisfying the first predetermined condition requires that the user request to invoke the digital assistant is received within a predetermined time period after the previous interactive session with the digital assistant ends.

19. The device of claim 18, wherein the previous interactive session with the digital assistant ends upon detecting, prior to displaying the first user interface, a user request to end the previous interactive session with the digital assistant.

20. The device of claim 19, wherein initiating the previous interactive session includes displaying the digital assistant user interface, and wherein detecting the user request to end the previous interactive session with the digital assistant causes the device to:
cease display of the digital assistant user interface; and
display the first user interface.

21. The device of claim 17, wherein the instructions further cause the one or more processors to perform operations comprising:

in accordance with a determination that the user request to invoke the digital assistant does not satisfy the first predetermined condition:

determining a second response to the spoken query without using the context data; and displaying a second dialogue in the displayed digital assistant user interface, wherein the second dialogue includes first text corresponding to the spoken query and second text corresponding to the second response to the spoken query.

22. The device of claim 17, wherein prior to displaying the first user interface, the one or more processors cause the context data to be stored in a context history of the digital assistant, and wherein the instructions further cause the one or more processors to perform operations comprising:

in accordance with a determination that the user request to invoke the digital assistant does not satisfy the first predetermined condition, causing the stored context data to be removed from the context history.

23. The device of claim 17, wherein the instructions further cause the one or more processors to perform operations comprising:

determining whether the user request to invoke the digital assistant satisfies a second predetermined condition;

in accordance with a determination that the user request to invoke the digital assistant satisfies the second predetermined condition and does not satisfy the first predetermined condition:

enabling the displayed digital assistant user interface to display previous dialogue from the previous interactive session; and displaying a second dialogue in the displayed digital assistant user interface without displaying the previous dialogue, wherein the second dialogue includes first text corresponding to the spoken query and second text corresponding to a second response to the spoken query, and wherein the second response to the spoken query is determined without using the context data.

24. The device of claim 23, wherein the instructions further cause the one or more processors to perform operations comprising:
   detecting user input via the displayed digital assistant user interface;
   in accordance with detecting the user input and in accordance with the determination that the user request to invoke the digital assistant satisfies the second predetermined condition, displaying the previous dialogue in the displayed digital assistant user interface;
   while displaying the previous dialogue, receiving a user request to activate a microphone of the electronic device;
   in accordance with receiving the user request to activate the microphone, obtaining second audio data containing a second spoken query;
   in accordance with detecting the user input and in accordance with the determination that the user request to invoke the digital assistant does not satisfy the first predetermined condition:
      using the context data from the previous interactive session to determine a response to the second spoken query; and
      displaying a third dialogue in the displayed digital assistant user interface, wherein the third dialogue includes first text corresponding to the second spoken query and second text corresponding to the response to the second spoken query.

25. The method of claim 5, wherein:
   displaying the second dialogue in the displayed digital assistant user interface is performed further in accordance with a determination that the electronic device is in the locked state while receiving the user request to invoke the digital assistant; and
   previous dialogue from the previous interactive session is not available for display in the displayed digital assistant user interface when the displayed digital assistant user interface displays the second dialogue.

26. The method of claim 5, further comprising:
   after displaying the second dialogue in the displayed digital assistant user interface, and while the electronic device is in the locked state:
      receiving a user input to unlock the electronic device from the locked state;
      in response to receiving the user input to unlock the electronic device, changing a state of the electronic device from the locked state to an unlocked state;
   while the electronic device is in the unlocked state:
      receiving a second user request to invoke the digital assistant; and
      in response to receiving the second user request to invoke the digital assistant, initiating a second interactive session with the digital assistant, including:
         displaying the digital assistant user interface; and
         obtaining audio data containing a second spoken query; and
      using the context data from the previous interactive session with the digital assistant to determine a third response to the second spoken query.

27. The method of claim 7, wherein prior to displaying the first user interface, the electronic device causes the previous dialogue to be stored in a conversation history of the digital assistant, the method further comprising:
   in accordance with a determination that the user request to invoke the digital assistant does not satisfy the second predetermined condition, causing the previous dialog to be removed from the conversation history.

28. The method of claim 7, wherein:
   satisfying the first predetermined condition requires that the user request to invoke the digital assistant is received within a first predetermined time period after the previous interactive session with the digital assistant ends;
   satisfying the second predetermined condition requires that the user request to invoke the digital assistant is received within a second predetermined time period after the previous interactive session with the digital assistant ends; and
   the second predetermined time period is longer than the first predetermined time period.

29. The method of claim 28, wherein the first predetermined time period and the second predetermined time period are each user defined.

30. The computer-readable storage medium of claim 13, wherein:
   displaying the second dialogue in the displayed digital assistant user interface is performed further in accordance with a determination that the electronic device is in the locked state while receiving the user request to invoke the digital assistant; and
   previous dialogue from the previous interactive session is not available for display in the displayed digital assistant user interface when the displayed digital assistant user interface displays the second dialogue.

31. The computer-readable storage medium of claim 13, wherein the instructions further cause the device to perform operations comprising:
   after displaying the second dialogue in the displayed digital assistant user interface, and while the electronic device is in the locked state:
      receiving a user input to unlock the electronic device from the locked state;
      in response to receiving the user input to unlock the electronic device, changing a state of the electronic device from the locked state to an unlocked state;
   while the electronic device is in the unlocked state:
      receiving a second user request to invoke the digital assistant; and
      in response to receiving the second user request to invoke the digital assistant, initiating a second interactive session with the digital assistant, including:
         displaying the digital assistant user interface; and
         obtaining audio data containing a second spoken query; and
      using the context data from the previous interactive session with the digital assistant to determine a third response to the second spoken query.

32. The computer-readable storage medium of claim 15, wherein prior to displaying the first user interface, the electronic device causes the previous dialogue to be stored in a conversation history of the digital assistant, and wherein the instructions further cause the device to perform operations comprising:
   in accordance with a determination that the user request to invoke the digital assistant does not satisfy the second predetermined condition, causing the previous dialog to be removed from the conversation history.

33. The computer-readable storage medium of claim 15, wherein:
- satisfying the first predetermined condition requires that the user request to invoke the digital assistant is received within a first predetermined time period after the previous interactive session with the digital assistant ends;
- satisfying the second predetermined condition requires that the user request to invoke the digital assistant is received within a second predetermined time period after the previous interactive session with the digital assistant ends; and
- the second predetermined time period is longer than the first predetermined time period.

34. The computer-readable storage medium of claim 33, wherein the first predetermined time period and the second predetermined time period are each user defined.

35. The electronic device of claim 21, wherein the instructions further cause the one or more processors to perform operations comprising:
- displaying the second dialogue in the displayed digital assistant user interface is performed further in accordance with a determination that the electronic device is in the locked state while receiving the user request to invoke the digital assistant; and
- previous dialogue from the previous interactive session is not available for display in the displayed digital assistant user interface when the displayed digital assistant user interface displays the second dialogue.

36. The electronic device of claim 21, wherein the instructions further cause the one or more processors to perform operations comprising:
- after displaying the second dialogue in the displayed digital assistant user interface, and while the electronic device is in the locked state:
  - receiving a user input to unlock the electronic device from the locked state;
  - in response to receiving the user input to unlock the electronic device, changing a state of the electronic device from the locked state to an unlocked state;
  - while the electronic device is in the unlocked state:
    - receiving a second user request to invoke the digital assistant; and
    - in response to receiving the second user request to invoke the digital assistant, initiating a second interactive session with the digital assistant, including:
      - displaying the digital assistant user interface; and
      - obtaining audio data containing a second spoken query; and
    - using the context data from the previous interactive session with the digital assistant to determine a third response to the second spoken query.

37. The electronic device of claim 23, wherein prior to displaying the first user interface, the electronic device causes the previous dialogue to be stored in a conversation history of the digital assistant, and wherein the instructions further cause the one or more processors to perform operations comprising:
- in accordance with a determination that the user request to invoke the digital assistant does not satisfy the second predetermined condition, causing the previous dialog to be removed from the conversation history.

38. The electronic device of claim 23, wherein:
- satisfying the first predetermined condition requires that the user request to invoke the digital assistant is received within a first predetermined time period after the previous interactive session with the digital assistant ends;
- satisfying the second predetermined condition requires that the user request to invoke the digital assistant is received within a second predetermined time period after the previous interactive session with the digital assistant ends; and
- the second predetermined time period is longer than the first predetermined time period.

39. The electronic device of claim 38, wherein the first predetermined time period and the second predetermined time period are each user defined.

* * * * *

UNITED STATES PATENT AND TRADEMARK OFFICE
CERTIFICATE OF CORRECTION

PATENT NO. : 11,048,473 B2
APPLICATION NO. : 16/204178
DATED : June 29, 2021
INVENTOR(S) : David A. Carson et al.

It is certified that error appears in the above-identified patent and that said Letters Patent is hereby corrected as shown below:

On the Title Page

On page 2, Related U.S. Application Data (60) Line 1, Delete "61/932,898," and insert -- 61/832,898, --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*